fig_15_

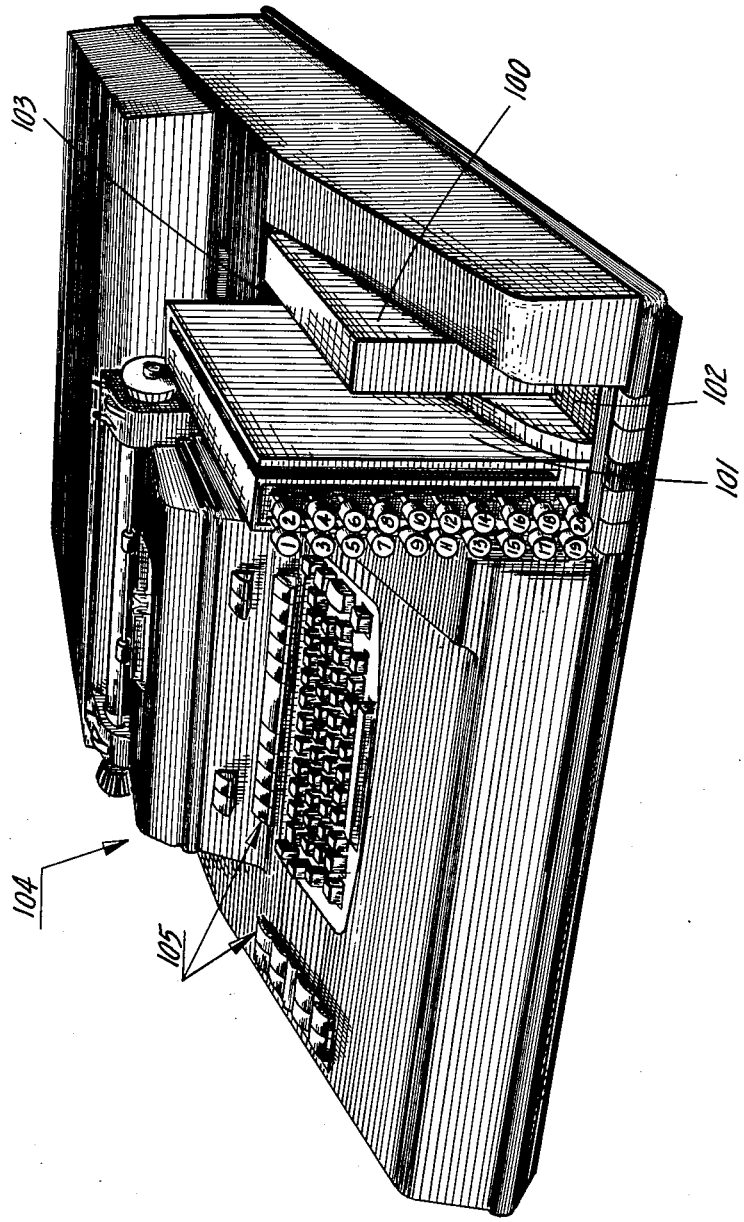

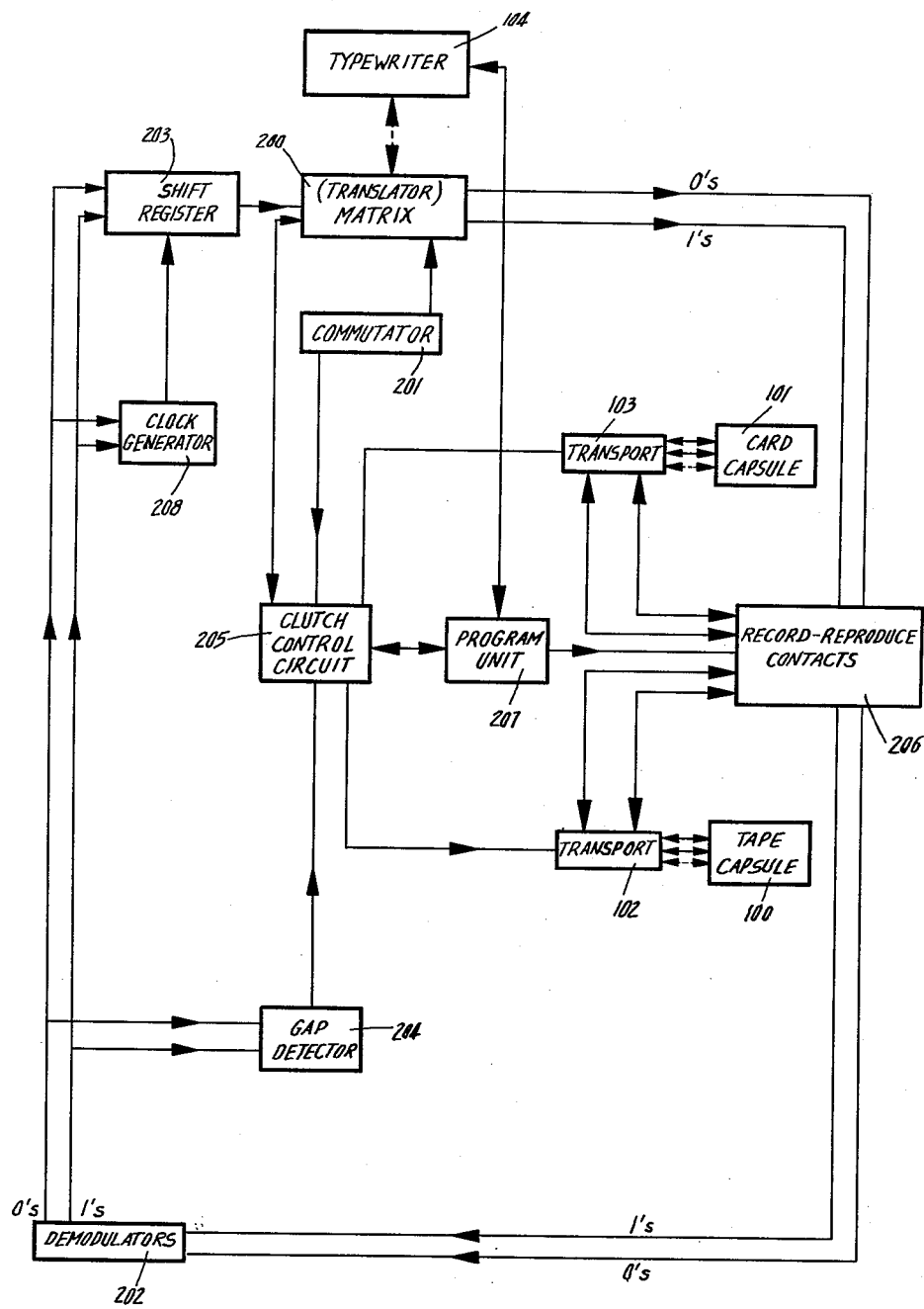
fig_2_

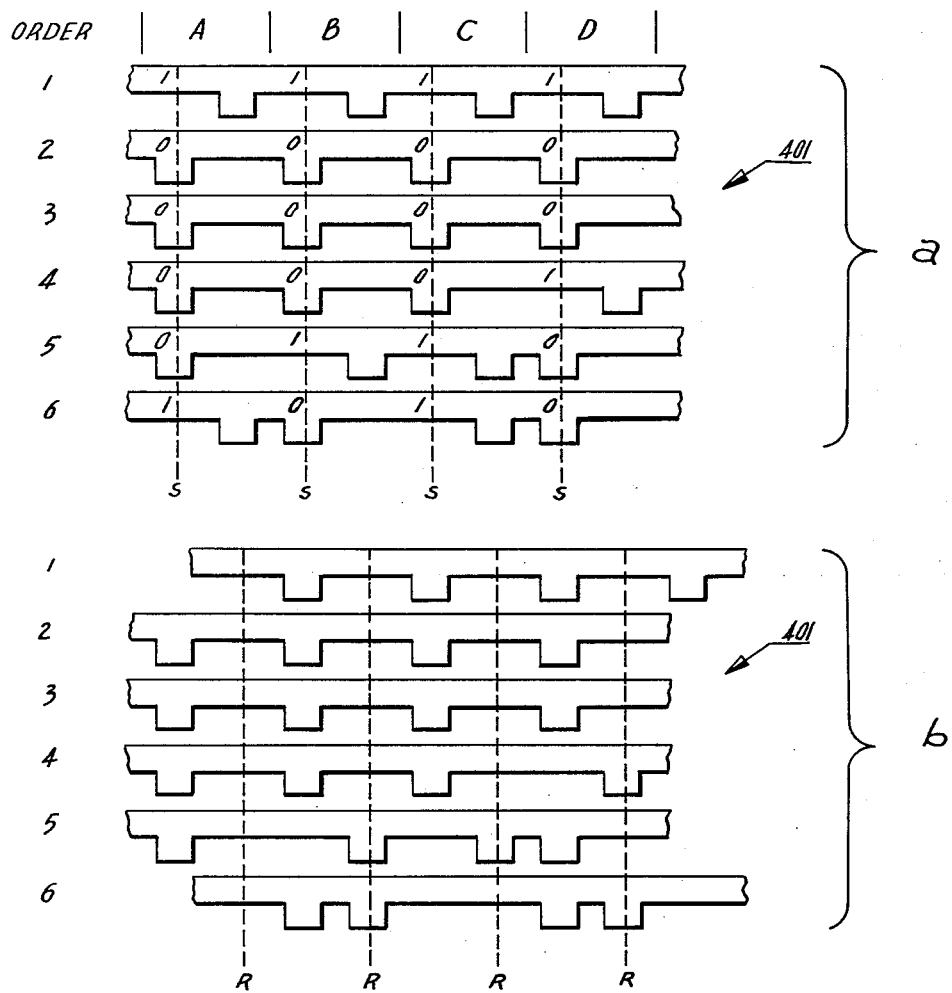
fig_3_

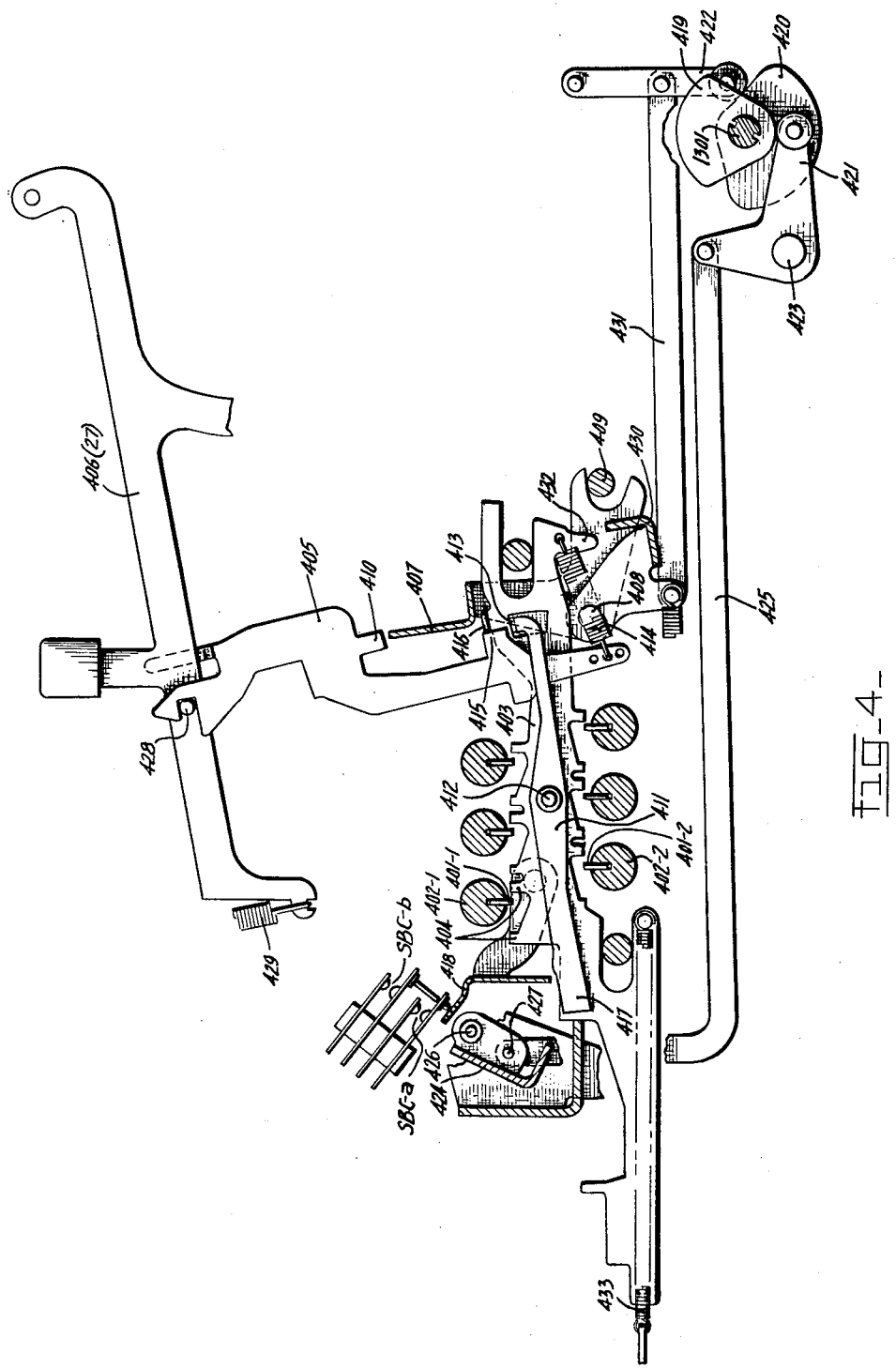

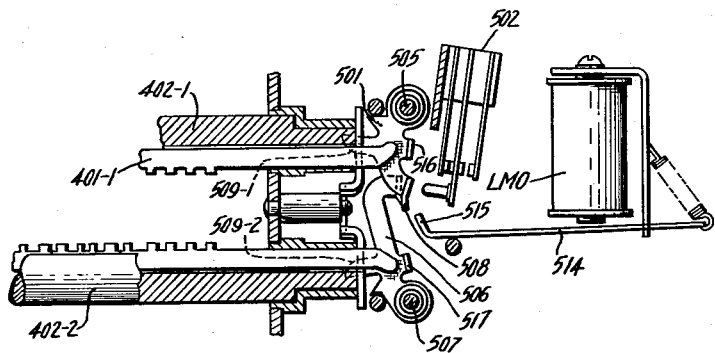
Fig_5_
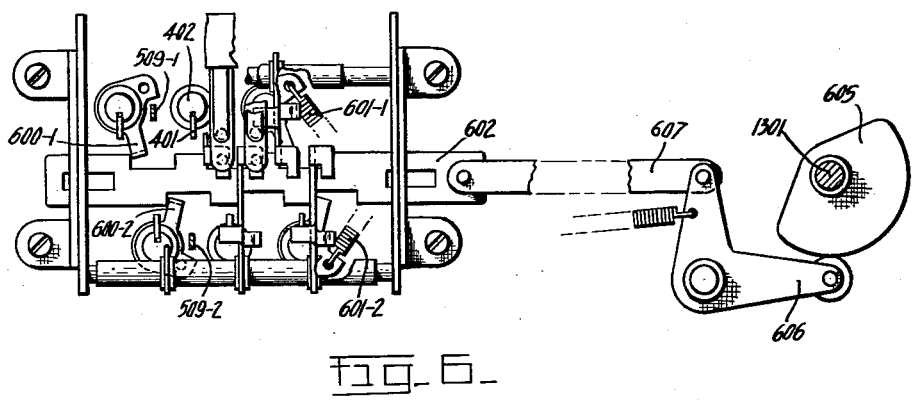
Fig_6_

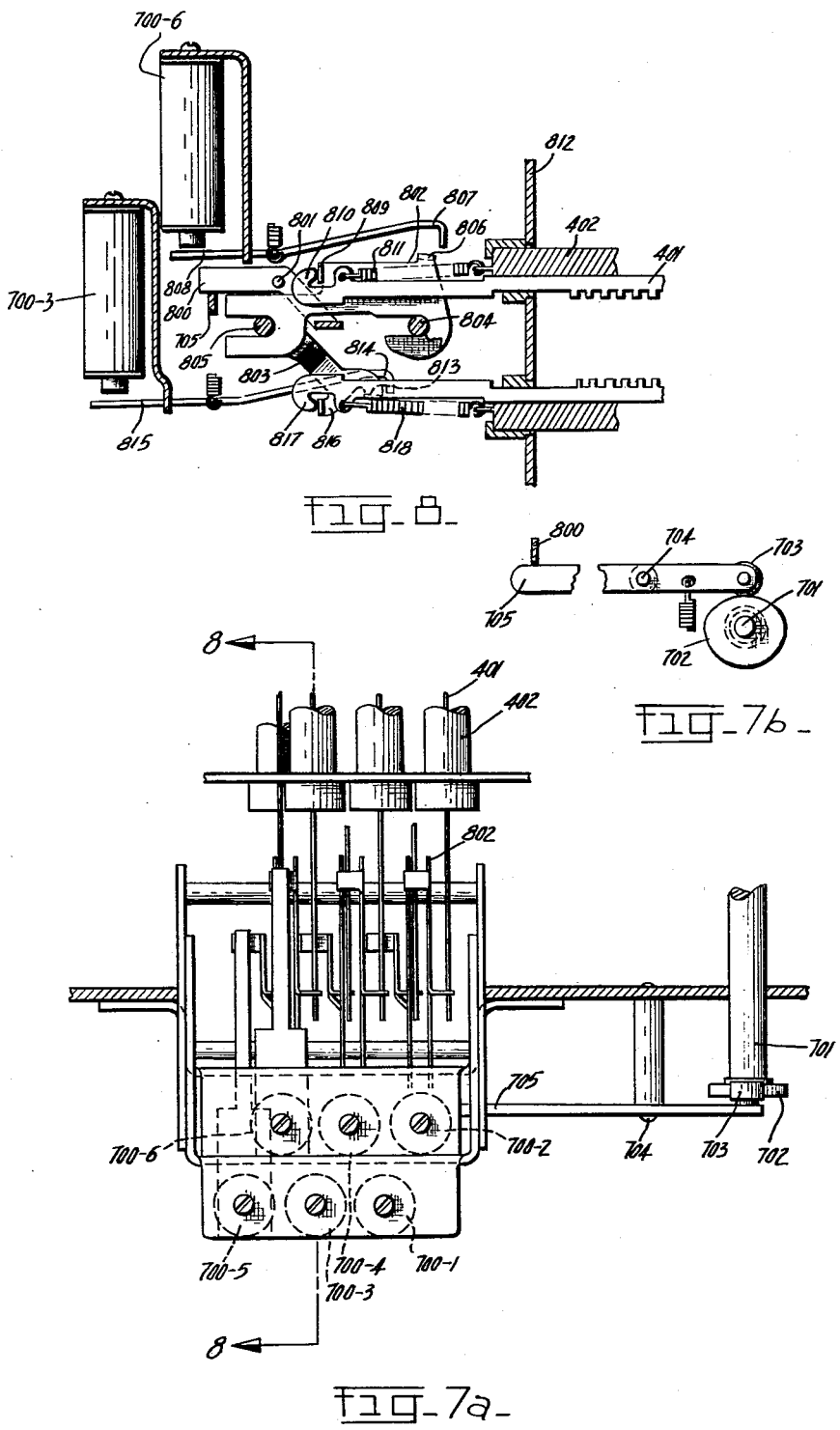

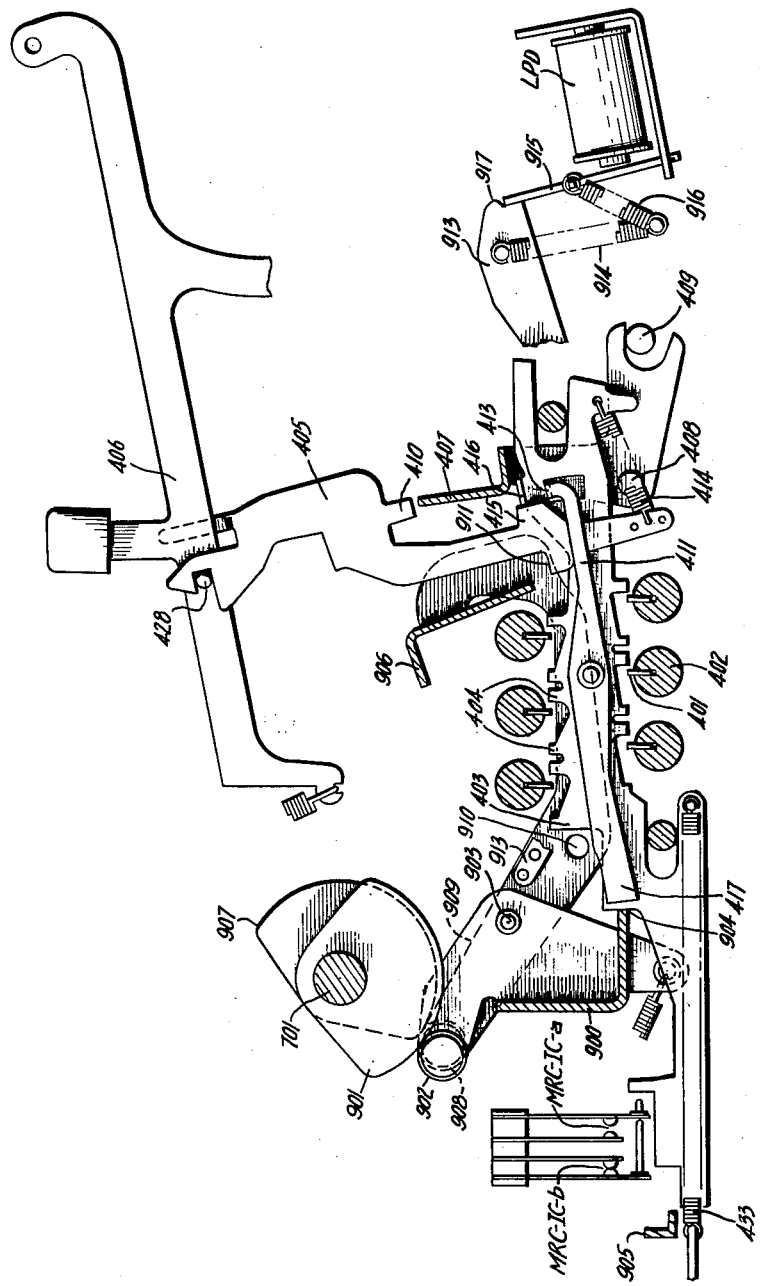

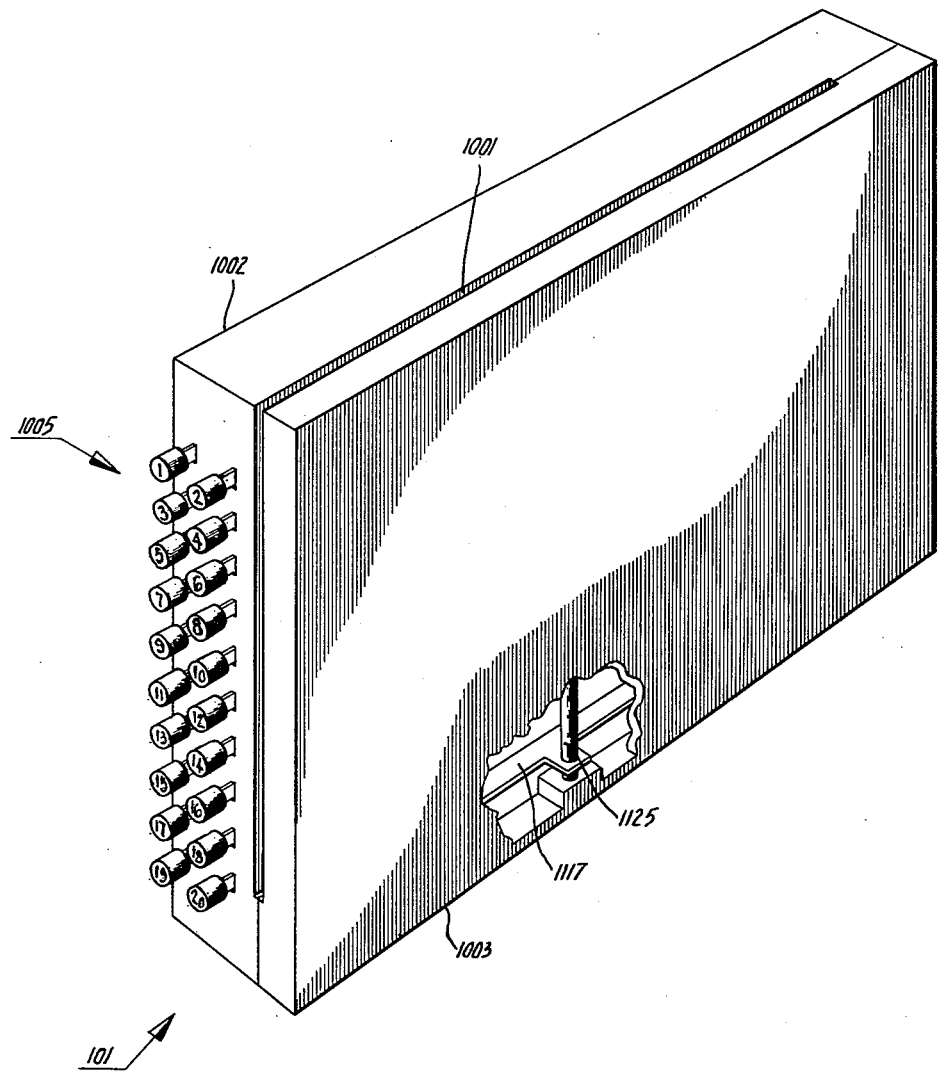
fig_10_

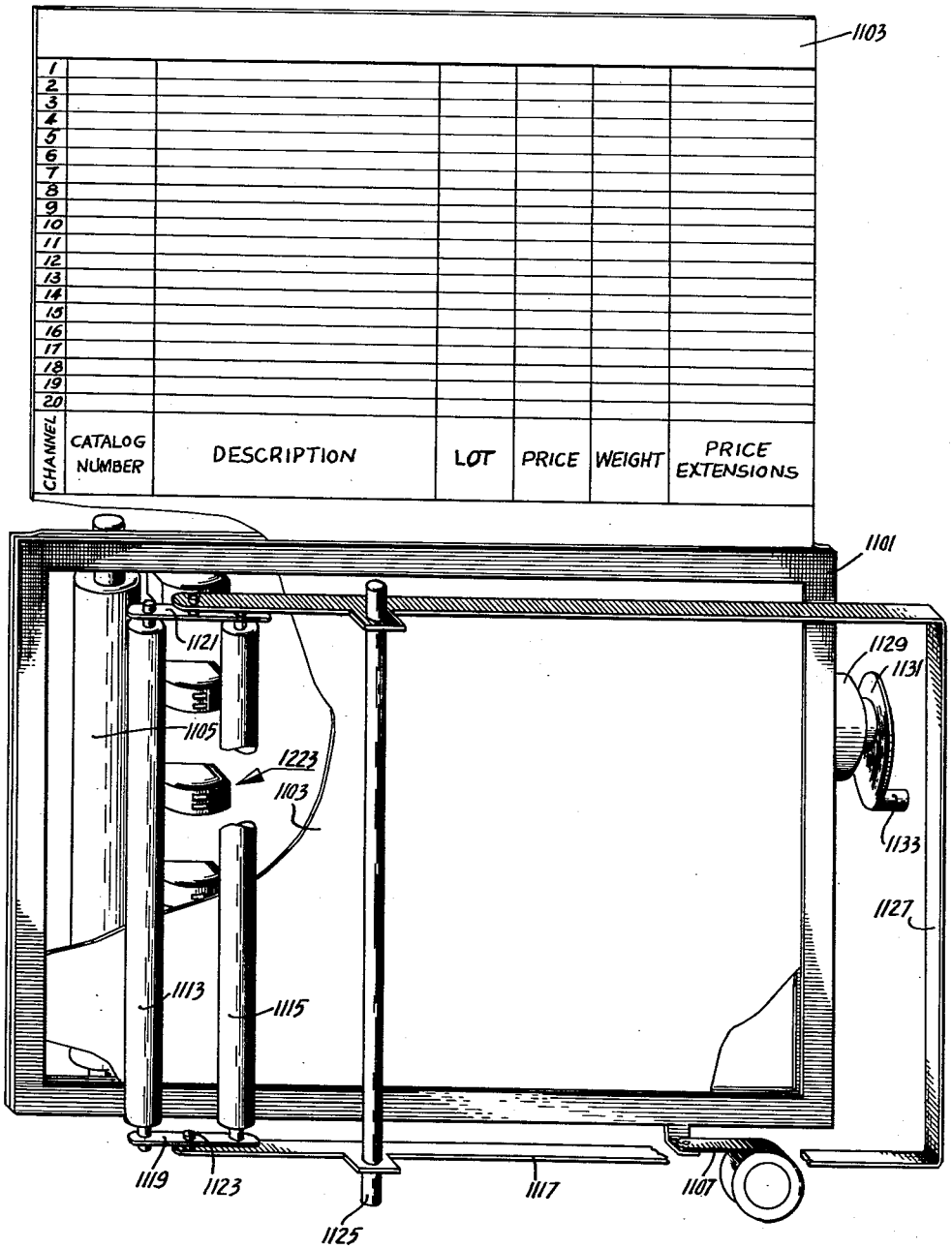
fig_11_

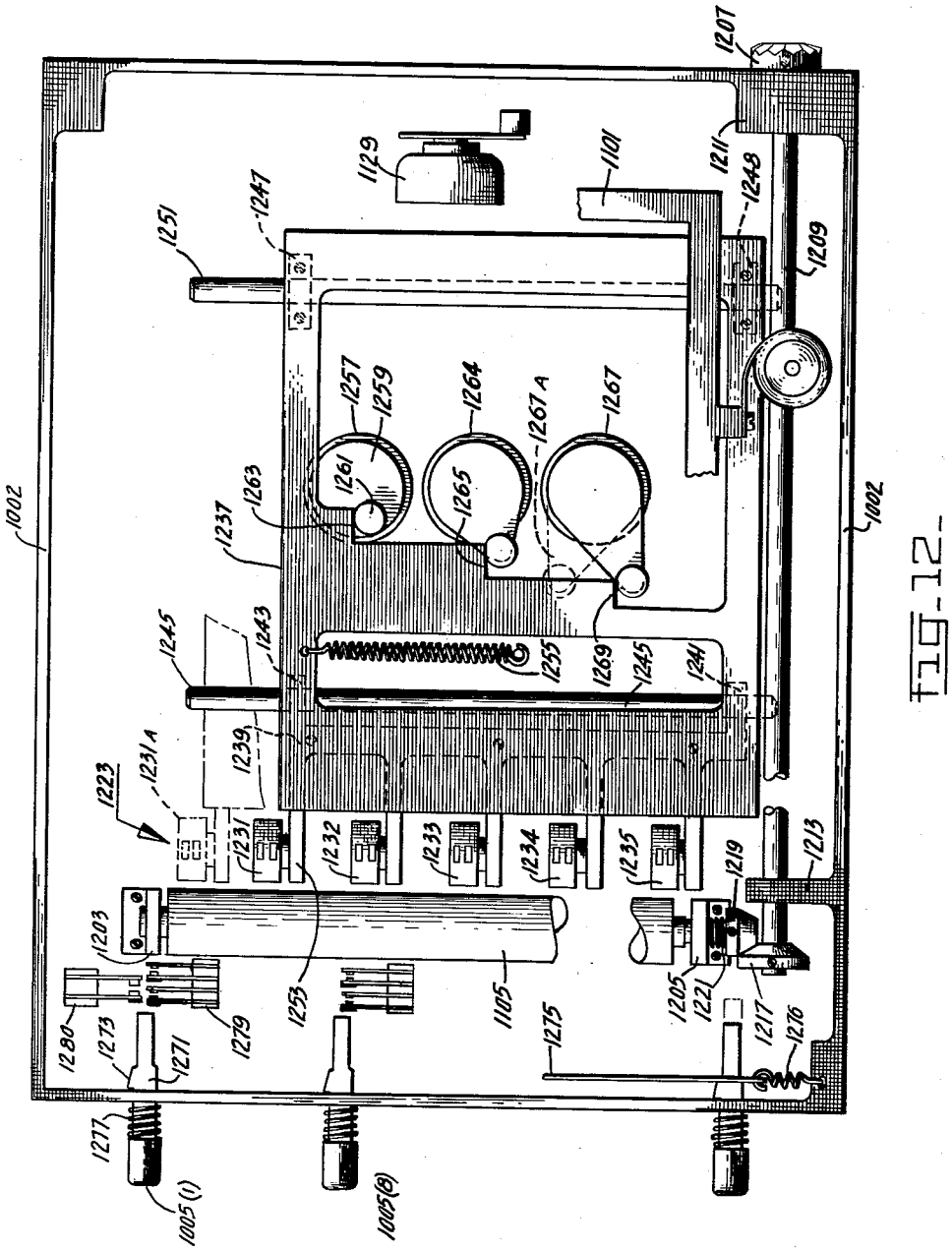

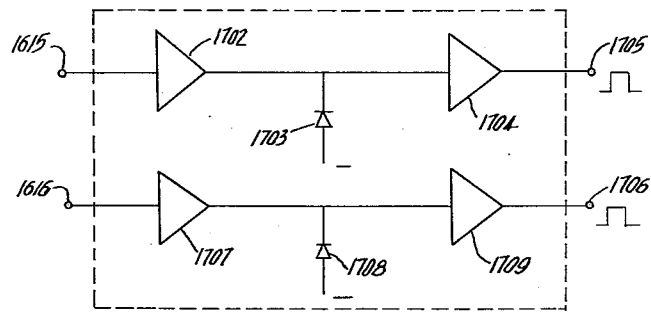
fig_17_
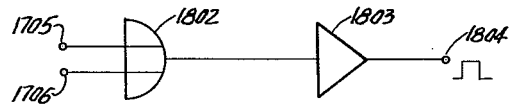
fig_18_
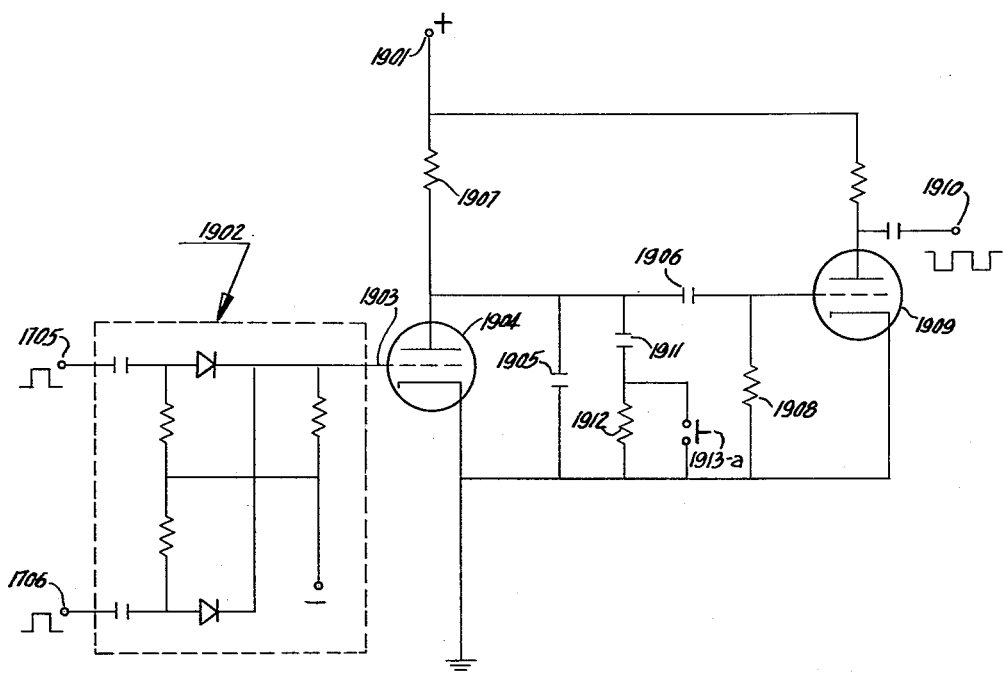
fig_19_

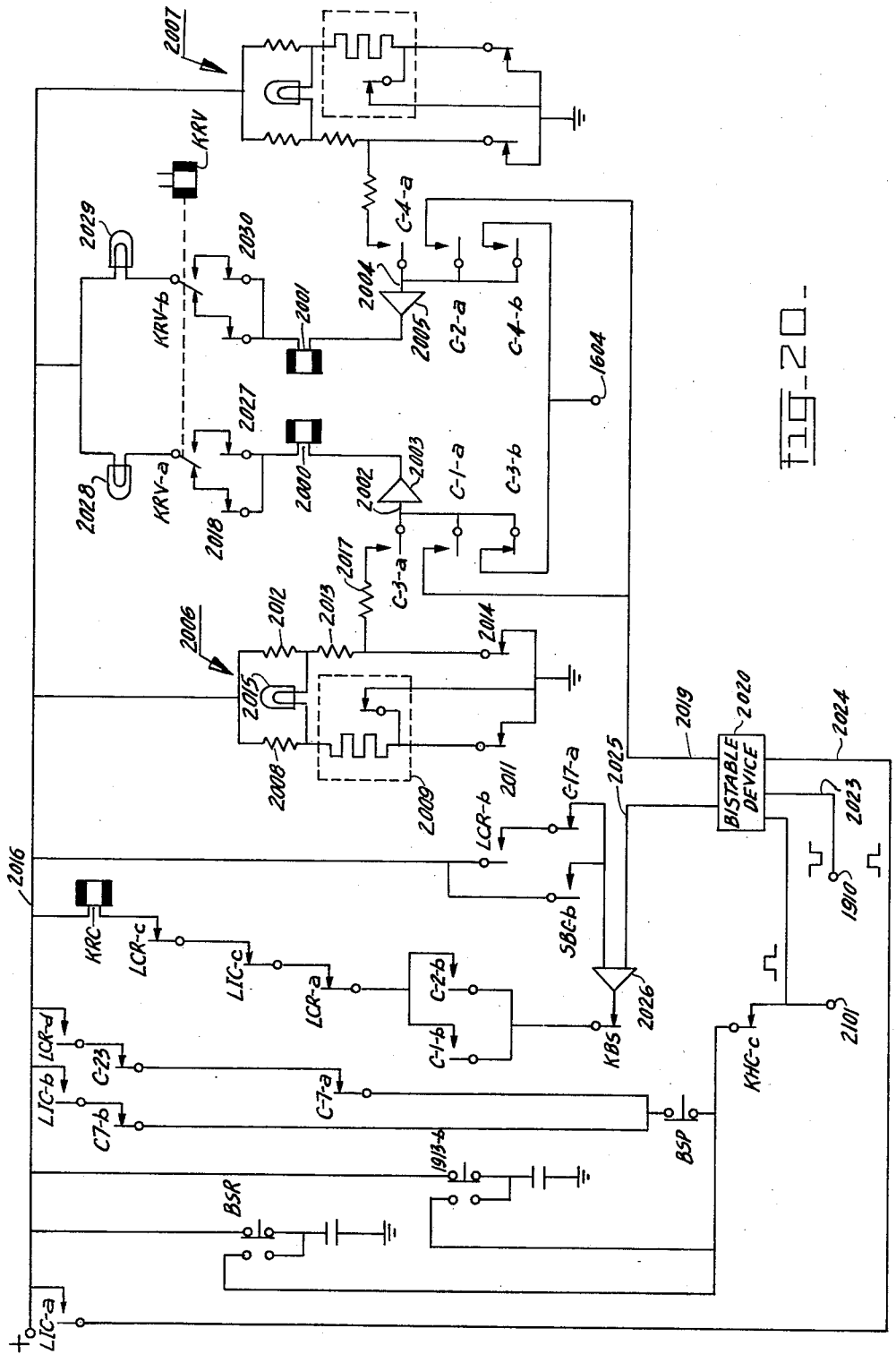

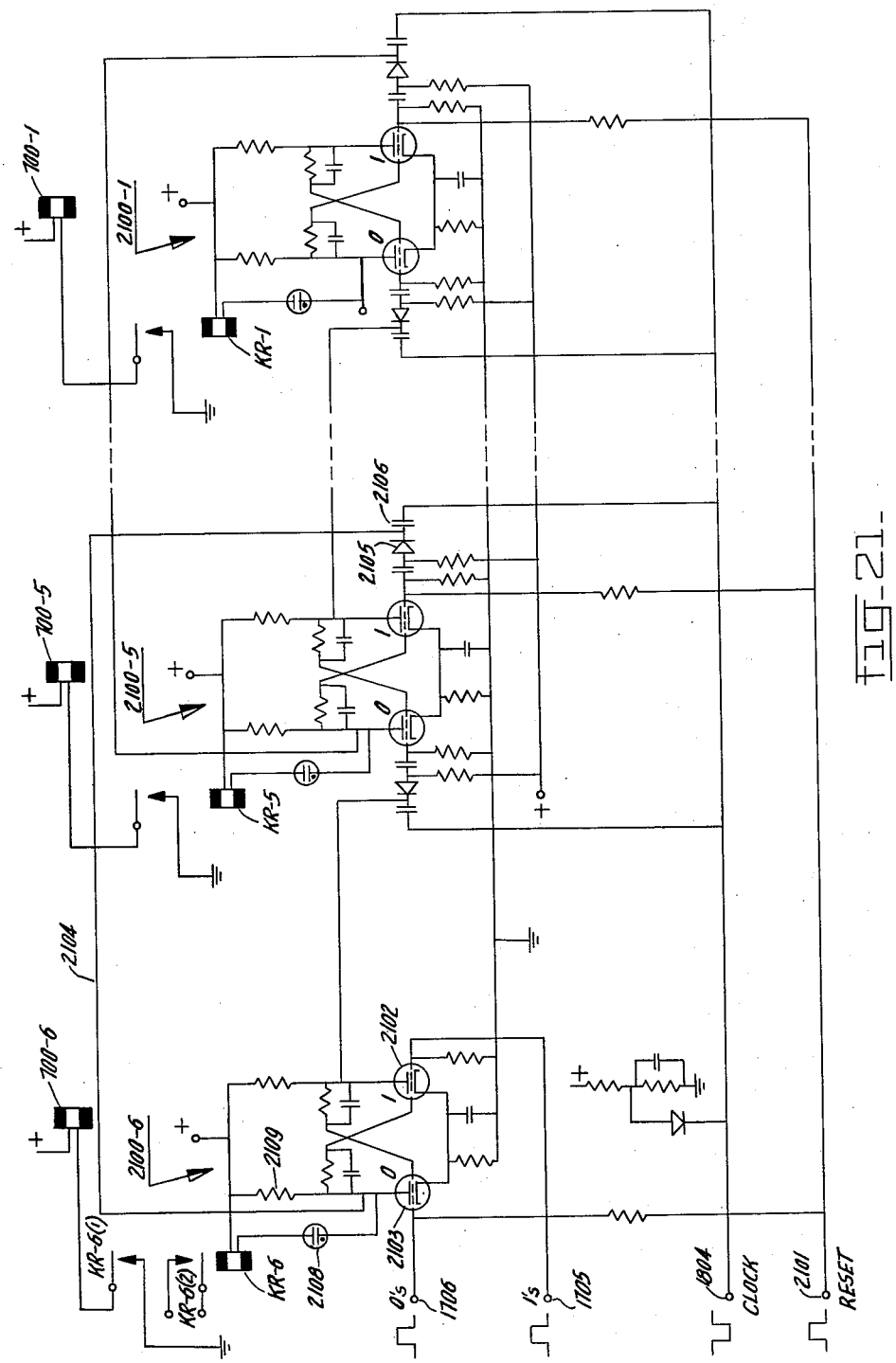

Fig. 23

| Switch Number | Commands | B-1 | B-2 | B-3 | B-4 | B-5 | B-A | B-B | B-C | B-H | B-J | B-H' | B-J' | B-RE |
|---|---|---|---|---|---|---|---|---|---|---|---|---|---|---|
| 1 | REPRODUCE FROM TRANSPORT 102 | | | | | | | | | | | | | |
| 2 | REPRODUCE FROM TRANSPORT 103 | X | | X | X | | | | X | | | X | X | |
| 3 | RECORD TO TRANSPORT 102 | X | X | | X | | | | | X | | | X | |
| 4 | RECORD TO TRANSPORT 103 | | | | | | | | | | | | | |
| 5 | PRINT | | X | | X | X | | | | | | X | | |
| 6 | KEYBOARD ENTRY | | X | | | | | | | X | | | | |
| 7 | STEP | | | | | | | | | | | | | |
| 8 | SELECT INSTRUCTION BAR B-1 | | | X | | | | | | | | | | |
| 9 | SELECT INSTRUCTION BAR B-2 | | | | | | | | X | | | | | |
| 10 | SELECT INSTRUCTION BAR B-3 | | X | | | | | | | | | | | |
| 11 | SELECT INSTRUCTION BAR B-4 | | | | | | | | | | X | | | |
| 12 | SELECT INSTRUCTION BAR B-5 | | | | | | | | | | | | | |
| 13 | CARRIAGE RETURN SELECTS INSTRUCTION BAR B-C | | | | X | | | | | | | | | |
| 14 | AUTOMATIC INSTRUCTION CHANGE | | | X | | | | | X | | | | | |
| 15 | BRANCH | X | | | | | | | | | | X | | |
| 16 | REVERSE | | | | | | | | | | | | | |
| 17 | VERIFY | | | | | | | | | | | | | |
| 18 | UPPER CASE | | | | | | | | | | | | | |
| 19 | BYPASS INSTRUCTION CHANGE CHARACTERS | | | | | | | | | | | | | |
| 20 | RECORD INSTRUCTION CHANGE CHARACTERS | | | | | | | | | | | | | |
| 21 | RECORD TAB AND CARRIAGE RETURN CHARACTERS | | | | | | | | | | | | | |
| 22 | SPACE NON-RECORD | | | | | | | | | | | | | |
| 23 | END OF RECORD | | | | | | | | | | | | | |

*Commands / Instruction Bars*

Fig. 23

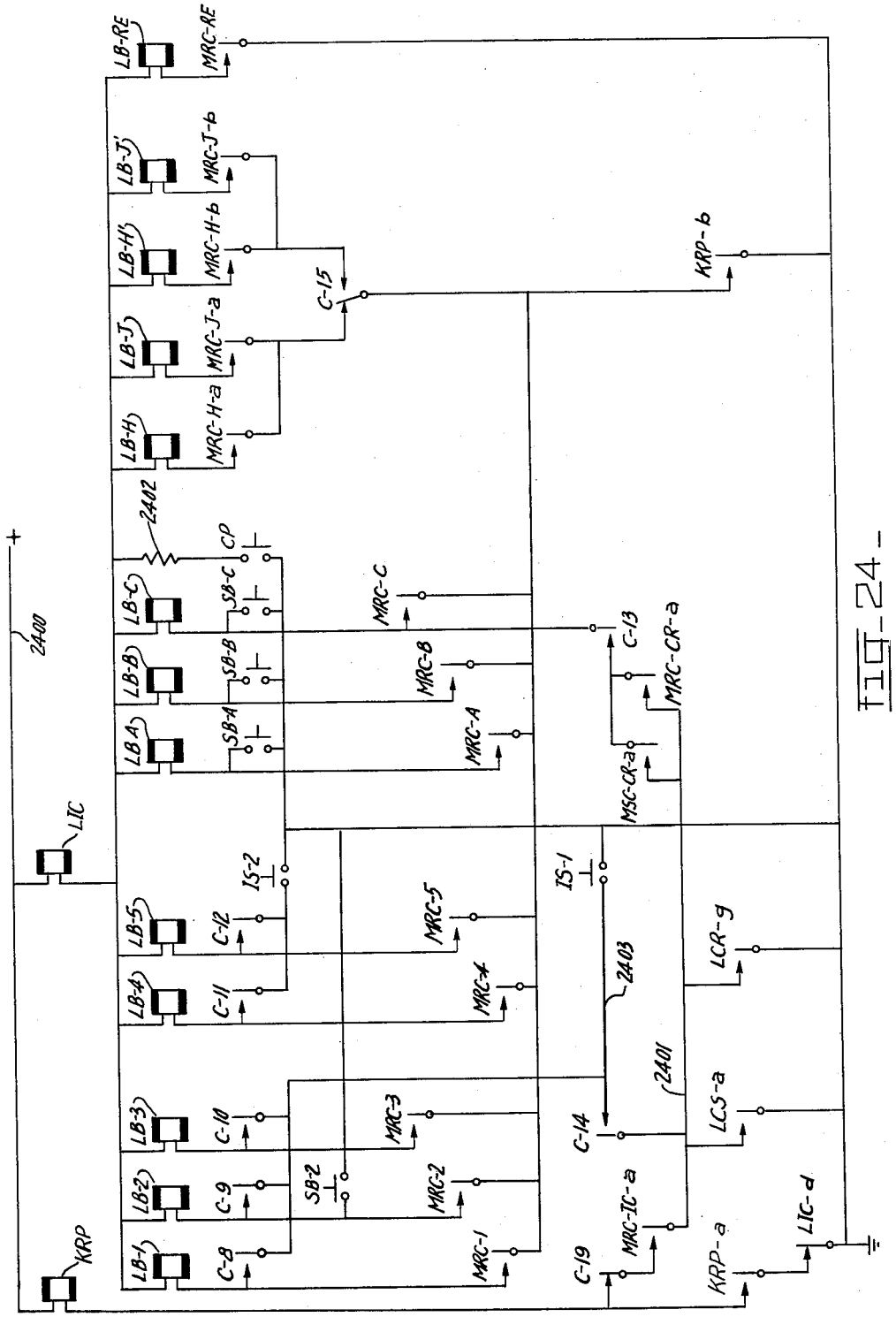
FIG-24-

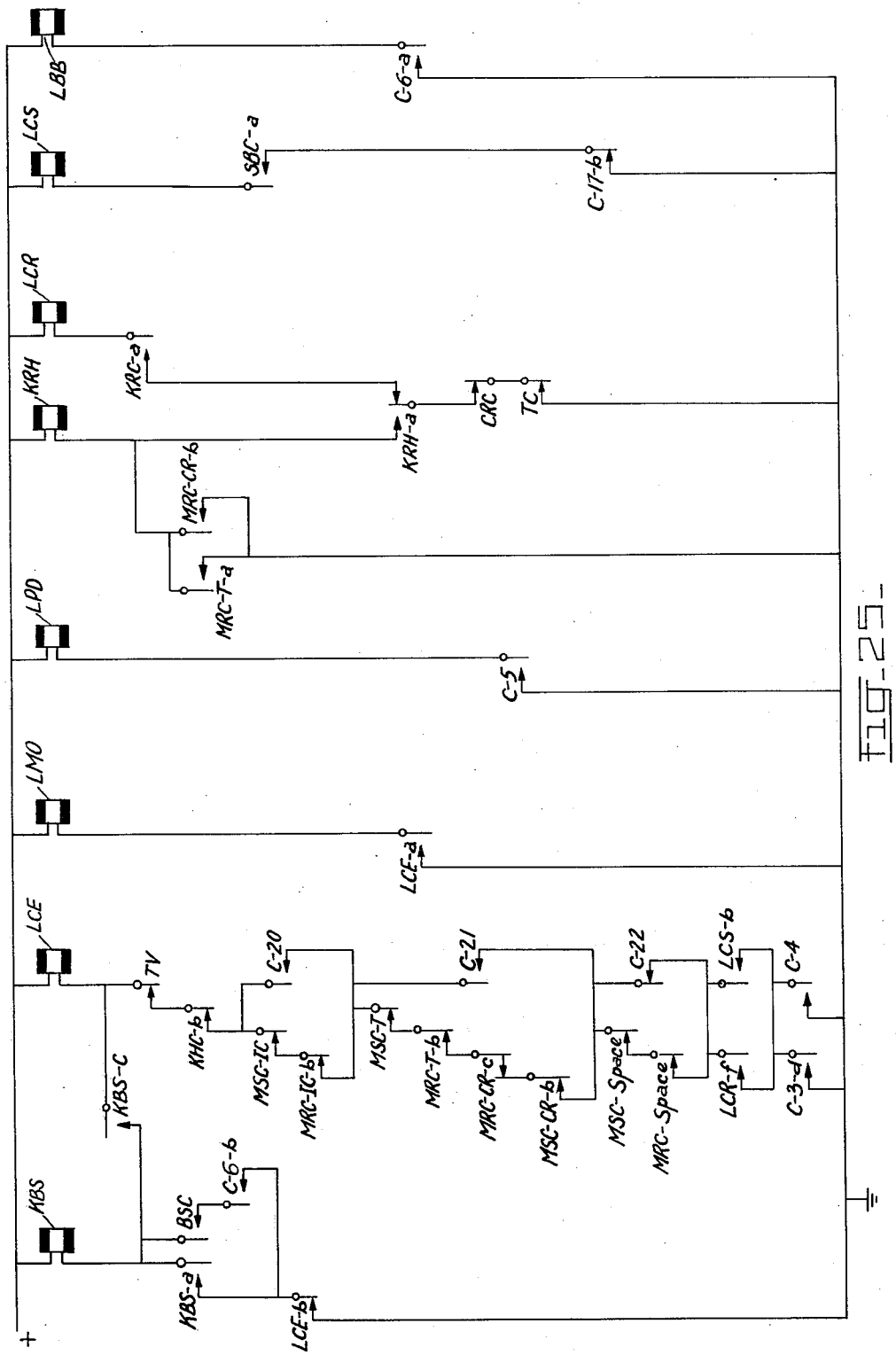

United States Patent Office 3,060,272
Patented Oct. 23, 1962

3,060,272
DATA PROCESSING SYSTEM
Stanley Harrison Bacon, San Pablo, John Efstathiou, Pleasant Hill, and George Boyd Greene, Kensington, Calif., assignors, by mesne assignments, to Smith-Corona Marchant, Inc., Syracuse, N.Y., a corporation of New York
Filed Sept. 2, 1958, Ser. No. 758,520
47 Claims. (Cl. 197—19)

The invention relates to data processing systems which can be automatically or manually controlled according to a variety of programs. It particularly pertains to such a system including an electric typewriter and a data storage, from either of which data can be entered into the system and the results of such entries can be printed on a visible record at the typewriter and permanently stored in the data storage.

Semi-automatic machines have been suggested to fulfill the requirements of many business applications where rapid handling of repetitive transactions is desirable. Such transactions generally comprise entries of fixed or nonvarying information and changing or variable information. The fixed information is, for example, an account or catalog number; the variable information is, for example, the date or quantity. This particular type of business transaction is generally known as invoicing. Arrangements have also been suggested whereby customer invoice, shipping order, inventory, and other records are simultaneously prepared.

Since there are many types of business transactions, it is necessary to plan a machine or system to follow a predetermined program corresponding to the particular type of transaction under consideration. The prior art arrangements for changing programs involve considerable intricacy, frequently calling for factory modification of the machine; whereas it is desirable, if not economically necessary as well, that a large number of programing possibilities be available to a relatively unskilled operator.

An object of the invention is to provide an improved automatic data processing system having means for convenient and flexible program change.

Another object is to provide an improved recording apparatus for recording character representations on a storage medium in accordance with the manual depression of a typewriter key.

Another object is to provide an improved reproducing apparatus for reproducing information from a storage medium and for operating a printing mechanism in accordance therewith.

Another object is to provide improved means for producing a verified record of information.

Another object is to selectively reproduce from and record on a record tape and/or record card.

Another object is to provide an improved device for developing character representing coded electric signals in response to depression of a typewriter key.

Another object is to provide an improved device for translating mechanical representations of characters to character representing coded electric signals and vice versa.

Another object is to cause a change of instructions selectively in response to the detection of an instruction change character reproduced from a storage, in response to the depression of an instruction selection button and in response to a programmed automatic instruction change.

Another object is to provide an improved relay operating circuit.

A data processing system according to the invention includes an information storage, one portion or channel of which generally carries fixed information concerning the particular transactions being performed. A program unit is provided for controlling the step-by-step operations of the system by setting up the appropriate circuits for carrying out the various functions of the transaction in predetermined sequence. The program unit is arranged automatically to set up the appropriate circuits to cause the reproducing of the required fixed information at the proper time and to cause the printing of the same at a typewriter. When variable information, such as names or dates, is to be entered, the program unit is arranged automatically to set up the appropriate circuits to condition the system for manual entry at the typewriter. Another portion or channel of the storage is generally provided to store a record of selected portions of the transactions entered from storage or at the typewriter, for subsequent use, for example, in up-dating inventory.

In order to make a wide variety of programs readily available for handling the large number of transactions encountered, it is provided that the control elements of the program unit are readily removable and replaceable as a unit. Thus, a number of these control element units may be kept on hand, each set up to control the system through a particular type of transaction.

The storage for the fixed information is preferably in the form of record cards. A card capsule is provided into which a card is placed for reproducing the selected information and from which the card may be conveniently removed and replaced with another.

The storage for the record of the transactions is preferably in the form of record tape contained in interchangeable tape capsules.

Transports are provided for receiving and driving the card and tape capsules.

To enable one skilled in the art more readily to practice the invention, an express embodiment thereof, given by way of example only, is described hereinafter with reference to the accompanying drawing in which:

FIG. 1 is an illustration of a physical structure according to the invention;

FIG. 2 is a functional diagram of a data processing system according to the invention;

FIG. 3 is a schematic diagram illustrating the underlying principles of a matrix mechanism according to the invention;

FIG. 4 is a right sectional view of the matrix mechanism showing portions of the mechanism operative during a sending cycle according to the invention;

FIG. 5 is a front sectional view of the right end of the matrix mechanism with portions removed and showing the relationship of the matrix with a group of matrix output switches according to the invention;

FIG. 6 is a right side view of the matrix mechanism illustrating the setting of the matrix output switches according to the invention;

FIG. 7a is a top view of the left end of the matrix with portions removed and showing the relationship of the matrix with a group of matrix input magnets according to the invention;

FIG. 7b is a front view of a portion of FIG. 7a illustrating the setting of a group of matrix bars during a receiving cycle according to the invention;

FIG. 8 is a front sectional view of FIG. 7a of the left end of the matrix mechanism with portions removed and illustrating the setting of the matrix bars during a receiving cycle according to the invention;

FIG. 9 is a right sectional view of the matrix mechanism showing portions of the mechanism operative during a receiving cycle according to the invention;

FIG. 10 is exterior perspective view of a magnetic card capsule with a portion broken away according to the invention;

FIG. 11 is a view of a magnetic card showing the relationship of the card with a portion of the card capsule mechanism according to the invention;

FIG. 12 is a view showing the interior card capsule mechanism according to the invention;

FIG. 17 is a symbolic diagram of a pair of demodulators according to the invention;

FIG. 18 is a symbolic diagram of a clock generator according to the invention;

FIG. 19 is a schematic diagram of a gap detector according to the invention;

FIG. 20 is a schematic diagram of a clutch control circuit according to the invention;

FIG. 21 is a schematic diagram of a shift register according to the invention;

FIG. 23 is a program chart listing representative commands according to the invention;

FIG. 24 is a schematic diagram of an instruction bar selection circuit according to the invention;

FIG. 25 is a schematic diagram of relays and contacts used for controlling and synchronizing the operations of the system according to the invention;

Figure 13:
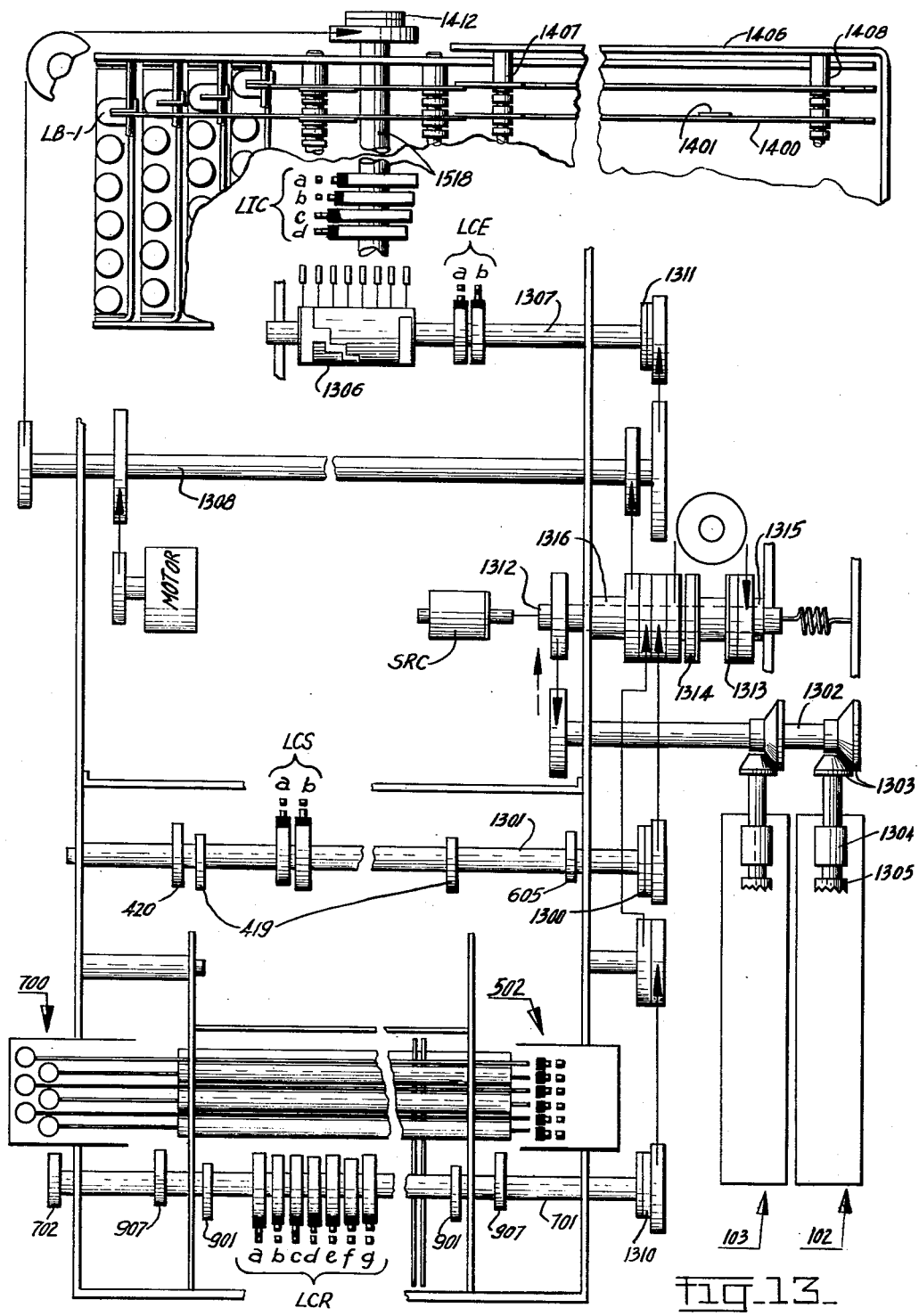
FIG. 13 is a top sectional view of the frame of the embodiment of FIG. 1 with portions removed and illustrating relationships among various parts of the embodiment according to the invention.

The data procssing system is shown in a cabinet in FIG. 1 and the major units of the system are shown in block form in FIG. 2. A typewriter 104, preferably electric, is judiciously placed forward in the cabinet for communicating directly with the remaining components of the system.

Located to the right of the typewriter keyboard is a data storage comprising means to receive and store data in some physical form. While punched cards, punched tape, wax records, and the like may be used, magnetic material preferably is used as the storage medium. The preferred storage comprises a magnetic tape capsule 100 and magnetic card capsule 101, and transports 102 and 103 for receiving and driving the capsules. By depressing a key at the typewriter keyboard, a magnetic representation of the key symbol can be recorded in storage on the magnetic medium in either the tape or card capsule.

The card capsule 101 is slotted and magnetic cards, each carrying a plurality of information channels, may be speedily removed and replaced in the capsule slot by the operator. Each channel of information may be selected by a corresponding channel select button at the front of the capsule. The magnetic cards are preferably used to provide fixed data for entry into the system. A card drive roll in the card capsule is driven by a shaft extending through the capsule to a mating drive coupling of the transport.

Magnetic tape and a record-reproduce transducer are sealed in the tape capsule 100. The tape capsule is preferably used to store a record of the transactions. A drive shaft extends through the capsule to connect to a mating drive coupling of a transport.

The transports respectively include a magnetic clutch which connects a continually rotating shaft with the drive couplings of each transport. The transports are adapted to receive the card or tape capsules interchangeably.

In order to record in storage a representation of the character of a depressed typewriter key, coded electric signals representing the character are developed in response to depression of the key. A translator 200 (FIG. 2) and a commutator 201 cooperate to develop these pulses.

The translator is preferably a mechanical matrix and is located below the typewriter keyboard. It comprises a plurality of matrix bars, one for each bit of the code. However, an electric matrix may be employed, if desired, by application of known principles and the teaching herein. The depressed typewriter key actuates a corresponding sensing bar which adjusts a group of matrix switches in parallel to represent the character. As the commutator is rotated through a single cycle, a potential is serially applied from the commutator 201 to each of the switches to convert the parallel multi-bit character code represented by the matrix switches to a series of electric pulses.

The coded serial pulses are transmitted to a group of record-reproduce contacts 206. Unit and naught pulses are transmitted over separate leads as indicated in FIG. 2. The condition of the contacts 206 determines to which of the transports and therefore to which of the capsules the coded pulses are transmitted. Normally, one capsule is used to record data and the other to reproduce data previously recorded. Since either capsule can be used in the performance of either of these functions, the contacts 206 are required for connecting the capsules to the appropriate circuits of the system. Thus, the unit and naught pulses from the matrix switches are transmitted to whichever capsule is used for recording, preferably the tape capsule 100, where the unit pulses are transduced to a units track and the naught pulses are transduced to a naughts track.

During the recording of a character in the tape capsule, the tape must be in motion. At the beginning of rotation of the commutator, just before the character pulses are developed, a potential is applied from the commutator to a clutch control circuit 205. As long as this potential is applied to the clutch control circuit, the clutch control circuit supplies power to the magnetic clutch of the transport 102. This causes the tape to move so that the character pulses can be discretely recorded on the tape. As long as the pulses are developed, the potential from the commutator is applied to the clutch control circuit so that the tape continues to move. After the last pulse is developed, the potential from the commutator to the clutch control circuit is removed thereby causing the tape to stop.

After depression of the next typewriter key, the matrix switches are again set and the corresponding character pulses developed as before. Since the tape begins moving before the pulses are developed, a space or gap occurs between the character groups as they are recorded on the tape. This gap is useful when the characters are subsequently read as hereinafter explained.

When characters are reproduced from the capsule 101, the magnetic clutch in the transport 103 is energized to supply power to move the card. This permits the magnetic character representations on the card to be transduced to a series of coded electric pulses. These pulses are transmitted through the record-reproduce contacts 206 to a pair of demodulators 202, one demodulator for the unit pulses and one for the naught pulses. Each demodulator amplifies, clips, and shapes the pulses applied to it. From the demodulators, these serial pulses are transmitted to a buffer storage comprising shift register 203. The shift register stores a representation of each pulse applied to its input until all of the pulses of a group representing a character reproduced from storage have been applied. When the shift register contains all of the representations of the character reproduced from storage, the representations are transferred in parallel to the matrix so that the condition of the matrix represents the character.

The character represented by the matrix can also be represented by coded serial pulses developed by the commutator and matrix switches as in the case of a depressed typewriter key. These pulses can also be transmitted to storage as before. In addition, the character representation transferred to the matrix from the shift register can be printed at the typewriter as well as, or instead of transmission to storage. In either case, the matrix sensing bars are urged to pass through the matrix. However, the condition of the matrix is such as to allow only the bar corresponding to the character represented by the condition of the matrix to pass. This sensing bar actuates the corresponding key bar of the typewriter to print the character reproduced from storage. Thus, a character reproduced from storage can be printed at the typewriter and/or transmitted to storage.

As mentioned previously, the magnetic representations are recorded in storage so that a space or gap occurs between each character representation. Thus, when a character is reproduced from storage, a gap occurs after each group of pulses representing the character. These pulses, in addition to being applied to the shift register, are applied to a gap detector 204. The gap detector detects the gap occurring after each character group of pulses. This causes transmission of a pulse from the gap detector output to the clutch control circuit 205.

In response to the gap detector pulse, the clutch control circuit breaks the circuit supplying power to the magnetic clutch of the transport 103 thereby stopping the motion of the magnetic medium and hence delaying the reproducing of the next character. This delay provides time for the character representations in the shift register to be transferred to the matrix.

After transfer to the matrix of the character representations, a pulse is transmitted from the matrix to the clutch control circuit. This pulse places the clutch control circuit in a condition to supply power to energize the magnetic clutch in the transport 103 thereby causing the card to move and therefore, the next character to be reproduced.

From the preceding discussion of the data processing system, it is apparent that data can be entered into the system at the keyboard character by character, that data so entered can be recorded in storage character by character, that data can be reproduced from storage character by character, and that data so reproduced can be printed at the typewriter and/or recorded in storage character by character. The character by character nature of the data processing system permits automatic control of the system by control characters reproduced from storage. Thus, control characters reproduced from storage can determine the functions that the system can perform, i.e., whether subsequent data is entered into the system at the keyboard or from storage and whether the data is sent to the typewriter and/or storage.

The control characters are serially reproduced from storage and transferred to the matrix in the same manner as other data. However, when the sensing bars corresponding to the control characters are passed through the matrix, the sensing bars actuate switches which control the operation of a program unit 207. The program unit, in response, selects the functions the system can perform. Thus, control characters in conjunction with the program unit can determine which functions the system is to perform.

The program unit comprises a plurality of electromechanically selected instruction bars. A pair of control characters correspond to each bar so that the reproducing from storage of a pair of control characters causes the corresponding bar to be selected. Each bar can be coded by placing removable command tabs at selected locations along the length of the bar. When a bar is selected, each tab actuates a group of command switches. Each group of actuated command switches conditions the system to perform a function. Thus, a command, as used herein, is an expression of a coding of the program unit that conditions the data processing system to perform a corresponding function. One or more commands can be coded on a bar to form groups of commands. The group of commands coded on a bar are referred to, herein, as an instruction. Thus, each bar of the program unit represents an instruction.

The instruction bars, in addition to being selected in response to reproduced control characters, can be selected in two other ways: manually by depression of a button of a control board 105 (FIG. 1) and by coding an automatic instruction change command on an instruction bar.

A prearranged sequence of instructions and the mode of selecting the instructions according to which the system carries out a particular transaction or routine is defined herein as a program. Thus, during a program, various parts of the system are conditioned by the actuated command switches to perform the instruction selected at the program unit. For example, an instruction bar selected at the program unit having the instruction comprising the commands "reproduce from transport 103" and "print at the typewriter 104" coded thereon, conditions the system in the following manner. The record-reproduce contacts are actuated to connect the output of the transport 103 to the demodulators. The clutch control circuit is conditioned to supply power to the magnetic clutch at the transport 103 at the proper time. The clutch control circuit is also conditioned to initiate transfer of characters represented by the matrix to the typewriter at the proper time. The typewriter is conditioned to receive the character representations from the matrix and to print the characters so received. Thus, characters reproduced from the card in the capsule 101 are printed by the electric typewriter. These functions continue until the next instruction bar is selected which may, for example, comprise the commands "reproduce from transport 101" and "record to transport 100."

The program unit, therefore, provides a flexible and versatile means for controlling the sequence of functions to be performed by the system in carrying out various transactions.

Before presenting an example of operation for a specific program, it is desirable to describe the various elements composing the data processing system and to point out their interrelationship.

Typewriter

The keyboard and carriage of the typewriter are shown in FIG. 1. The matrix (not shown here) is below the keyboard and there is a mechanical connection between the typewriter and the matrix. The key levers of the typewriter are each connected by means of a key link to the matrix which is mounted on the machine frame beneath the typewriter. This connection to the matrix is the only connection from the typewriter to the other mechanism of the system. Thus, the typewriter mechanism can be any common type as, for example, the electric typewriter mechanism shown in FIG. 3 in the United States Patent No. 2,700,421, issued January 25, 1955, to E. O. Blodgett. In FIG. 3 of the Blodgett patent, a key link can be connected to a key lever 27. This connection is shown in FIG. 4 of the present invention in which a key link 405 is mounted on a pin 428 of a key lever 406, which corresponds to the lever 27 in the Blodgett patent.

Matrix

The matrix performs two functions. In response to the depression of a typewriter key, character representing coded electric signals are developed and transmitted to storage. This is accomplished in general as follows. As previously mentioned, the matrix includes a plurality of matrix bars, one for each bit of the code employed. In the illustrated embodiment a six bit code is used and, therefore, there are six matrix bars 401 (FIG. 4) in two groups of three each. Situated between the two groups of matrix bars and transverse thereof are the sensing bars 403. An individual sensing bar is associated with each key of the keyboard. However, all sensing bars are identical except for being connected to different keys. When a key is depressed, the associated sensing bar is moved into engagement with the matrix bars and certain of the matrix bars are subsequently rotated, as is more fully described hereinafter, in accordance with the coding for the character corresponding to the depressed key. Associated with each matrix bar is a respective output switch which is adapted to be actuated upon rotation of the matrix bar. Through the agency of the previously mentioned commutator, a pulse is applied to each output switch in timed sequence. The condition of the switches determines the coding of the pulses, i.e., an actuated switch allows passage of the applied pulse to a units output and a nonactuated switch allows passage of the applied pulse to a naughts output. The serial pulse train thus developed is therefore a coded representation of the character corresponding to the depressed key. This action is defined as a sending cycle and it is performed in response to depression of a typewriter key when a record command is coded on the instruction bar in control of the system.

In response to the receipt of character representing coded electric signals from storage, the matrix acts to actuate the typewriter key corresponding to the coded character. The coded signals are received serially from storage and are fed into the buffer storage which, in the illustrated embodiment, is a shift register. Each stage of the shift register controls a respective matrix solenoid. Thus, the character representing coded signals are converted from serial to parallel form. The solenoids in turn cause respective matrix bars to be actuated in a manner presently described, thus setting up a mechanical representation of the character. The previously mentioned sensing bars are then urged as a group into sensing relation to the matrix bars. Only the sensing bar corresponding to the character mechanically represented by the matrix bars is free to move; the others are blocked. The sensing bar which is free to move normally causes the actuation of an associated typewriter key, thus causing the printing of the character. This action is defined as a receiving cycle and it is performed in response to selective energization of the matrix solenoids when a reproduce command is coded on the instruction bar in control of the system.

It should be noted that during a receiving cycle the output switches are set up in a representation of the character as in the previously described sending cycle. The switches may be scanned by pulses from the commutator to send a pulse train representative of the character to storage, thus carrying out a reproduce, record, and print instruction. Means presently described are provided to inhibit the printing of the character when print-out is not desired and a reproduce and record instruction is to be performed.

Perferred matrix mechanisms that operate during a sending cycle are shown in FIG. 4, FIG. 5, and FIG. 6. The setting of the matrix output switches in response to manual depression of a typewriter key, i.e., a sending cycle, is accomplished in the following manner:

A key link 405 (FIG. 4) connects a key bar 406 to the matrix. A blocking bail 407 normally underlies a tab 410 of each key link and prevents any downward motion of the key links so that the typewriter keyboard is normally locked. When an instruction including a "keyboard entry" command is in control of the system, a solenoid is energized which causes the blocking bail 407 to rock counterclockwise about a pivot 408 until it is limited by a bifurcated extension straddling a shaft 409. In this position the blocking bail is out from under the tabs 410 and the keyboard is unlocked.

When a key is depressed, the key link 405 moves downward so that a nose 415 on the key link passes below an ear 416 on the upper edge of the sensing bar 403. The nose 415 is moved to the right by the urging of a key link spring 414. The nose 415 is positioned thereby under the ear 416 and the key link 405 is thereby held in the depressed position. A trip lever 411 is pivoted to the sensing bar 403 at a stud 412. A torsion spring on the stud 412 urges the trip lever in a counterclockwise direction about the stud 412. An ear 413 on the trip lever 411 extends through a slot on the right end of the sensing bar 403.

In moving downward the nose 415 depresses the ear 413 and causes the trip lever to pivot clockwise about the stud 412. This action causes the trip lever nose 417 to rock a sending cycle bail 418 upward to close a pair of sending bail contacts SBC-*a* and SBC-*b*. A circuit is completed through the contacts SBC-*a* to a sending clutch magnet LCS (FIG. 25). The magnet LCS is energized thereby to release a one cycle sending clutch 1300 (FIG. 13) for engagement. The clutch 1300 drives a sending shaft 1301 (FIG. 4 and FIG. 13) through a single cycle of rotation. Dual sending cams 419 (FIGS. 4 and 13) and a latch cam 420 mounted on the shaft 1301 are rotated whenever the clutch 1300 is engaged. The cam 419 shown in FIG. 4 operates a cam follower 421 and the cam 420 operates a cam follower 422.

The follower 421 is pivoted at 423 and is connected to a sending bail 424 by a sending bail link 425. The sending bail 424 runs the length of the matrix and is to the left of each sensing bar nose 417. The sending bail 424 is pivoted at a pin 426 and is connected to the sending bail link 425 at a pin 427. The sending cam 419 moves the send bail linkage so that the bail 424 rocks counterclockwise soon after a typewriter key is depressed.

Since the trip lever 411 is positioned directly in the path of the sending bail 424, the sending bail engages the trip lever nose 417 and moves the trip lever and attached sensing bar 403 to the right. The key link 405 also moves to the right under the tension of the spring 414. As the key link moves rightward, it rocks about the pin 428, until the right edge of the key link abuts the left face of the blocking bail 407 so that the nose 415 is forced from below the ear 416 as the bar 403 continues its rightward movement. This action allows the key link to rise under urging of a key bar spring 429.

When the sensing bar 403 is fully translated to the right, the latch cam 420 on the sending shaft 1301 rocks the latch cam follower 422 counterclockwise. A latch bail 430 is connected by a latch bail link 431 to the follower 422. The latch bail 430 is located lengthwise along the matrix and is pivoted at the pin 408. Movement of the linkage 431 by the follower 422 causes the bail 430 to rock counterclockwise and move upward to the left side of a nose 432 on the translated sensing bar. The latch bail thus holds the sensing bar 403 in the translated position when the sending bail 424 is retracted from the trip lever nose 417. The sensing bar 403 has six sending teeth (the left tooth of each pair 404). In the translated position, each of the sending teeth are immediately to the left of the corresponding matrix bar.

In order to understand the underlying principles of the matrix, reference is made to FIG. 3 in which the six matrix bars 401-1 through 6 are partially shown. Each matrix bar is an elongated bar with pairs of tooth positions along its length. The corresponding tooth positions of the six matrix bars are ordinally arranged to lie along straight lines S and R. Each pair of tooth positions is designated to represent one of the bits of a six bit character code. Thus, the arrangement of teeth along a straight line represents one of the characters. In FIG. 3*a*, four characters such as A, B, C, and D can be represented by the tooth positions in the corresponding columns. The left tooth position of each pair is used in representing the character during a sending cycle. (The right tooth positions are sensed during a receiving cycle to determine which character is represented by the matrix, as is more fully explained hereinafter.)

If the key A is the depressed key, the sensing bar 403 (FIG. 4), associated with the key A is translated so that the sending teeth on the sensing bar are adjacent to corresponding tooth positions of the matrix bar along a sending line S in the column A (FIG. 3a).

Next, the matrix bars are urged to rotate in a manner presently described. Since a sensing bar tooth abuts a matrix bar tooth on the bars of orders 2, 3, 4, and 5 (FIG. 3a) these matrix bars are prevented from rotating. However, there is a tooth missing on the first and sixth order bars along the line S so that these bars are allowed to rotate. A switch 502 (FIG. 5) located at the end of each matrix bar is actuated whenever the bar is rotated. An actuated switch represents a unit and a non-actuated switch represents a naught. As indicated at each tooth position, column A (FIG. 3a) from top to bottom, the character code for the letter A is 100001. Thus, this code is represented by the combination of actuated switches at the end of the first and sixth order bars and the non-actuated switches at the end of the second, third, fourth, and fifth order bars whenever the typewriter key A is depressed.

Rotation of the matrix bars and the subsequent setting of the matrix output switches is accomplished in the following manner:

Each upper matrix bar carrier such as 402–1 (FIGS. 4 and 5), carries a lever 600–1 (FIG. 6) which is urged by a spring such as 601–1 attached to the framework in the clockwise direction. The levers 600 are normally prevented from rocking by engagement with notches on a release bar 602.

Each lower matrix bar carrier such as 402–2 (FIGS. 4 and 5), carries a lever 600–2 which is urged by a spring such as 601–2 to rock in the counterclockwise direction. The lower levers are also prevented from rocking by engagement with notches on the release bar 602.

A switch lever 501 (FIG. 5) is pivoted on a shaft 505 directly over the end of each upper matrix bar carrier 402. Each of the three upper sewitch levers is urged by a torsion spring mounted on the shaft 505 to rotate in the clockwise direction.

A lower switch lever 506 pivoted on a shaft 507 is positioned directly over the end of each lower matrix bar carrier. Each of the three lower switch levers is urged to rotate in the counterclockwise direction by an individual torsion spring mounted on the shaft 507.

Each switch lever carries a foot 508 which engages and actuates a respective switch 502, when the lever is rocked. Each switch lever also carries a short tab 509 which projects to the left beside the associated matrix bar 401.

The carrier levers 600 (FIG. 6) are released simultaneously during rotation of a matrix bar release cam 605 on the sending shaft 1301. The matrix release bar 602 is shifted leftward to release each carrier lever when a follower 606 linked to the bar 602 by a link 607 follows to low cam.

The upper carrier lever 600–1 (FIG. 6) is positioned above the tab 509–1 on the upper switch lever so as to cause the tab 509–1 to move downward when the associated carrier 402–1 is rotated clockwise. Such movement of the tab causes the switch lever 501 to rock about shaft 505 and actuate the corresponding switch 502. The lower carrier lever 600–2 is positioned below the lower switch lever tab 509–2 (FIG. 6) so that counterclockwise rocking of the lower matrix bar carrier levers causes the switch lever 506 (FIG. 5) to rock about the shaft 507 and actuate the corresponding switch 502.

Movement of the release bar 602 allows each of the matrix bar carriers 402 to rotate and actuate a switch if the associated matrix bar is not held from rotating by a matrix tooth abutting a sensing bar tooth. Therefore, a switch 502 is actuated for each unit in the character code, and a switch 502 remains unactuated for each naught in the character code.

Near the end of a sending cycle, the bail 430 (FIG. 4) is returned to its normal position, thereby releasing the sensing bar 403 to return to its normal position under the tension of a spring 433.

In order to retain the matrix output switches actuated while a pulse is applied to each switch in time sequence by the commutator (as fully explained hereinafter), an output magnet LMO (FIGS. 5 and 25) is provided. The magnet is energized after the switches are actuated. An armature 514 is attracted to the magnet so that a tip 515 is positioned directly behind the feet 508 of the individual switch levers. The switches are maintained in their actuated condition until the magnet LMO is de-energized at the end of the sending cycle.

Thus, in response to depression of a typewriter key, the matrix output switches are placed in a coded condition corresponding to the character represented by the depressed typewriter key.

Preferred matrix mechanisms that operate during a receiving cycle are shown in FIG. 7a, FIG. 7b, FIG. 8, and FIG. 9.

The setting of the matrix output switches and the automatic depression of a typewriter key in response to a gap detector signal and to selective energization of the matrix solenoids by coded electric signals during a receiving cycle is accomplished in the following manner:

The coded signals are applied in parallel to six matrix input magnets 700 (FIGS. 7a and 13) and the magnets are thereby selectively energized. Following selective energization of the magnets, a receiving shaft 701 (FIGS. 7a and 7b) is rotated. A cam 702 mounted on the shaft 701 rotates with the shaft thereby causing a cam follower 703 to rise. The follower is pivoted at 704. A tip 705 of the follower underlies an extension of an input bail 800 (FIGS. 7a, 7b and 8). The input bail is pivoted to the framework at pin 801. The bail extends the length of the end of the matrix and is positioned adjacent to a group of six matrix input slides 802 and 803. An upper matrix input slide 802 is associated with each of the three upper magnets 700–2, 700–4, and 700–6. A lower matrix input slide 803 is associated with each of the three lower magnets 700–1, 700–3, and 700–5. The matrix input slides are mounted on a right guide shaft 804 and a left guide shaft 805. It should be noted in FIG. 8 that the body of the lower slide 803 is identical and congruent to the body of the upper slide 802.

The upper slides each have a projecting tab 806 on the upper edge which is positioned below and to the left of a tip 807 on an armature 808 associated with each upper magnet. The upper slides each have an ear 809. A hook 810 on the left end of the three upper matrix bars engages a corersponding ear 809. Each matrix bar 401 is urged toward the right by a spring 811 attached between the matrix bar and the matrix bar carrier 402. Each carrier 402 is journaled in a frame plate 812.

The lower slides (FIG. 8) each have a projecting tab 813 on their lower edge which is positioned below and to the left of a tip 814 on each armature 815 associated with each lower magnet. The lower slides each have an ear 816 which is engaged by the hook 817 of the corresponding lower matrix bar. Each lower matrix bar is urged toward the right by a spring 818 connected to the corresponding matrix bar carrier 402.

Energization of either an upper or lower matrix input magnet causes the corresponding tip 807 or 814 of the armatures to move to a position immediately to the right of the corresponding projecting tab 806 or 813. When cam follower 703 (FIG. 7b) rides to the high portion of the cam, the follower tip 705 (FIG. 8) is lowered. This allows the input bail 800 (FIG. 8) to rock in the counterclockwise direction. This releases all six slides for movement to the right under urging of the respective matrix bar springs. Each actuated armature tip 807 or 814 prevents the corresponding input slide from being moved to the right when the input slides are released.

Each unactuated armature tip does not engage the corresponding input slide so that the input slide and associated matrix bar are moved to the right. The input slides which move, are limited in rightward movement when they abut the rocked bail 800.

When an upper matrix bar 401 (FIG. 5) is shifted during a receiving cycle, the right end of each bar engages an ear 516. When a lower matrix bar is shifted, the right end of each bar engages an ear 517. Thus, rightward movement of a matrix bar rotates the engaged switch lever thereby actuating the corresponding switch 502. After actuation of the switches, the magnet 513 is energized so that the switches are latched in their actuated position.

Referring to FIG. 3b, if the solenoids are energized according to the code for the letter A, the first and sixth order bars are the bars that are actuated. (The switches are actuated whether the matrix bars are shifted or rotated.)

After the matrix bars are shifted, a matrix receiving bail 900 (FIG. 9) follows dual cams 901 (FIGS. 9 and 13) mounted on the receiving shaft 701. As a receiving bail follower 902 rides to the lower portion of the cam shown in FIG. 9, the receiving bail is rocked clockwise about a pivot 903. The receiving bail is normally positioned to the left of a shoulder 904 on each sensing bar. In rocking toward the left, the bail allows each sensing bar to move leftward under urging of the sensing bar spring 433.

As the sensing bars move leftward, the receiving teeth (the right tooth of each pair 404) of all the sensing bars interrogate all the matrix bars along the lines R (FIG. 3b). Since there are no matrix teeth to obstruct the sensing bar teeth along the line R of column A, the teeth of the sensing bar that corresponds to the character A represented by the selectively energized matrix magnets will pass through respective gaps in each of the six matrix bars. However, along the lines R of the columns B, C, and D (and all other character columns not shown) the respective sensing bar teeth will encounter one or more matrix bar teeth and thus be held from further leftward movement. The sensing bar A will move leftward until it abuts a stop bail 905 (FIG. 9).

It should be noted that a sensing bar moves in one direction when sensing along a line S and in the opposite direction when sensing along a line R. Thus, the teeth of a sensing bar and a matrix bar along the line S do not interfere when the tooth positions along the line R are being sensed and vice versa.

In moving to the left, the sensing bar ear 416 (FIG. 9) contacts the key link nose 415 so that the key link 405 is pivoted clockwise about pin 428. The tab 410 is moved thereby to the left from above the blocking bail 407. A key pull-down bail 906 is positioned across the matrix to the left of the key link 405. The pull-down bail 906 is operated by dual pull-down cams 907 (FIGS. 9 and 13) on the receiving shaft 701. A pull-down follower 908 is carried by a pull-down arm 909. The pull-down arm is pivoted at a pin 910 journaled in the frame. When the follower 908 rides to the low portion of the low cam, the pull-down bail 906 is rocked downward and engages a shoulder 911 on the key link. Since the key link 405 has rocked to the left with the sensing bar 403, the bail 906 engages only the shoulder 911 and no other key link shoulders. As the bail 906 moves down, it carries the key link 405 and the type bar 406. Movement of the type bar causes the typewriter mechanism to print the corresponding character.

A pull-down magnet LPD (FIGS. 9 and 25) is associated with the key pull-down bail 906 to normally prevent the bail from moving. When it is desired to print the character corresponding to the coded signals transmitted to the matrix as described above, it is necessary to energize the magnet LPD. An extension 913 of the pull-down arm 909 extends to the right from the arm pivot 910. The extension is urged in the clockwise direction by a spring 914. An armature 915 of the magnet is positioned by the spring 916 to underlie a shoulder 917 on the extension 913. When the magnet LPD is not actuated, the extension is held by the armature in the position shown. In this position the follower 908 on the arm 909 is prevented from following the pull-down cam 907 shown in FIG. 9. When the magnet LPD is energized, the armature 915 is removed from below the shoulder 917 and the pull-down bail 906 is allowed to follow the cam and engage the key link 405.

Thus, in response to selective energization of the matrix solenoids by character representing coded electric signals from storage, the setting of the matrix output switches and the automatic depression of a typewriter key for print-out of the character can be accomplished.

Card Capsule

A card capsule 101 is shown in FIGS. 1, 10, and 11. A card which bears both a printed and a magnetic record of fixed information and commands for a particular transaction may be placed in the card capsule. The fixed information and commands are reproduced from the card and transmitted to the matrix solenoids for transmission to various parts of the data processing system for controlling the operations of the system.

Particular groups of information and commands on a card are used whenever the corresponding transaction is performed. Groups of these commands are recorded on both sides of the card. The sides of the cards are identical with the lower part of the card bearing a coating of magnetizable material such as ferrite and the upper half providing space for a visual description of the transaction corresponding to the information recorded on the lower half. Since the cards are used repeatedly, it is convenient to make a large number of transactions available by placing the cards in a file for convenient manual selection without reference to an index. Thus, when a transaction is to be performed, a card, bearing the fixed information and commands corresponding to the transaction, is selected and placed in a slot in the top of the card capsule.

In the preferred embodiment, there are 20 parallel information channels on each side of a card. Each channel is comprised of two tracks, a units track and a naughts track. These channels are arranged across the length of the card. The channels of information are indexed on the upper half of the card with the index arranged to correspond to the twenty magnetic channels numbered consecutively from top to bottom.

A sample card 1103 (FIG. 11) shows several column headings for the index and description. However any arrangement or type of information may be placed in the information channels and have a corresponding index.

A card selected from the file is placed in a card receiving slot 1001 (FIG. 10) in the top of the card capsule. The slot 1001 is formed between a capsule base 1002 and a capsule cover 1003. The card is guided by the slot to enter a card carriage 1101 (FIG. 11). The card carriage is guided for horizontal movement within the capsule base. The carriage 1101 is shown in its initial position in FIG. 11. The leading edge of the card 1103 is to the left of a drive roll 1105 and abutting the left end of the carriage. From this initial position, the card and carriage are advanced leftward by the drive roll against a return spring 1107 whenever information is reproduced from the card.

The drive roll 1105 (FIG. 12) is mounted in the base 1002 and is oriented perpendicular to the direction of card movement. The drive roll is mounted in a bearing 1203 at its upper end and in a bearing 1205 at its lower end.

Power to rotate the drive roll is supplied by a transport 102 or 103 (FIGS. 1 and 13) through a gear such as 1305 which is coupled directly to a gear 1207 (FIG. 12) at the rear of the card capsule when it is inserted in the transport. Power is transmitted to the capsule in cyclic intervals through the agency of an electromagnetic clutch 1304 (FIG. 13), the energization of which is explained hereinafter. During each interval, the card is advanced to reproduce the six bits of one character. The gear 1207 (FIG. 12) is fixed to a drive shaft 1209 which is mounted on the base 1002 of the card capsule in a bearing 1211 near the right end and in a bearing 1213 near the left end of the shaft.

A pair of truncated friction drive cones 1217 and 1219, formed of resilient material, are used to transmit power from the drive shaft to the drive roll. The friction drive cones rather than bevel gears are used in the embodiment shown. In order to maintain frictional forces between the cones, a compression spring 1221 is placed between the roll cone 1219 and the lower bearing support 1205.

A pair of pinch rolls 1113 and 1115 (FIG. 11) are rotatably mounted in a framework 1117 which is pivoted on a shaft 1125 mounted in the card capsule cover 1003 as shown in FIG. 10. The left pinch roll 1113 (FIG. 11) is located adjacent and parallel to the drive roll and it serves to engage the card with the drive roll for positive translation thereof. The right pinch roll 1115 is parallel to the left pinch roll and located adjacent a column of transducer heads 1223 (FIGS. 11 and 12). It serves to keep the card firmly against the heads for reliable transducing. The pinch rolls are held in parallel spaced apart relationship by a pair of swivel-frames 1119 and 1121 (FIG. 11) located at each end of the rolls. The swivel-frames are each pivotally mounted on a stud 1123 located between the pinch roll end locations. The stud 1123 is carried by the pinch roll frame 1117. The pinch roll frame has a cross member 1127 located directly above a pinch roll frame rotary solenoid 1129. The solenoid is attached to the capsule base 1002 and carries an arm 1131. A roller 1133 attached to the arm 1131 engages the pinch roll frame cross member 1127 whenever the solenoid is energized. The frame rocks slightly in the clockwise driection about the shaft 1125 so that the pinch rolls press the card against the drive roll and the transducer heads.

There are five transducers located in the column 1223 (FIG. 12) which is parallel to and to the right of the drive roll. These heads are numbered consecutively from top to bottom as follows: 1231, 1232, 1233, 1234, and 1235. Means are provided to selectively position the heads to any of four positions whereby each head can transduce information in any of four channels, thus providing access to the twenty channels on the card of the described system. The description of this positioning structure now follows.

The five heads are carried by a framework 1237 (FIG. 12). The framework can be moved to any one of four possible positions corresponding to the four channels of each head. The heads and framework move as a unit in a vertical direction parallel to the rolls, to be positively located at the selected position.

A head carrier 1239 is attached to the frame 1237. A transducer head is mounted on each of five arms 1253. The head carrier 1239 has two mounting projections 1241 and 1243 which are fitted to a vertical shaft 1245 which is mounted on the card capsule base. An upper and a lower bearing block 1247 and 1248 are attached to the rear of the frame 1237. These bearing blocks are mounted on a vertical shaft 1251 which is attached to the capsule base. The shafts 1245 and 1251 are parallel and allow the frame and heads to be translated in the vertical direction.

The frame 1237 is shown in FIG. 12 in the lowermost or first position. The frame is urged to maintain this position by a tension spring 1255 connected between the frame 1237 and the capsule base 1002.

The frame is in a second position after it is moved a distance which equals the distance between the midpoints of adjacent information channels on a card. The third position is a two channel displacement from the initial position and the fourth position is a three channel displacement from the initial position. The second frame position is attained when a head positioning rotary solenoid 1257 is energized. The solenoid 1257 rotates an arm 1259 in the clockwise direction which causes a roller 1261 attached to the arm 1259 to engage a step 1263 on the frame 1237. In rising, the roller moves the frame 1237 vertically a distance equal to the distance between the midpoints of adjacent information channels. This distance of movement is determined by a stop (not shown) which limits the rotation of the solenoid arm 1259.

A solenoid 1264 is attached to the capsule base and cooperates, when energized, with a step 1265 to cause a two channel translation of the heads. Similarly a solenoid 1267 is attached to the capsule base and cooperates, when energized, with a step 1269 to cause a three channel translation of the head column. The three solenoids 1257, 1264, 1267 are basically identical; the difference in distance of movement which they impart to frame 1237 is brought about by the difference in length of each of the attached arms as is apparent in FIG. 12.

A key-panel 1005 (FIG. 10) is located on the front face of the capsule base 1002. The keys are numbered consecutively from left to right and top to bottom in correspondence with the channels on the card.

Depression of a key causes the transducer heads to be located in the appropriate position by the energization of none or the appropriate one of the head positioning solenoids and in addition it establishes a circuit to the head adjacent the information channel which corresponds to the number of the selected key.

Each key has a shank 1271 (FIG. 12) which is constructed with an inclined tab 1273 on the upper edge. A key lock plate 1275 is mounted for vertical movement in the capsule base and is urged to its lowermost position by a tension spring 1276 connected between the lock plate 1275 and the capsule base. Twenty rectangular slots are cut in the key lock plate 1275, one to receive each key shank. When a key is depressed, the tab 1275 moves to the right sufficiently to pass through the slot. Since the lock plate is spring urged downward, the plate drops behind the tab and holds the key in the depressed position. Each time a new key is depressed, the plate is raised to allow any previously depressed key to return to its normal position under urging of a return spring 1277.

A head switch 1279 is associated with each key of the key panel in such a way that depression of a key causes the associated switch to close. Four head switches similar to 1279 are associated with each head so that depression of any of the corresponding keys electrically connects the head to the capsule output, i.e., depending on which key is depressed, any one of the five heads may be connected to the capsule output in any one of the four previously described head positions. For example, depression of one of the keys 1005(1), 1005(2), 1005(3), or 1005(4) connects the head 1231 to the capsule output.

In addition, a solenoid switch 1280 is associated with each key excepting keys 1005(4), 1005(8), 1005(12), 1005(16), and 1005(20). Five solenoid switches are associated with each of the rotary solenoids 1257, 1264, and 1267 so that depression of any of the corresponding keys energizes the respective solenoid. For example, depression of one of the keys 1005(1), 1005(5), 1005(9), 1005(13), or 1005(17) energizes the rotary solenoid 1267.

Another example, if the first key 1005(1) is depressed, the head switch 1279 for the head 1231 is closed; a switch 1280 to the solenoid 1267 is also closed causing energization of the solenoid. With the solenoid 1267 energized, the heads move upward so that the first head 1231 is moved from its initial location adjacent the fourth channel to the first card channel where it is shown in broken line as 1231A. The solenoid 1267 is also shown by broken lines in an energized position as 1267A. The card capsule is thus placed in a condition to transduce information at the first information channel.

After a channel of information is transduced, the solenoid 1129 is de-energized thereby allowing the pinch rolls 1113 and 1115 to rotate and release the card from engagement with the drive roll 1105. After release, the card and frame are free to return to their initial position under the force of the spring 1107.

Tape Capsule

A tape capsule 100 is shown in FIG. 1 in its operating position plugged into transport 102 (FIGS. 1 and 13). The tape capsule contains a magnetic tape record, transducing heads and a capstan for driving the tape. The capstan is driven through a gear which engages the gear 1305 (FIG. 13) when the tape capsule is plugged into a transport. A socket carried by the capsule engages a plug (not shown) on the transport to make the necessary electrical connections to the heads in the capsule.

For a complete description of the tape capsule, reference is made to a copending U.S. Patent application, Serial No. 496,513, filed on March 24, 1955, by Jonathan Hunter, now U.S. Patent No. 2,869,799, issued on January 20, 1959. For use in the present system, the tape capsule of the Hunter application is provided with two recording heads; a units head and a naughts head. Thus, unit pulses and naught pulses transmitted from the matrix output switches are applied to the respective heads for recording on a units track and a naughts track.

Transports

In FIG. 1, a tape capsule 100 and a card capsule 101 are shown in transports 102 and 103 respectively. The transports are identical so that the tape capsule can be used in the transport 103 and the card capsule in the transport 102. The purpose of a transport is to hold a capsule, to provide power selectively and independently to the capsule, and to provide the necessary electrical connections to the capsule including connections from the capsule transducer to a group of record-reproduce switches (FIG. 2).

A capsule is held in the transport 102 or 103 (FIG. 13) by latching means (not shown). Power is provided from a transport shaft 1302 through bevel gears 1303 to a magnetic clutch 1304. Thus, whenever the clutch is engaged, power from the shaft 1302 is transmitted to a drive gear 1305. The drive gear engages a corresponding mating gear on a capsule such as 1207 (FIG. 12) to drive the magnetic medium in the capsule. A plug (not shown) at the rear of the transport engages a socket (not shown) at the rear of a capsule to provide the necessary electrical connections to a capsule.

It should be noted that the shaft 1302 (FIG. 13) can be extended conveniently so that as many transports and corresponding capsules as desirable can be used.

Program Unit

Figure 14:
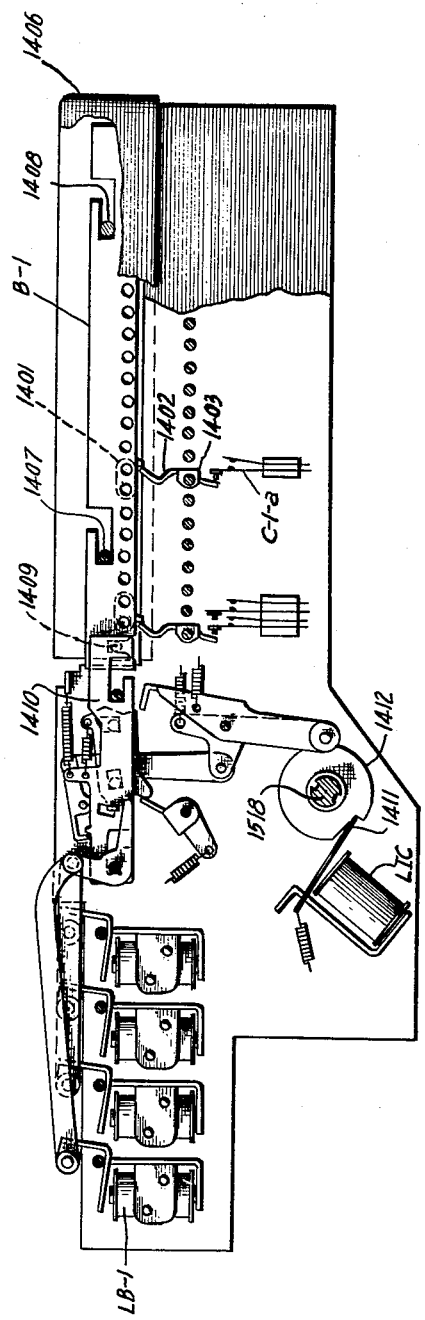
FIG. 14 is a front view of a program unit according to the invention.
Figure 15:
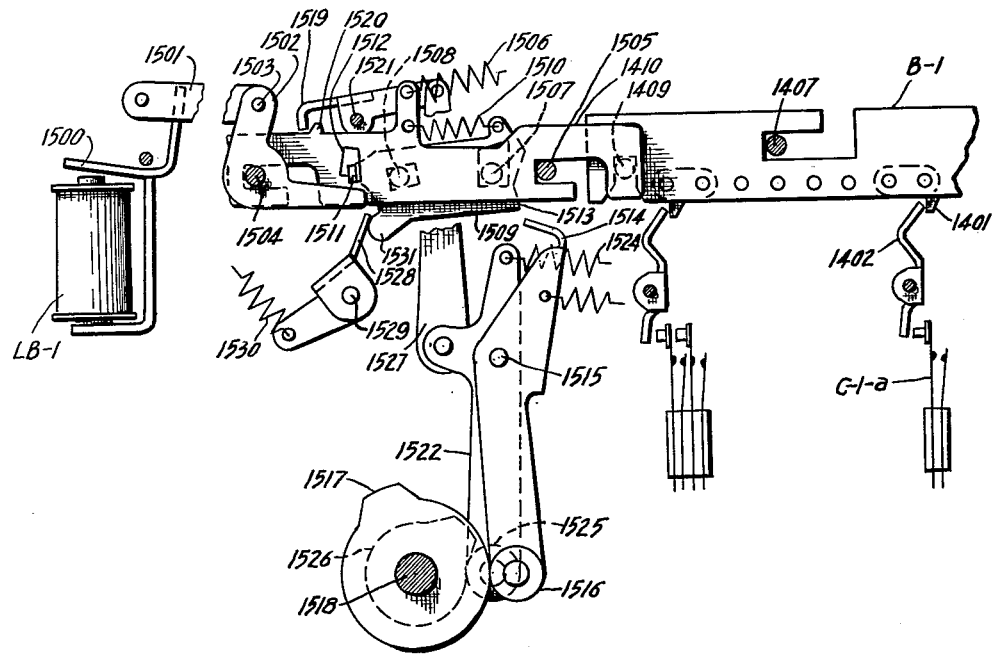
FIG. 15 is a view of an instruction bar shifting and latching mechanism of the program unit according to the invention.

The program unit directly controls the operations performed by the data processing system. A side view of a preferred representative embodiment of the program unit is shown in FIG. 14. A partial view of the program unit is shown in FIG. 15. A partial view is shown also at the top of FIG. 13.

The program unit is composed of 13 instruction bars. One instruction bar B–1 is shown in FIG. 14. Each of the 13 instruction bars has 23 locations at which a command tab such as 1401 can be placed. One or more command tabs are placed on the bar. These tabs correspond to the operations that are to be performed; for example, one tab corresponds to the command "keyboard entry," another to "reproduce from transport 103," etc. An instruction bar is placed in position to control the data processing system during an "instruction change cycle" by shifting the bar to the left. A selection magnet is associated with each instruction bar, such as a magnet LB–1 with the bar B–1. Energization of a selection magnet conditions the associated bar to be shifted during the next instruction change cycle. The instruction bar is retained in its shifted position by a latch mechanism which is described hereinafter. A command vane such as 1402, extending the width of the program unit, is mounted to correspond to each of the possible tab locations. When an instruction bar is shifted, each command tab carried by the particular bar engages the associated bail which rotates to actuate a group of command switches.

There are 23 groups of command switches. Each group corresponds to one of the 23 locations at which a command tab can be placed. For example, a switch C–1–a is one of a group C–1–a, C–1–b, C–1–c, etc. that are mounted along the length of the vane 1402. The switches C–1–a, C–1–b, etc. are actuated whenever the vane 1402 is rotated. Thus, since each group of command switches C–1 through C–23 represents a command, when a group of command switches are actuated, contacts are opened or closed to set up the appropriate circuit for performing the operation corresponding to the command they represent.

The instruction bars are mounted on two guide shafts 1407 and 1408 (FIGS. 13 and 14) between frames of a removable rack 1406 so that the rack with the instruction bars can be easily removed and replaced in the program unit. The command tabs are prearranged on the instruction bar according to the desired program. Thus, a library of instruction bar racks can be maintained so that a new program can be performed by placing a rack corresponding to the new program in the program unit. Each instruction bar is removably engaged with the bar shifting mechanism as follows. The left end of each instruction bar is vertically notched to fit over a stud 1409 (FIG. 14). The stud 1409 is carried by an instruction bar drive link 1410 which is arranged for actuation by the selection magnet LB–1. As the instruction bar rack is removed, the instruction bar notches are raised and disengaged from the studs.

To place the instruction bar B–1 in control of the data processing system, the magnet LB–1 (FIGS. 15 and 24) is energized, in a manner described hereinafter. It attracts its armature 1500 so that the armature moves an attached trip link 1501 to the left. The trip link 1501 is pivoted to a trip lever 1502 at a pin 1503 so that the trip lever is rotated counterclockwise about a shaft 1504. The shaft 1504 and a similar shaft 1505 are mounted between the side frames of the program unit. The drive links associated with each instruction bar are mounted on the shafts 1504 and 1505. The drive link 1410 is urged to the right by a spring 1506. Two guide studs 1507 and 1508 mounted on the drive link 1410 carry a live tip 1509. The live tip is urged to hold a counterclockwise position by a spring 1510 connected to the drive link 1410. The live tip 1509 carries an ear 1511 which engages the drive link in an opening 1512. The live tip ear 1511 is positioned normally in a recess at the lower right of the opening 1512. The ear 1511 also overlies a rearward extension of the trip lever 1502. When the magnet LB–1 is actuated, the trip lever 1502 rises, lifting the ear 1511. The ear 1511 is raised out of the recess to allow the live tip 1509 to move leftward under the urging of the spring 1510. Movement is limited by the ear 1511 abutting the left face of the opening 1512. With the ear 1511 raised, a rear projection 1513 of the live tip is below the usual horizontal plane of the drive links. A live tip drive bail 1514 extends across the width of the program unit. The driver bail 1514 is pivoted on a shaft 1515 and carries a cam follower 1516 which follows a cam 1517 mounted on a program drive shaft 1518.

An instruction bar change magnet LIC (FIGS. 14 and 24) is energized concurrently with the select magnet LB-1 during an instruction change cycle in a manner more fully described hereinafter. An armature 1411 of the magnet LIC is actuated to release a one cycle clutch 1412. (The clutch can be of any known constructions such as that disclosed in the U.S. Patent No. 2,271,240, issued January 27, 1942, to H. T. Avery and modified to omit the notches 423 and 424 of FIG. 32 so that the clutch can be operated as a one cycle clutch.) The clutch engages to drive the shaft 1518. The cam 1517 (FIG. 15) mounted on the shaft 1518 engages the follower 1516 thereby causing the drive bail 1514 to rock counterclockwise. The upper edge of the drive bail engages the rear face of the projection 1513 to shift the drive link 1410 and the attached instruction bar 1400 to the left.

The drive link 1410 and the instruction bar 1400 are held in the shifted position by a drive link latch 1519. The latch 1519 extends across the width of the program unit and engages a projection 1520 whenever the drive link is shifted to the left. The drive link latch 1519 is pivoted on a shaft 1521. A lever 1522 is pivoted at 1515 and is urged in the clockwise direction by a spring 1524. A follower 1525 on the lever 1522 engages a latch cam 1526 mounted on the program drive shaft 1518. A link 1527 connects the lever 1522 to the latch 1519. Thus, at high cam, the latch 1519 rises above the projection 1520. The latch 1519 is timed by cam 1526 to rise as shifting of the drive link 1410 commences, and fall before the shifting is completed. Thus, a prior instruction bar latched in the shifted position is released before the instruction bar B-1 is latched.

The live tip 1509, when engaged by the trip lever 1502, rocks in the clockwise direction. This action causes a rounded projection 1531 on the live tip to rock clockwise and abut the upper portion of a relatch bail 1528. The relatch bail extends across the width of the program unit and is pivoted on a shaft 1529. The relatch bail is urged in the clockwise direction by a spring 1530. As the drive bail 1514 translates the drive link 1410 and the live tip 1509 to the shifted position, the projection 1531 engages the upper portion of the relatch bail. The relatch bail 1528 rocks counterclockwise against the urging of the spring 1530. At the conclusion of the instruction change cycle, the bail 1514 is returned to its normal position. The relatch bail 1528 is therefore free to return the live tip ear 1511 to the recess at the lower right of the opening 1512. Thus, during the next instruction change cycle, the bail 1514 clears the projection 1513 associated with the latched bar B-1 while engaging the projection 1513 associated with the bar being shifted.

Commutator

Figure 16:
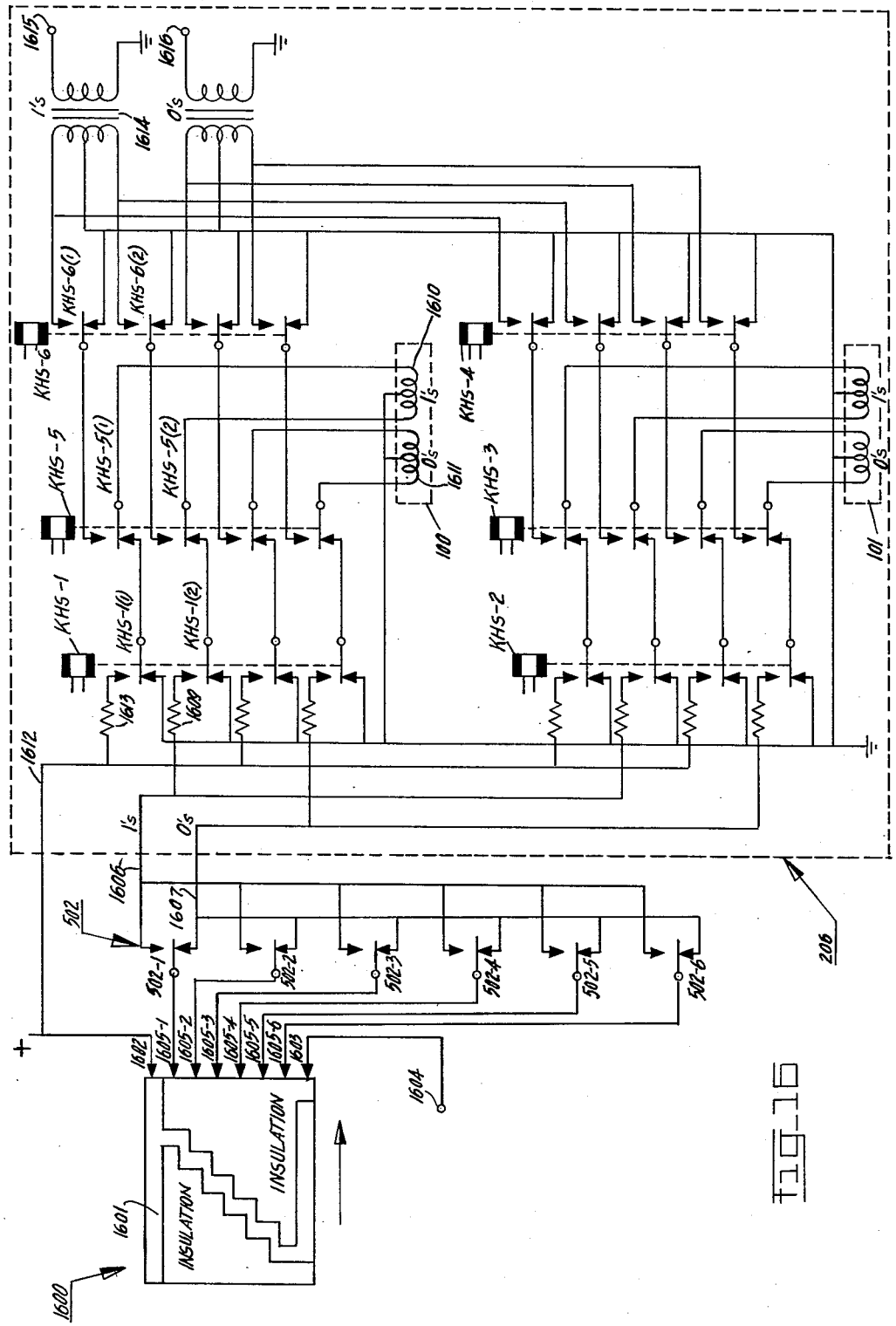
FIG. 16 is a schematic diagram of the matrix output switches showing their relationship to a commutator and a group of record-reproduce contacts according to the invention.

A commutator 1306 is shown in FIG. 13 mounted on a shaft 1307. To rotate the commutator, the shaft 1307 is connected to a power shaft 1308 through a clutch 1311. During rotation, the commutator develops a series of electrical pulses for application to the matrix output switches 502 (FIG. 16). The matrix output switches 502 are selectively actuated to represent a character according to a six bit code, as described hereinbefore. The output switches transform the commutator pulses into a series of coded pulses representing the character for transmission through the record-reproduce contacts 206 (FIGS. 2 and 16) to a capsule, for recording the character on the storage medium.

The commutator is cylindrical and has a conducting pattern on its surface. A development 1600 of this pattern is shown in FIG. 16. A conducting area 1601 is connected to a positive bus 1612 through a brush 1602. Whenever the commutator is rotated in the direction of the arrow, the conducting area 1601 first contacts a brush 1603 so that a positive potential on the bus 1612 is applied to a terminal 1604. The terminal 1604 is connected to the clutch control circuit (FIG. 2). This potential enables the clutch control circuit to cause engagement of either or both of the magnetic transport clutches 1304 (FIG. 13). Engagement of a transport clutch causes the magnetic medium in a capsule held in the transport to move so that the character represented by the output switches can be recorded on the medium.

The conducting area next contacts in sequence a group of brushes 1605-1, 1605-2, 1605-3, 1605-4, 1605-5, and 1605-6 thereby developing, in a serial order, a pulse at each brush. The first pulse is conducted from the brush 1605-1 to the movable contact of the matrix output switch 502-1. The second pulse is conducted from the brush 1605-2 to the movable contact of switch 502-2. Each subsequent pulse is conducted from the respective brush to the corresponding movable contact of the matrix output switch. An actuated switch represents a unit in which case the movable contact of the switch is contacting the upper contact. A non-actuated switch represents a naught in which case the movable contact of the switch is contacting the lower contact. All of the upper contacts are connected to a units lead 1606 and all of the lower contacts are connected to a naughts lead 1607. Thus, a coded serial pulse train, representing the condition of the output switches, and therefore the character, is transmitted from the matrix output switches to the leads 1606 and 1607.

Record-Reproduce Contacts

A group of record-reproduce contacts 206 are shown schematically in FIG. 16 and in block form in FIG. 2. These contacts are required so that the connections to the heads of the capsules can be appropriately switched to the recording or reproducing circuitry. Thus, information can be recorded on the medium of either capsule and reproduced from the medium of either capsule.

When information is to be recorded on the tape in the capsule 100, a head-switch relay KHS-1 is energized by means presently described and held energized while information is being recorded. A circuit is provided thereby from the units lead 1606 through a resistor 1609, an upper contact of KHS-1(2), a lower contact of KHS-5(2), and the left side of a units head 1610 to ground at a center tap. With the relay KHS-1 energized, a circuit is also provided from the positive bus 1612 through a resistor 1613, an upper contact of KHS-1(1), a lower contact of KHS-5(1), and the right side of the units head 1610 to ground at the center tap. Thus, while the relay KHS-1 is energized, a current flows through the resistor 1613 and the right half of the head 1610. This current establishes a reference level of magnetization on the units track of the tape passing adjacent the head 1610. Whenever a unit pulse is applied to the lead 1606 (and relay KHS-1 is energized), a current flows through the resistor 1609 and the left half of the head 1610. The resistance of the resistor 1609 is preferably one-half that of the resistor 1613. Thus, the current due to the unit pulse is substantially twice the magnitude of the reference level current. Therefore, the magnetic field due to the unit pulse is twice the reference level field. Since the two currents set up opposing magnetic fields, the field of the unit pulse overcomes the reference level field so that the total field is equal to the reference level field but in the opposite direction. With this type of recording, there is always a magnetic field acting on the magnetic medium. This allows the magnetic medium to be reused without first requiring that the medium be erased.

Naught pulses from the lead 1607 are transmitted to a naughts head 1611 through circuits similar to those described above.

When information is to be recorded on the card in the capsule 101, a head switch relay KHS-2 is energized. Unit and naught pulses are transmitted from the leads 1606 and 1607 to the heads of the capsule 101 through circuits similar to those described above.

When information is reproduced from the tape in the capsule 100, a relay KHS-5 and a relay KHS-6 are energized and held energized while the information is being reproduced. A circuit is completed thereby from the right end of the units head 1610 through the upper contact of KHS-5(1) and the upper contact of KHS-6(1) to the upper end of a primary winding of a units transformer 1614. The lower end of the winding is connected to the left end of the head 1610 through the upper contact of KHS-6(2) and the upper contact KHS-5(2). Thus, unit pulses developed at the head 1610 are transmitted to the transformer 1614 and coupled to a units output terminal 1615. Naught pulses developed at the head 1611 are transmitted through a similar circuit to a naughts output terminal 1616.

When information is reproduced from the card in the capsule 101, a relay KHS-3 and a relay KHS-4 are energized and held energized while the information is being reproduced. Circuits are established thereby, identical to those described above, from the units head and naughts head in the capsule 101 to the units and naughts output terminals 1615 and 1616.

The units and naughts pulses appearing at the terminals 1615 and 1616 are transmitted over respective leads to a pair of demodulators (FIG. 2).

Demodulators

Pulses developed at the capsule heads during a reproduce operation are transmitted through the record-reproduce contacts to a pair of demodulators (FIG. 2 and FIG. 17). Unit pulses are transmitted to the terminal 1615 (FIG. 17) and naught pulses are transmitted to the terminal 1616. The unit pulses are amplified, clipped, shaped, and transmitted to a units output terminal 1705 through a circuit comprising an amplifier 1702, a diode 1703, and an amplifier 1704. The amplifiers may, for example, be of the type shown in FIG. 2.14 of Electronics by Elmore and Sands, McGraw-Hill, 1949. The amplifier 1704 is preferably biased class B. The naught pulses applied to the terminal 1616 are also amplified, clipped, shaped, and transmitted to a naughts output terminal 1706 through an identical circuit comprising an amplifier 1707, a diode 1708, and an amplifier 1709.

The pulses appearing at the output terminals 1705 and 1706 are transmitted to the inputs of a clock generator (FIG. 2), a gap detector, and the shift register.

Gap Detector

FIG. 19 is a schematic diagram of a preferred gap detector used in the invention. Pulse groups are transmitted to the gap detector input from the demodulators (FIG. 17). The gap detector detects a short gap that occurs at the end of each group of pulses representing a character. It also detects a longer gap that occurs at the end of a group of characters comprising a word.

The unit and naught pulses are transmitted from the terminals 1705 and 1706 through an OR gate 1902 to a control grid 1903 of a tube 1904. Thus a pulse is applied to the tube 1904 for each bit of a character, whether a unit or a naught. The tube 1904 is normally not conducting. The pulses applied to the grid 1903 are positive pulses and therefore cause the tube 1904 to conduct. A capacitor 1905 and a capacitor 1906 are charged to a positive potential applied to a terminal 1901 from a power source (not shown) through a resistor 1907 before the pulses from the demodulators cause the tube 1904 to conduct. During conduction of the tube 1904, the capacitor 1906 discharges through the tube 1904 and a resistor 1908; and the capacitor 1905 discharges only through the tube 1904.

However, the capacitor 1906 and the resistor 1908 are of relatively large value and are chosen so as to form an RC circuit having a time constant the significant discharge time of which is longer than the time between the bits of a character but shorter than the gap time between characters. Thus, during conduction of the tube 1904, there is only a small discharge of the capacitor 1906, and hence, the voltage across the capacitor 1906 changes only slightly. In contrast, there is a nearly complete discharge of the capacitor 1905 during conduction of the tube 1904 so that there is a large change in voltage across the capacitor 1905.

Assuming now that a series of pulses are applied to the circuit 1902, at the end of the first pulse applied to the grid 1903, the tube 1904 becomes non-conducting. Since the capacitor 1906 retains most of its charge and the capacitor 1905 is nearly discharged, the capacitor 1906 continues to discharge through the capacitor 1905 and the resistor 1908. The capacitor 1905 is partially recharged thereby.

While the capacitor 1906 is discharging, the next pulse is applied to the grid 1903. The tube 1904 again conducts and allows the capacitor 1905 to discharge. The capacitor 1906 still retains a large charge and thus continues to discharge through the capacitor 1905 and the resistor 1908 when the tube 1904 is non-conducting and through the tube 1904 when it is conducting. At the end of a pulse group, i.e., when a gap occurs in the series of pulses applied to the grid 1903, enough time elapses to allow the capacitor 1905 to become recharged to the voltage across the capacitor 1906 thereby halting the discharge of the capacitor 1906.

The resistor 1908 is connected between the cathode and grid of a normally conducting tube 1909. The potential developed across the resistor 1908 due to the discharge current of the capacitor 1906 controls the tube 1909. Thus, whenever a series of pulses are applied to the gap detector input, the grid of the tube 1909 is negative with respect to the cathode due to the potential drop across resistor 1908 and the tube 1909 is cut off. Whenever a gap in the series of input pulses occurs, the discharge current through the resistor 1908 ceases, the grid assumes a higher potential and the tube 1909 conducts. Thus, the plate voltage of the tube 1909 is high during the application of pulses to the gap detector input and is low whenever a gap occurs or pulses are not applied to the input. The plate of the tube 1909 is connected to an output terminal 1910. Thus, a negative output pulse is obtained between the terminal 1910 and ground whenever a gap occurs.

A capacitor 1911 in series with a resistor 1912 having a relatively high value is connected between the plate and cathode of the tube 1904. A pair of contacts 1913–a of a skip word button are connected across the resistor 1912. The purpose of the skip word button is to advance the tape or card, from which information is being reproduced, to the nearest gap between words and then to stop the tape or card. When the contacts 1913–a are open, the effect of the capacitor 1911 and the resistor 1912 is negligible. With the contacts 1913–a closed, the capacitor 1911 is in parallel with the capacitor 1905. Whenever a gap occurs with the switch closed, the discharge current of the capacitor 1906 flows for a longer period of time due to the increased capacity of the parallel connection of the capacitors 1905 and 1911. This current flow maintains the cutoff voltage at the grid of the tube 1909 during a gap between characters, thereby preventing the occurrence of an output pulse at the terminal 1910; however, the charge on the capacitor 1906 is insufficient to maintain the negative cutoff voltage during the longer gap between words, thereby allowing a negative pulse to occur at the terminal 1910. Consequently, the gap between characters is detected when the contacts 1913–a are open and is not detected when the contacts 1913–a are closed, and the gap between words is detected whether the contacts 1913–a are open or closed.

The output pulses at the terminal 1910 are transmitted to the clutch control circuitry (FIG. 2).

Clutch Control Circuit

The clutch control circuit is a circuit used for controlling the engagement and disengagement of the clutches of the transports 102 and 103 (FIG. 13) at the appropriate times. It is also used for controlling the engagement of a half turn receiving cycle clutch 1310 (FIG. 13) during a receiving cycle. The half turn receiving cycle clutch may be of the same type as the instruction change clutch 1412 referred to in the description of the program unit, modified, however, to complete half turn cycles.

In order to record information on or reproduce information from the magnetic medium in a capsule, it is necessary that the clutch in the associated transport is engaged to supply power to move the medium. The clutch 1304 (FIG. 13) in the transport 102 is engaged whenever a solenoid 2000 (FIG. 20) is energized; and the clutch in the transport 103 is engaged whenever a solenoid 2001 is energized. Respective clutch engagement lights 2028 and 2029 glow during the period that the associated solenoid is energized and the medium is moving.

The solenoid 2000 is energized when a high positive potential is applied to an input lead 2002 of an amplifier 2003; and the solenoid 2001 is energized when a high positive potential is applied to an input lead 2004 of an amplifier 2005. A high positive potential can be applied to the lead 2002 from a reproduce control circuit described hereinafter through a command switch C–1–a (FIGS. 14 and 20) or from control circuits described hereinafter through a switch C–3–a and a switch C–3–b. These command switches are a part of the program unit as previously described. Similarly, a high positive potential can be applied from the reproduce circuit to the lead 2004 through a switch C–2–a, and from the record circuits to the lead 2004 through a switch C–4–a, and a switch C–4–b.

The switch C–1–a corresponds to a command "reproduce from the medium in the capsule in transport 102," and the switches C–3–a and C–3–b correspond to a command "record on the medium in the capsule in transport 102." These switches are closed whenever the corresponding reproduce or record command tabs are coded on the instruction bar in control of the system. Obviously, only one of these commands can be coded on an instruction bar at a time. Thus, either the switches C–3–a and C–3–b are closed for recording and the switch C–1–a is open; or the switches C–3–a and C–3–b are open and the switch C–1–a is closed for reproducing. Similarly, the switch C–2–a corresponds to a command "reproduce from the medium in the capsule in transport 103," and the switches C–4–a and C–4–b correspond to a command "record on the medium in the capsule in transport 103."

A warning light circuit is provided for each transport, a circuit 2006 for the transport 102 and a circuit 2007 for the transport 103. A relatively high positive potential is provided through each circuit to the input of the respective amplifiers 2003 or 2005 whenever a record command coded on the instruction bar in control causes the record command switch C–3–a or C–4–a to be closed. Ordinarily, information is transmitted from the commutator to only one capsule for recording; however, information can be transmitted to both capsules if desired, provided it is not necessary to reproduce information from one of the capsules.

The operation of the warning light circuits is identical so that only the operation of the circuit 2006 is described. The circuit 2006 is composed of two resistive branches connected between a positive bus 2016 and ground. One branch consists of a resistor 2008, a thermal switch 2009, and a grounding switch 2011. The other branch consists of a resistor 2012, a resistor 2013, and a grounding switch 2014. A lamp 2015 is connected between the resistor 2008 and the resistor 2012.

There are three conditions of operation of the warning light circuit. The lamp 2015 is either glowing steadily, not glowing, or flashing steadily. The condition of the grounding switch 2011 and the grounding switch 2014 determine which of the three conditions prevail.

The grounding switches are limit switches and a pair of the switches are located in each tape capsule. The switches are actuated by the tape reel as the diameter of the reel changes. The switch 2014 is open when the reel is rewound. With the switch 2014 open and with a "record to transport 102" command coded on the instruction bar in control of the system, the positive potential on the bus 2016 is applied to the input of the amplifier 2003 through the resistor 2012, the resistor 2013, and a resistor 2017, the closed contacts C–3–a, and the lead 2002. The solenoid 2000 is energized thereby, and power is supplied to the capsule in the transport 102 to advance the tape to the recording area. While the switch 2014 remains open, a current flows from the bus 2016 through the resistor 2012, the lamp 2015, the thermal switch 2009, and the switch 2011 to ground. This current causes the lamp 2015 to glow steadily thus indicating that the tape is advancing to the recording area.

As the tape reel unwinds and is advanced to the recording area, the reduced diameter of the tape reel causes the limit switch 2014 to close. With the switch 2014 closed, the input to the amplifier 2003 is grounded thus preventing the solenoid 2000 from being energized and the tape from moving.

Closure of the switch 2014 also causes equalization of the potential on each side of the lamp 2015. This is accomplished by choosing the ratio of the resistors 2012 and 2013 equal the ratio of the resistor 2008 and the heating element of the thermal switch 2009. Consequently, the light does not glow with the switch 2014 closed. This indicates that the tape has advanced to the recording area and is ready for information to be recorded thereon.

Whenever a character is recorded on the tape, the comutator 1600 (FIG. 16) completes one cycle of rotation. At the beginning of the cycle, just before the character pulses are developed, the brush 1603 contacts the conducting area 1601 thereby applying a positive potential to the terminal 1604 (FIGS. 16 and 20). This potential is applied through the switch C–3–b (closed because of the record command) to the input of the amplifier 2003. The solenoid 2000 is energized thereby and the transport 102 clutch is engaged so that the tape is placed in motion for the period that the brush 1603 (FIG. 16) contacts the area 1601. When the brush 1603 breaks contact with the rea 1601, the potential is removed so that the tape stops and remains stopped until the next character is to be recorded.

When the tape nears the end of the reel, the switch 2011 opens. This causes a current to flow from the bus 2016 through the resistor 2012, the lamp 2015 and the thermal switch 2009 to ground. Since the thermal switch heater element is supplied by current through its own contacts, the thermal switch contacts open and close as the heater warms and cools. As a result, the lamp 2015 flashes steadily, warning that the tape in the capsule is nearing the end of the reel and that the tape capsule should be replaced with a fresh capsule.

If the warning is ignored, a second limit switch 2018 opens. This breaks the energizing circuit for the solenoid 2000 so that the tape cannot be unwound further. This prevents the tape from being torn from the reel and necessitates manual replacement of the tape on the reel. Another limit switch 2027 opens to prevent further unwinding when the reel is unwound in the opposite direction.

In order to reproduce information from the medium in a card or tape capsule, it is required that the medium be moving. Thus, similar to the case when information is recorded on the medium, a high positive reproduce potential is applied to the input of the amplifier 2003 or 2005 thereby causing the corresponding medium to move. A reproduce potential on a lead 2019 can be provided through either the reproduce command switch C–1–a or the reproduce command switch C–2–a to the respective amplifier whenever a reproduce command is coded on the instruction bar in control of the system. The potential on the lead 2019 is supplied at the output of a bistable reciprocircuit 2020. (The term reciprocircuit as employed herein is construed to include all circuits having two distinguishable states of operation. The term bistable reciprocircuit denotes a reciprocircuit using electron discharge devices or other electron devices such as transistors and having dual input terminals each of which corresponds to one of two bistable states of operation so that successive triggering pulses at one set of terminals and then the other set of terminals will put the circuit through a complete cycle of operation. For example, a bistable reciprocircuit is shown in FIG. 2.36 of Electronics by Elmore and Sands, McGraw-Hill, 1949.)

The output of the reciprocircuit 2020 is controlled by signals applied to the input over three leads: a start reproduce lead 2022, a gap detector lead 2023, and an instruction change lead 2024. To initiate a reproducing operation, a positive start reproduce potential is applied to the lead 2022 from the bus 2016 through any one of several alternative circuits, more fully described hereinafter. The positive potential on the lead 2022 is conducted to the input of the circuit 2020 thereby causing the left side of the circuit 2020 to conduct. In this condition, the circuit 2020 supplies a high positive potential to the lead 2019. This potential is conducted through either the switch C–1–a or C–2–a to the respective amplifier 2003 or 2005. This causes a capsule clutch to engage and the magnetic medium to advance.

As the medium advances, information is reproduced from the medium and transmitted to the shift register and gap detector in the form of pulses, as described previously. At the end of a group of pulses, a gap occurs. This causes the gap detector to transmit a negative pulse to the terminal 1910. The negative pulse is applied to the input of the circuit 2020 over the lead 2023, thereby causing the left side of the circuit to cutoff and the right side to conduct. In this condition, the circuit 2020 supplies a low potential to the lead 2019, thereby stopping the motion of the tape and thus, the reproducing.

Also, with the left side cutoff and the right side conducting, a high potential is supplied to a lead 2025. This potential is conducted to a thyratron amplifier 2026 thereby causing the amplifier 2026 to conduct through a closed reproduce command switch C–1–b or C–2–b and a receiving cycle relay KRC. This conduction energizes the relay KRC so that a pair of contacts KRC–a (FIG. 25) close and complete an energizing circuit for a receiving cycle magnet LCR. The energized magnet LCR causes a ½ turn receiving cycle clutch 1310 (FIG. 13) to engage. Power is transmitted to the shaft 701 during the ensuing receiving cycle. Soon after energization of the relay KRC, a pair of cam operated contacts LCR–a (FIGS. 13 and 20) momentarily open. The energizing circuit for the relay KRC is thereby broken and the relay de-energized. Before the clutch 1310 rotates through a half turn, another pair of contacts LCR–b momentarily close to allow application of a positive potential to the input of the thyratron amplifier 2026. The relay KRC is therefore again energized. As a result the magnet LCR is also energized so that the clutch 1310 rotates past its ½ turn position. Soon after, another pair of cam operated contacts LCR–c open to break the energizing circuit for the relay KRC. The clutch 1310 therefore stops after a full turn.

Thus, a start reproduce potential is applied to the lead 2022 to cause the medium to move and thereby initiate the reproducing of each character; a negative pulse is applied to the lead 2023 after each character is reproduced to stop the medium and initiate a receiving cycle; and at the completion of a receiving cycle a start reproduce potential is again applied to the lead 2022 to cause the medium to move and thereby initiate the reproducing of the next character.

During an instruction change cycle, i.e., when a new instruction bar is placed in control, a pair of cam operated instruction change contacts LIC–a (FIGS. 13 and 20) close. A positive potential is thereby applied to the lead 2024. This ensures that the circuit 2020 remains in its right-hand condition and that the transport clutches remain disengaged. Near the end of the instruction change cycle, a pair of contacts LIC–b close and apply a positive potential to the lead 2022, thus initiating the advancement of the medium and the reproducing of the first character if a reproduce command is coded on the instruction bar. Also during an instruction change cycle, a pair of contacts LIC–c open thereby preventing the energization of the relay KRC and hence the occurrence of an erroneous receiving cycle.

*Clock Generator*

Unit and naught pulses from the demodulators output are applied to the input of the clock generator (FIG. 18). A pulse applied to either one of the terminals 1705 or 1706 is transmitted through an OR gate 1802 (as for example, the type shown in FIG. 2.45 of Electronics by Elmore and Sands, McGraw-Hill, 1949) and an amplifier 1903 (similar to the amplifier 1702 of the clock generator) to an output terminal 1804. Thus, a clock pulse is generated whenever a unit or a naught pulse is applied to the respective terminal. The clock pulses are transmitted to the shift register input (FIG. 2).

*Shift Register*

During a reproducing operation, character representing pulses are serially transmitted from the demodulators 202 (FIG. 2) to the shift register 203. The character representations are stored in the shift register until a complete group of pulses representing a character have been applied to the shift register input. At the end of each character group of pulses, a gap occurs and is detected by the gap detector, thereby initiating a receiving cycle as described hereinbefore. During the receiving cycle, the matrix input magnets 700 (FIGS. 7, 13 and 21) are selectively energized to correspond to the character representations stored in the shift register according to the code for the character. Thus, the matrix output switches 502 (FIGS. 5 and 13) are set to correspond to the character. Also, a matrix sensing bar corresponding to the character can pass through the matrix, in the manner described hereinbefore. Therefore, the representations of a serial pulse group are stored in the shift register and then transferred in parallel to the matrix.

The shift register is composed of a group of reciprocircuits 2100 (FIG. 21). Since, in the preferred embodiment, a six bit code is used, six reciprocircuits are required, one for each bit order of the code. The reciprocircuits are numbered from right to left 2100–1 through 2100–6 so as to correspond to the bit order that each circuit represents when the representations are completely transferred to the matrix. Thus, the lowest order pulse of a character group of pulses is the first pulse applied to the input of the shift register. However, the pulse is applied to the highest order reciprocircuit 2100–6. The pulse representation is then shifted to the next lower order shift register when each subsequent pulse of the group is applied to the input. The lowest order representation is therefore represented by the circuit 2100–1 after the sixth or highest order pulse is applied to the shift register input.

Before a character group of pulses is applied to the shift register input, a positive reset or start-reproduce pulse is applied to a terminal 2101 (FIGS. 20 and 21) as described hereinbefore. This pulse is conducted to the grid of the right tube of each circuit 2100–1 through 2100–5 and to the grid of the left tube of the circuit 2100–6. With the right tube conducting, a reciprocircuit is said to be in its unit condition. Thus, before the application of a character group of pulses, the circuits 2100–1 through 2100–5 are in their unit condition and the circuit 2100–6 is in its naught condition. The purpose for resetting the reciprocircuits in this manner is clarified hereinafter.

The operation of the shift register is best illustrated by way of an example. The application to the shift register input of a series of pulses representing the character "A" and having a code 10001 causes the shift register to operate in the following manner. Since the lowest order pulses are applied first, the first and lowest order pulse is a unit pulse and is applied to the units terminal 1705. This pulse is transmitted to the grid of a units tube 2102 of the circuit 2100–6. This causes the circuit 2100–6 to change from its reset naught condition to its unit condition so that the units tube 2102 is conducting.

Concurrently with the first information pulse, and with each subsequent pulse, a negative clock pulse from the clock generator 208 (FIGS. 2 and 18) is applied to the terminal 1804 (FIGS. 18 and 21). This pulse is transmitted to a diode gate circuit at the units and naughts grid of each circuit 2100–1 through 2100–5. The clock pulse is used to shift the representation in each reciprocircuit to the next lower order reciprocircuit. For example, prior to application of the first character pulse, the circuit 2100–6 is reset to its naught condition. In this condition, current through the naught tube (a tube 2103) causes a low potential at the plate of the tube 2103. This low potential is applied through a lead 2104 to the cathode of a diode 2105. The anode of the diode 2105 is connected to a positive bias potential that is less than the potential at the diode cathode when the tube 2103 is nonconducting. However, with the tube 2103 conducting, the potential applied over the lead 2104 is lower than the positive bias potential. The negative clock pulse applied through a capacitor 2106 to the cathode of the diode 2105 is sufficiently negative to overcome the low positive potential on the lead 2104. Thus, the negative clock pulse is transmitted to the grid of the units tube of the circuit 2100–5 so that the naught side becomes conductive and the unit side becomes non-conductive. Thus, the application of the clock pulse causes the naught representation of the circuit 2100–6 to transfer to the circuit 2100–5. Although the clock pulse is applied concurrently with the information pulse, the clock pulse is transmitted to the reciprocircuit 2100–5 before the circuit 2100–6 can change to its opposite condition in response to the information pulse. The representations in the circuits 2100–1 through 2100–5 are similarly shifted.

In the example, the second pulse applied to the shift register input is a naught pulse and is applied to the terminal 1706. The naught pulse causes the naught tube of the circuit 2100–1 to conduct. A concurrent clock pulse applied to the terminal 1804 is effective, as before, to shift the representation in each circuit to the next lower order circuit. Therefore, the diode gate associated with the grid of the naughts tube of the circuit 2100–5 passes the clock pulse to the naughts grid to place the circuit 2100–5 in its units condition. Thus, the lowest order representation is shifted to the circuit 2100–5 when the second pulse is applied to the input of the shift register.

The remaining pulse representations are entered at the shift register input and corresponding clock pulses are applied to the diode gate circuit at each grid of the reciprocircuits, thereby causing the representations to shift as described above. Thus, the representations are entered at the shift register input and are shifted through the register until the lowest order representation is in the circuit 2100–1 and all subsequent higher order representations are in corresponding circuits 2100–2 through 2100–6.

The representations in the shift register are converted to mechanical representations in the matrix by means of a relay and a neon bulb in series in the plate circuit of each naughts tube of each reciprocircuit. For example, when the tube 2103 conducts the voltage across a resistor 2109 rises to the breakdown voltage of a neon bulb 2108. With the neon bulb conducting, a relay KR–6, in series with the bulb, is energized. A pair of contacts KR–6(1) are closed, thereby completing an energizing circuit through the matrix input solenoid 700–6 to a power source. Thus, as discussed hereinbefore, with the solenoid 700–6 energized, a naught representation is transferred to the matrix during a receiving cycle. With the solenoid 700–6 de-energized, a unit representation is transferred to the matrix during a receiving cycle. Similarly, the representations of each of the solenoids 700–1 through 700–5 are transferred to the matrix during a receiving cycle.

*Checking Circuit*

The purpose of the checking circuit is to detect occurrences of fallacious and mutilated pulse groups, to prevent the recording of the corresponding representations on the magnetic medium, to provide a visual indication of the occurrence of a fallacious or mutilated pulse group, and to prevent further automatic operation of the data processing system after the occurrence of a fallacious or mutilated pulse group. With the automatic operation of the system suspended, a correction instruction bar is selected at the keyboard and placed in control of the system. In addition, an error reset switch is actuated to permit operation of the system so that the error can be corrected. The correction bar allows the data storage to be backspaced to the error. The error can then be corrected by inserting the correct character at the typewriter keyboard. To return the system to automatic operation, the data storage is backspaced to a point in the program where an instruction bar used during the program can be selected at the keyboard. Selection of this bar returns the system to automatic operation.

The fallacious pulse groups of a six bit binary code as defined herein correspond to the code groups listed below.

ORDERS

| 6 | 5 | 4 | 3 | 2 | 1 |
|---|---|---|---|---|---|
| 0 | 0 | 0 | 0 | 0 | 0 |
| 0 | 0 | 0 | 0 | 1 | 1 |
| 0 | 0 | 0 | 1 | 0 | 1 |
| 0 | 0 | 0 | 1 | 1 | 0 |
| 0 | 0 | 1 | 0 | 0 | 1 |
| 0 | 1 | 0 | 0 | 0 | 1 |
| 0 | 1 | 0 | 0 | 1 | 0 |
| 0 | 1 | 0 | 1 | 0 | 0 |
| 0 | 1 | 0 | 1 | 1 | 1 |
| 0 | 1 | 1 | 0 | 0 | 0 |

There are three distinguishing characters of the fallacious code groups. First, the sixth or highest order digit of each group is a naught. Second, there is an even number of naught digits in each group. Third, in each group a naught occurs in either the fourth order or concurrently in the second and third orders. It is noted that all of the fallacious code groups meet these conditions and that the remaining groups of a six bit code do not. Thus, a circuit for detecting the fallacious code groups must detect a naught in the sixth order, the occurrence of an even number of naught digits, and a naught in either the fourth order or concurrently in the second and third orders. In addition, in response to detection of a fallacious code group, the circuit should suspend the operation of the data processing system so that the error can be corrected.

Figure 22:
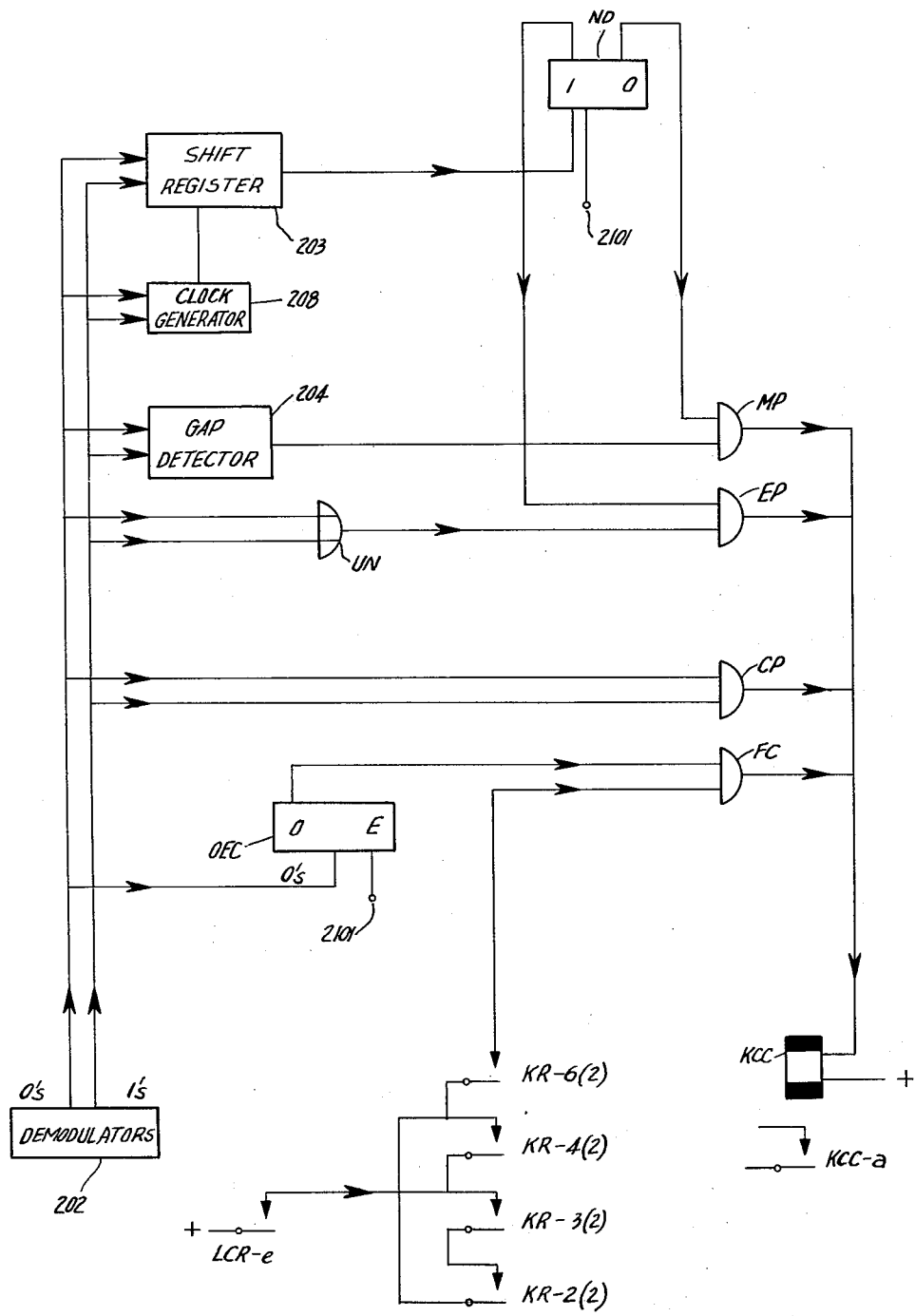
FIG. 22 is symbolic diagram of a checking circuit shown in relation to portions of FIG. 2 according to the invention.

The portion of the checking circuit used for detecting the fallacious code group is shown in FIG. 22 in relation to the portion of FIG. 2 which is significant, i.e., the demodulators 202, the clock generator 208, the gap detector 204, and the shift register 203. The fallacious code detection circuit comprises the following components: a set of receiving cycle contacts LCR–*e* (FIGS. 13 and 22); the receiving relay contacts KR–2(2), KR–3(2), KR–4(2), and KR–6(K2) (FIGS. 21 and 22); a fallacious code AND gate FC which may be, for example, the type shown in FIG. 2.45 of Electronics by Elmore and Sands, McGraw-Hill, 1949; a checking circuit relay KCC; and a reciprocircuit OEC which is an odd-even counter having two stable conditions of operation odd and even or O and E.

The naughts output of the demodulators 202 (FIG. 22) is connected to a symmetrical input of the counter OEC. Each naught pulse applied to the symmetrical input causes the counter to shift from its current stable condition to its opposite stable condition.

Before the pulses of a code group are applied to the shift register input, the counter OEC is placed in its even condition by application of a positive reset potential to the terminal 2101 (FIGS. 20, 21, and 22) and thence to an asymmetrical input of the counter OEC. Whenever an even number of naught pulses occur in a code group, an even number of pulses are applied to the symmetrical input of the counter. Therefore, at the end of a group with an even number of pulses, the counter is in its original even condition so that an arming potential is applied from the counter output to an arming terminal of the fallacious code AND gate FC. This corresponds to the condition that an even number of naught pulses must occur in a fallacious code group.

After all the pulses in a code group are applied to the shift register input in the manner previously described in the discussion of the shift register, the contacts LCR–*e* (FIG. 22) close so that a positive potential is applied to the contacts KR–3(2) and KR–4(2). The KR contact numbers 2, 3, 4, and 6 (FIG. 22) are the same as the corresponding orders of the shift register (FIG. 21) so that a naught representation in one of the orders of the shift register causes the corresponding KR contact to close.

The contacts KR–6(2) are closed whenever a naught pulse occurs in the sixth order of a pulse group. This corresponds to the condition that a naught must occur in the sixth order of a fallacious code group.

The contacts KR–4(2) are closed whenever a naught pulse occurs in the fourth order of a pulse group; and the contacts KR–2(2) and KR–3(2) are closed whenever a naught pulse occurs concurrently in the second and third orders of a pulse group. This corresponds to the condition that in a fallacious code group, a naught pulse must occur either in the fourth order or in the second and third orders concurrently.

Thus, a potential is applied to an input terminal of the gate FC through the contacts LCR–*e* and either the contacts KR–4(2) and the contacts KR–6(2) whenever a naught pulse occurs in the fourth and sixth orders, or the contacts KR–3(2), KR–2(2), and KR–6(2) whenever a naught pulse occurs in the second, third, and sixth orders.

Therefore, in order that the gate FC be energized, two circuit conditions must occur: (1) the counter OEC must be in its even condition, and (2) one of the above combinations of closed KR contacts must occur.

Figure 26:
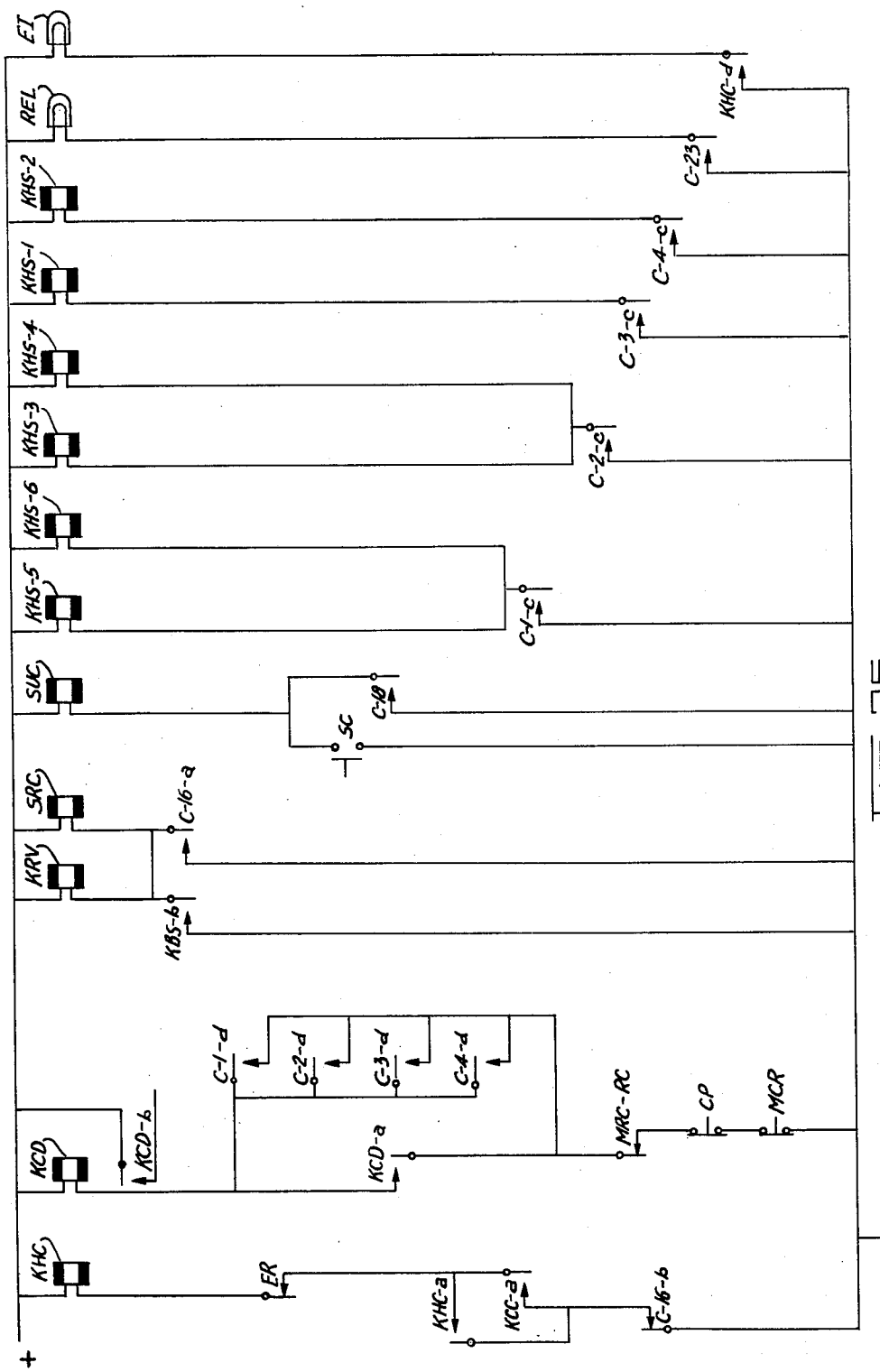
FIG. 26 is a schematic diagram of relays and contacts used for controlling and synchronizing the operations of the system according to the invention.

Consequently, when a fallacious code group occurs, the gate FC is energized, thereby causing the relay KCC to become energized. The relay contacts KCC–*a* (FIGS. 22 and 26) close to complete an energizing circuit for a checking circuit holding relay KHC (FIG. 26). The relay KHC is energized through the completed circuit and the contacts associated with the relay KHC are actuated. A holding circuit is completed through a pair of closed contacts KHC–*a* and a pair of closed error reset button contacts ER. Thus, the relay KHC remains energized until the error reset button contacts are manually opened by actuation of the error reset button at the control board 105 (FIG. 1).

In addition, a pair of contacts KHC–*b* (FIG. 25) are opened to prevent an encoder clutch magnet LCE (more fully discussed hereinafter) from being energized so that recording of the fallacious code in storage is prevented. Also, a start reproduce signal is blocked from the lead 2022 (FIG. 20) by the opening of a pair of contacts KHC–*c*. The data processing system automatic operation is therefore suspended until the error reset button ER is actuated and the error is corrected. Optionally, fallacious pulse groups are ignored whenever the error reset button contacts are left open.

A visual indication of an error is also provided. Whenever the contacts KHC–*d* (FIG. 26) close, power is supplied to an error indicator lamp EI.

The mutilated pulse groups include groups with coincident pulses, groups with extra pulses, and groups with pulses missing. The first type of mutilated pulse groups, groups with coincident pulses, have a unit and naught pulse occurring during the same time interval.

The following components are used in the checking circuit for detecting groups with coincident pulses: a coincident pulse AND gate CP (FIG. 22) and the relay KCC.

The units and naughts output of the demodulators are connected to respective input terminals of the AND gate CP. Thus, whenever pulses occur in coincidence at the outputs of the demodulators, the AND gate CP and the relay KCC are energized, thereby causing a sequence of events for suspending automatic operation of the system identical to those described hereinbefore after the detection of a fallacious code group.

The second type of mutilated pulse groups are groups with extra pulses. These groups have more pulses than the number of pulses of which character groups are composed.

The portion of the checking circuit used for detecting groups with extra pulses includes a naught detector reciprocircuit ND which may be of the type of reciprocircuit used in the shift register (FIG. 21), a unit-naught OR gate UN, an extra pulse AND gate EP, and the relay KCC.

It will be recalled that before each character group of pulses are applied to the shift register, all of the reciprocircuits of the shift register except the highest order are placed in their unit condition by a reset pulse. The circuit ND is also placed in its unit condition by the same reset pulse. The highest order reciprocircuit is placed in its naught condition.

Whenever a character pulse and the corresponding clock pulse are applied to the input of the shift register, all of the character representations of the register are shifted to the right (FIGS. 21 and 22) and therefore to the next lower order. Thus, after receipt by the highest order reciprocircuit of the last or highest order pulse of a pulse group at the left, the naught representation originally in the highest order reciprocircuit is shifted out of the rightmost or lowest order reciprocircuit into the circuit ND. Consequently, whenever the shift register receives a number of pulses equal to the number of pulses that constitute a character group, the circuit ND is placed in its naught condition.

With the circuit ND in its naught condition, an arming potential from the units output of the circuit ND is applied to an arming terminal of the gate EP. If a character group contains an extra pulse, it is applied from the naughts or units output of the demodulators to respective input terminals of the OR gate UN. The extra pulse is transmitted through the gate UN to the gate EP thereby energizing the gate EP and the relay KCC and causing a sequence of events for suspending automatic operation of the system identical to those described hereinbefore after the detection of a fallacious code group.

The third type of mutilated pulse groups are groups with pulses missing. These groups have less than the number of pulses that compose a character group. The components in the checking circuit used for detecting the absence of a pulse include a missing pulse AND gate MP, the naught detector circuit ND, and the relay KCC.

Two circuit conditions occur whenever a pulse is missing.

First, at the end of the pulse group, the naught representation originally entered in the highest order of the shift register is not shifted out of the lowest order but remains in one of the higher orders. Therefore, the circuit ND continues in its reset unit condition and an arming potential is applied from the naughts output to an arming terminal of the gate MP.

Second, the gap at the end of the pulse group is detected by the gap detector. Thus, a pulse is transmitted from the gap detector output to the input of the AND gate MP thereby energiizng the gate MP and the relay KCC and causing a sequence of events for suspending automatic operation of the system identical to those described hereinbefore after the detection of a fallacious code group.

*Program Chart*

In order to more clearly present the flexibility, versatility, and significance of the program unit and to enable a clear understanding of following discussions, a representative program chart is shown in FIG. 23.

In the preferred embodiment of the program unit, there are 13 instruction bars identical to the representative bar B–1 (FIG. 14). It should be noted, however, that as many bars as desirable can be included in a program unit and that the preferred embodiment is only representative. The designations of the instruction bars are listed at the top of FIG. 23. As discussed hereinbefore, each instruction bar has 23 locations at which a tab corresponding to a command can be placed. The 23 commands corresponding to the tabs that can be preset on an instruction bar are listed from 1 to 23 at the left of the program chart (FIG. 23). Thus, FIG. 23 can be used to plan the preset instructions to be placed in the program unit: a mark placed in a particular square indicates that the command in the horizontal column is to be coded on the instruction bar in the vertical column. For example, the bar B–2 is coded with three commands: record to transport 102, "keyboard entry," and "select instruction bar B–3." Accordingly, a command tab is placed at each corresponding location on the bar B–2.

When an instruction bar is translated to its shifted position, as described hereinbefore, the preset command tabs rotate vanes that actuate groups of command switches, such as switch C–1–a, one of a group C–1 (FIG. 14). These command switches are designated in the various figures of the drawing with the prefix C followed by the number listed to the left of each command on the program chart (FIG. 23) and by a letter designating the particular pair of contacts of the switch group. For example, one pair of contacts of the switches associated with the command "reproduce from transport 102," is designated C–1–a. Thus, any switch with a C prefix can be associated with a command by reference to the command chart.

*Instruction Bar Selection Circuit*

The manner in which a bar is shifted to place it in a position to control the data processing system has been discussed hereinbefore. In that discussion, it was pointed out that when a magnet LB–1 (FIG. 14) is energized the program unit shift mechanism (FIG. 15) is conditioned to shift the instruction bar B–1 during the instruction change cycle. Similarly, each of the other instruction bars is associated with a respective selection magnet. These magnets are shown in FIG. 24 and after a prefix L bear the same designation as the associated instruction bar listed at the top of FIG. 23. Energization of any one of these magnets causes the associated bar to be shifted during the associated instruction change cycle. There are several ways by which the magnets can be energized.

The magnets LB–A, LB–B, and LB–C can be energized by depression of respective select buttons SB–A, SB–B, and SB–C (FIG. 24) manually at the typewriter control board 105 (FIG. 1). For example, depression of the button SB–A completes a circuit from a positive bus 2400 through an instruction change magnet LIC, the magnet LB–A, and the contacts of the button SB–A to ground. The magnet LIC and the magnet LB–A are energized through the completed circuit. The energized magnet LB–A conditions the program unit shift mechanism to shift the bar B–A as previously discussed. With the magnet LIC energized, the clutch 1412 (FIGS. 13 and 14) is released to complete a single cycle of rotation. During the cycle, the conditioned bar B–A is shifted to a latched position in the manner discussed hereinbefore. Thus, the bar B–A is selected and shifted to its latched position where it remains until the next bar is selected.

The magnets LB–A, LB–B, and LB–C can also be energized in response to control characters reproduced from storage. The control characters comprise an instruction change character followed by an alphabetical or numerical character corresponding to the bar that is to be selected. Whenever the instruction change character is reproduced from storage, the representation is transferred, as usual, to the matrix during the associated receiving cycle. A sensing bar corresponding to the instruction change character is passed through the matrix. In its actuated position the sensing bar closes a pair of instruction change matrix receiving contacts MRC–1C–a (FIGS. 9 and 24). At the same time, a pair of contacts LCR–g (FIGS. 13 and 24) are closed by the associated cam during rotation of the receiving shaft 701. These closed contacts complete a circuit from the positive bus 2400 through a reproduce change relay KRP (FIG. 24), a pair of contacts C–19, the contacts MRC–IC–a, and the contacts LCR–g, to ground. The relay KRP is energized through the completed circuit, thereby causing its associated contacts KRP–a and KRP–b to close. With the relay KRP energized, the closed contacts KRP–a complete a holding circuit for the relay KRP. The relay KRP therefore remains energized when the contacts LCR–g and MRC–IC–a open at the completion of the receiving cycle.

After the reproducing of the instruction change character, the next alphabetical or numerical character reproduced from storage corresponds to the bar that is to be selected. For example, if the next character is A, the representation is transferred to the matrix in the usual manner. The corresponding sensing bar passes through the matrix and closes a pair of matrix receiving contacts MRC–A (FIG. 24). Since the relay KRP remained energized, the contacts KRP–b are still closed so that a circuit is completed from the bus 2400 through the magnet LIC, the magnet LB–A, the contacts MRC–A, and the contacts KRP–b to ground. The magnets LIC and LB–A are energized through the completed circuit. The energized magnet LB–A conditions the corresponding bar B–A to be shifted during the instruction change cycle. The energized magnet LIC releases the clutch 1412 (FIG. 14) so that the conditioned bar B–A can be shifted and latched as described hereinbefore. During rotation of the clutch 1412, the contacts LIC–d (FIG. 24) are opened and then closed. This opens the holding circuit for the relay KRP so that the relay becomes de-energized and the associated contacts opened. Thus, the bar B–A is selected and shifted to its latched position where it remains until the next bar is selected.

All of the instruction bar magnets LB (FIG. 24) can be selected by reproducing the instruction change character and then reproducing the character corresponding to the associated bar. It is noted, however, that the magnets LB–H and LB–H′ are selected by reproducing the same characters. This is also true of the magnets LB–J and LB–J′. The position of a pair of contacts C–15 determines which of the magnets are to be energized. Normally, with the contacts C–15 in the position shown, the magnets LB–H and LB–J are energized. However, when a branch command (C–15, FIG. 23) is coded on the bar currently in position to control the system, the command contacts C–15 are in their right, or actuated position. In this position, an instruction change character and an H or a J reproduced from storage causes the bar B–H' or B–J' to be selected respectively.

Another way by which instruction bars can be selected is when a bar, in position to control the system, has an "automatic instruction change" command (C–14, FIG. 23) and either the command "select instruction bar B–1" (C–8) "select instruction bar B–2" (C–9), or "select instruction bar B–3" (C–10) coded thereon. For example, with the commands "automatic instruction change" and "select instruction bar B–1" coded on a bar such as B–A, and with the bar B–A in its latched position, the contacts C–14 and C–8 (FIG. 24) are closed. A circuit is completed thereby from the bus 2400 through the magnet LIC, the magnet LB–1, the contacts C–8, and the contacts C–14 to a lead 2401. Closure of a pair of sending cycle contacts LCS–a or the receiving cycle contacts LCR–g (FIGS. 13 and 24) completes an energizing circuit for the magnets LIC and LB–1 to ground. The contacts LCS–a close during a sending cycle which occurs after a key is depressed at the keyboard. The contacts LCR–g close during a receiving cycle after a character is reproduced from storage. Thus, with the commands "automatic program change" and "select instruction bar B–1" coded on the instruction bar B–A and with the bar B–A in position to control the system, either the reproducing of a character from storage or depression of a typewriter key causes the magnets LIC and LB–1 to become energized. With the magnet LB–1 energized, the bar B–1 is conditioned to be shifted and, with the magnet LCI energized, rotation of the clutch 1412 (FIG. 14) is initiated. Thus, the bar B–A is released from its latched position and the bar B–1 is shifted to its latched position in the manner previously discussed.

Instruction bars can be selected in still another way. When a bar in position to control the system has one of the commands "select instruction bar B–1" "select instruction bar B–2," or "select instruction bar B–3" coded thereon, depression of the instruction bar select button IS–1 causes the bar corresponding to the command to be selected. For example, if the bar B–C is in its latched position and has the command "select instruction bar B–2" (C–9, FIG. 23) coded on it, a circuit is completed from the positive bus 2400 through the magnet LIC, the magnet LB–2, and the switch C–9 to a lead 2403. Depression of the button IS–1 at the control board 105 (FIG. 1) completes the circuit to ground. The magnets LIC and LB–2 are energized through the completed circuit so that the bar B–2 is shifted to its latched position and the bar B–C is released in the manner previously discussed.

The magnets LB–4 and LB–5 can be energized in a similar manner. When a bar in position to control the system has one of the commands "select instruction bar B–4" or "select instruction bar B–5" coded thereon, depression of the instruction select button IS–2 causes the bar mentioned in the command to be selected.

Thus, when a bar in its latched position is coded with a command from each of the groups "select instruction bar B–1, B–2, and B–3" and "select instruction bar B–4 and B–5," the bar corresponding to the command from the first group can be selected by depressing the button IS–1 and the bar corresponding to the command from the second group can be selected by depressing the button IS–2. A choice of selection between the two bars may therefore be made at the control board 105 (FIG. 1).

One magnet, a record end instruction bar magnet LB–RE, can be energized in still another way. The magnet LB–LR is energized in response to the reproducing of a record end character. This character is reproduced from storage and transmitted to the matrix in the usual manner. The sensing bar corresponding to the character is passed through the matrix to close a pair of tape end matrix receiving contacts MRC–RE (FIG. 24). With these contacts closed, an energizing circuit is completed for the magnets LIC and LB–RE. Energization of these magnets causes the bar RE to be shifted in the manner previously discussed. Thus, the bar RE can be selected in response to one special character, record end, without first reproducing the instruction change character.

Selection of the bar TE without first reproducing the instruction change character is useful when making an exact copy of a record. When copying previously recorded material, it is necessary to render ineffective the instruction change characters so that the operation can be completed without changing bars. In order to render the instruction change character ineffective, the bar that is in control of the system during the copying must have coded on it a "bypass instruction change character" command (C–19, FIG. 23). With this command coded on the bar, the contacts C–19 (FIG. 24) are opened. Thus, whenever the instruction change contacts MRC–IC–a close in response to the reproducing of an instruction change character, the energizing circuit to the relay KRC is not completed. The instruction change character and the following character which designates the bar to be selected have no effect on the instruction bar selection circuit. Therefore, these characters representations can be passed through the matrix and recorded in storage in the same manner as the other data. So that control can be returned to the keyboard at the end of a copying operation, a record end character is recorded at the end of a record that is to be copied. Whenever this record is copied, the bar RE is selected at the completion of the operation in response to the reproducing of the record end character. With the bar RE in its latched position at the end of a copying operation, the data processing system can be controlled manually at the keyboard for initiating further operation. In addition, the bar RE normally has a command "end of record" (C–23, FIG. 23) coded on it. With this command coded on the bar, a pair of contacts C–23 (FIG. 26) are closed to complete an energizing circuit for a record end indicating light REL. Thus, their light glows as long as the bar RE is in control.

The bar B–C, in addition to being selected by depression of the button SB–C or the reproducing of an instruction change character followed by the character C, as discussed previously, can also be selected in another way. With a command "carriage return selects instruction bar B–C" coded on a bar and with the coded bar in its latched position, a partial energizing circuit is completed for the magnets LIC and LB–C whenever a carriage return character is reproduced from storage or the carriage return key is depressed. For example, with the command "carriage return selects instruction bar B–C" coded on a bar and with the coded bar in its latched position, the contacts C–13 are actuated and therefore closed. When the matrix sensing bar corresponding to the "carriage return" character is passed through the matrix during the associated sending cycle, it actuates the carriage return matrix sending contacts MSC–CR–a (FIG. 24). Since the sending cycle contacts LCS–a also close during a sending cycle, the energizing circuit for the magnets LIC and LB–C is completed so that the bar B–C is shifted to its latched position. Similarly, the carriage return character sensing bar is passed through the matrix in the opposite direction during a receiving cycle to close a pair of carriage return matrix receiving contacts MRC–CR–a. Since the receiving cycle contacts LCR–g 2130 close during a receiving cycle, the energizing circuit for the magnets LIC and LB–C is completed and the bar B–C is therefore shifted to the latched position.

At various times it is necesssary to remove the instruction bars from the program unit so that the command coding on the bars can be changed or so that a new set of bars with different codings can be placed in the program unit. To remove the instruction bars, it is necessary that none of the bars be in the latched position. In response to depression of a clear program button provided at the control board 105 (FIG. 1), any instruction bar in its latched position is released to return to the normal position. Depression of the clear program button closes a pair of contacts CP (FIG. 24) to complete an energizing circuit for the magnet LIC through a load resistor 2402. The magnet LIC is energized, thereby initiating rotation of the clutch 1412 (FIG. 14). Usually, as discussed hereinbefore, the bar currently in position to control the system is released and the bar that has been selected is shifted. However, in this case, since none of the bar selection magnets were energized, none of the bars are conditioned to be shifted. Therefore, the bar currently in position to control the system is released and all other bars remain in the normal position. The instruction bars and the removable rack 1406 (FIG. 14) on which they are mounted can now be removed.

*Example Program*

To illustrate the manner by which the data processing system circuits are conditioned and the various instructions are performed, it is appropriate to present and discuss an example program during which a transaction is accomplished.

The commands of the program are coded on the instruction bars, as marked on the command chart (FIG. 23). The instruction bar designations, with the associated commands, are shown in block form in an Example Program Instruction Chart (FIG. 27) in the sequence in which they are selected during the example program.

In this example, a card capsule is in the transport 103 and a tape capsule in the transport 102. The card bears fixed information required for the transaction. Portions of the fixed information as well as variable information is recorded on the tape during the transaction.

The card bearing the necessary information is selected and placed in the card capsule. The button on the capsule corresponding to the card channel bearing the information is depressed. This positions the capsule heads and connects the heads corresponding to the desired channel to the capsule output as mentioned hereinbefore.

In addition, the instruction bar B-2 is selected by depressing button SB-2 at the control board 105 (FIG. 1). The bar B-2 is shifted and latched in the manner discussed hereinbefore. The instruction composed of the commands "record to transport 102" (C-3), "keyboard entry" (C-6), and "select instruction bar B-3" (C-10) is represented by tabs coded on the bar B-2 at corresponding locations. Thus, the command switches C-3, C-6, and C-10 are actuated so that the associated circuits are completed to condition the system to perform the respective commands.

With the switches C-3 actuated, three circuits are established to condition the system to perform a "record to transport 102" command. The switch C-3-a (FIG. 20) is closed and as a result, as discussed previously, the tape advances immediately to the recording area. The switch C-3-b is also closed, thereby connecting the input of the amplifier 2003 to the terminal 1604 and hence to the commutator brush 1603. The clutch solenoid 2000 can therefore be energized during rotation of the commutator, as discussed previously. A switch C-3-c (FIG. 26) is also closed, thereby providing an energizing circuit for the head-switch relay KHS-1 (FIGS. 16 and 26). With this relay energized, a circuit is established so that coded pulses from the matrix output switches 502 (FIG. 16) are transmitted to the transport 102 as discussed hereinbefore. A switch C-3-d (FIG. 25) is also closed. A circuit is thereby conditioned for energizing an encoder clutch magnet LCE. Energization of this magnet allows a single cycle clutch 1311 (FIG. 13) to engage and supply rotational power to the commutator 1306 through a shaft 1301, as discusssed hereinafter.

With the switch C-6 actuated, an neergizing circuit for a blocking bail solenoid LBB (FIG. 25) is completed through a pair of contacts C-6-a. With the solenoid LBB energized, the typewriter keyboard is unlocked, as discussed hereinbefore, so that any of the keys can be depresssed.

With the switch C-10 (FIG. 24) closed, the energizing circuit for the selection magnet LB-3 can be completed by depression of the switch IS-1 at the end of the instruction at the control board 105 (FIG. 1) as discusssed previously.

With the system controlled in accordance with the above commands, depression of a typewriter key at the keyboard causes the setting and scanning of the matrix switches, and the recording of the character of the depressed key on the tape, in the following manner. Whenever a typewriter key is depressed, the send bail contacts SBC-a (FIGS. 4 and 25) are closed, as discusssed hereinbefore. The sending cycle magnet LCS is energized through the closed contacts. Energization of the magnet LCS releases the single cycle sending clutch 1300 (FIG. 13) for engagement. Rotational power is thereby supplied to the sending shaft 1301. As the shaft 1301 rotates, the matrix bars are released to set the matrix output switches 502 (FIGS. 5 and 16) in a code corresponding to the depressed typewriter key as discussed previously. Also, a pair of cam operated contacts LCS-b (FIGS. 13 and 25) are closed. The encoder clutch magnet LCE (FIG. 25) is energized through the closed contacts LCS-b. Energization of the magnet LCE releases the single cycle encoder clutch 1311 (FIG. 13) for engagement. Rotational power is thereby supplied to the encoder shaft 1307. As the shaft 1307 begins rotation, a pair of cam operated contacts LCE-a (FIGS. 13 and 25) close and complete an energizing circuit for the matrix output magnet LMO (FIGS. 5 and 25). With the magnet LMO energized, the matrix output switches 502 (FIGS. 5 and 16) are latched in their coded condition. The magnet LMO remains energized until the contacts LCE-a open near the end of the single cycle of rotation of the clutch 1311.

Also, during the engagement of the clutch 1311, rotational power is supplied to the commutator 1306. Thus, the coded and latched switches 502 (FIGS. 5 and 16) are scanned during rotation of the commutator 1600 (FIG. 16). The resulting coded signals are transmitted from the switches 502 to the record-reproduce contacts 206. In addition to scanning the switches 502, a potential is applied from the commutator to the terminal 1604 (FIGS. 16 and 20). In response to this potential, the magnetic medium in the capsule in the transport 102 advances during the scanning of the switches 502 in the manner discussed previously.

Since the record-reproduce contacts 206 are set to transmit the coded signals to the transport 102, the character corresponding to the depressed typewriter key is recorded on the magnetic medium in the capsule in the transport 102. Therefore, variable data, as for example a name, address, and date can be entered at the keyboard and recorded in storage.

Figure 27:
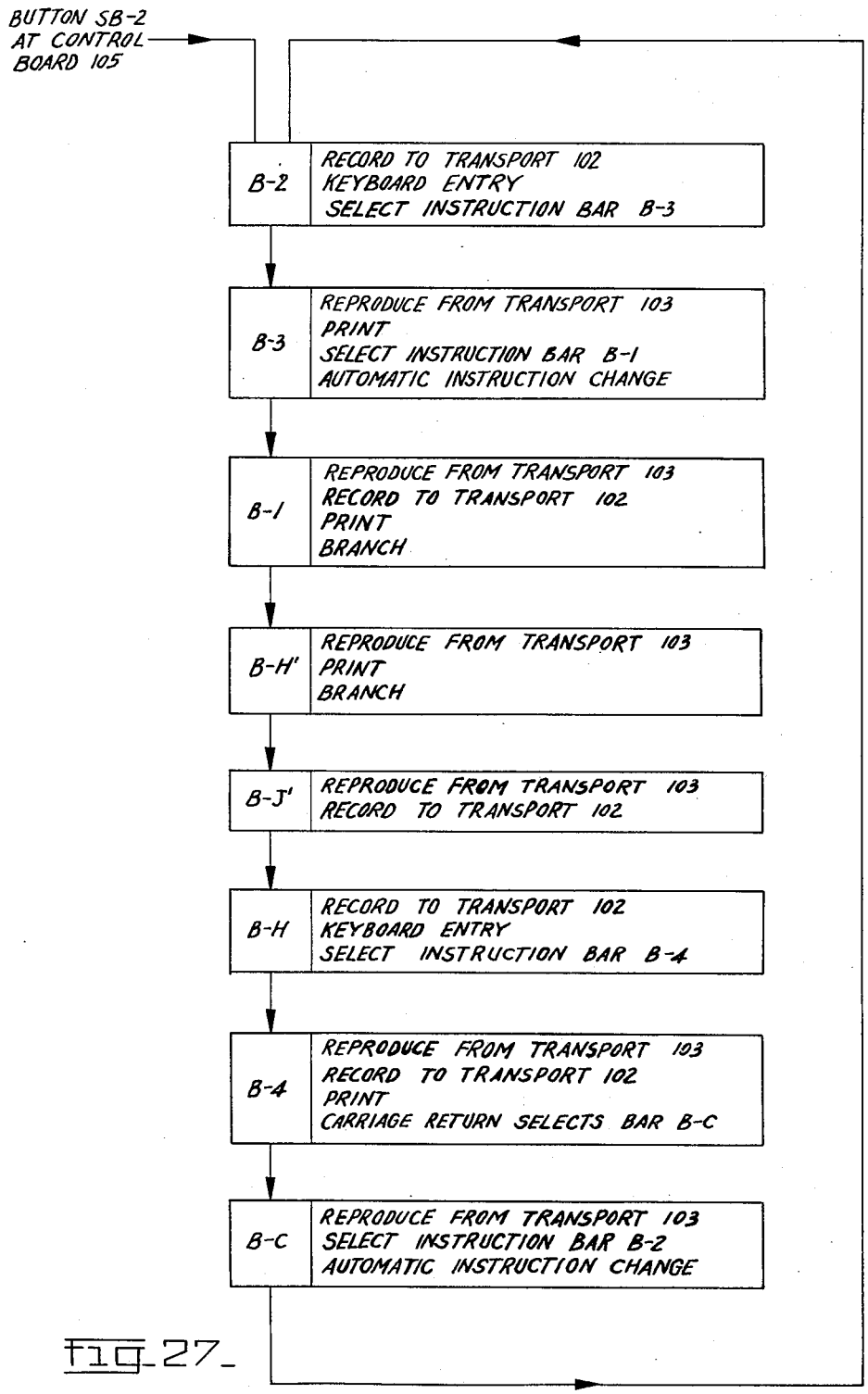
FIG. 27 is an example program instruction chart outlining an example program used to illustrate a mode of operation of the system according to the invention.

After entry of the variable data, depression of the button IS-1 causes the selection of the bar B-3 in accordance with the program outlined in FIG. 27. The instruction coded on this bar is composed of the associated commands listed in FIG. 25. Since the bar B-3 has the command "reproduce from transport 103" coded on it, all of the corresponding contacts C-2 are actuated. With the contacts C-2-a (FIG. 20) closed, a circuit is completed from the output of the bistable device 2020 to the input of the amplifier 2005. Thus, this circuit enables the clutch solenoid 2001 of the transport 103 to respond to potentials from the device 2020 to control the advance of the card during reproducing, in the manner discussed previously. With the contacts C–2–b closed, the receiving clutch magnet KRC also responds to potentials from the device 2020 as discussed previously. With the contacts C–2–c (FIG. 26) closed, the relays KHS–3 and KHS–4 (FIGS. 16 and 26) are energized. Consequently, the output of the transport 103 is connected to the demodulators 202 (FIG. 2) in the manner discussed hereinbefore. With the contacts C–2–d closed the card drive relay KCD (FIG. 26) is energized. With the relay KCD energized, a pair of contacts KCD–a are closed to complete a holding circuit for the relay KCD. A pair of contacts KCD–b are also closed to complete an energizing circuit for the solenoid 1129 (FIG. 11). As discussed hereinbefore, energization of the solenoid 1129 causes the pinch rolls 1113 and 1115 to press the card against the drive roll 1105 so that the card may be advanced.

The bar B–3 has, in addition, a print command coded on it. A pair of contacts C–5 are therefore closed to complete an energizing circuit for the key pull down solenoid LPD (FIG. 25). As discussed previously, energization of the solenoid LPD releases the pull down bail 906 (FIG. 9) to actuate the typewriter keys to print data reproduced from storage.

The remaining commands coded on the bar B–3 are "automatic instruction change" and "select instruction bar B–1." The effect of these commands, as discussed previously, is to cause the bar B–1 to be shifted to its latched position after the reproducing of the first character from storage.

At the beginning of the instruction change cycle during which the bar B–2 is released and the bar B–3 is shifted to its latched position, the cam operated contacts LIC–a (FIG. 20) close to maintain the circuit 2020 in its right-hand condition. After the bar B–3 is placed in its latched position, the contacts LIC–a open and the contacts LIC–b momentarily close. The circuit 2020 is thereby placed in its left-hand condition. A high potential is applied therefore to the amplifier 2005 through the contacts C–2–a. The card advances in response thereto so that the first character is reproduced. The electrical representation of this character is transmitted through the record-reproduce contacts 206 (FIG. 2) and the demodulators 202 to the inputs of the shift register and gap detector. At the conclusion of reproducing the character, as described hereinbefore, the magnets 700 (FIGS. 7 and 21) are energized to represent the character and a negative pulse is transmitted from the gap detector to the terminal 1910 (FIGS. 19 and 20). This negative pulse causes the circuit 2020 to shift to its right-hand condition. A high voltage is thus applied to the amplifier 2026, thereby causing energization of the receiving cycle relay KRC through the contacts C–2–b. The energized relay KRC closes a pair of contacts KRC–d (FIG. 25), thereby completing an energizing circuit for the magnet LCR. The clutch 1310 (FIG. 13) is released upon energization of the magnet LCR to supply rotational power to the shaft 701. During rotation of the shaft 701, the character represented by the energized magnets 700 is printed at the typewriter in the manner described hereinbefore.

Automatically, after printing of the first character, as mentioned previously, the bar B–3 is released and the bar B–1 is shifted to its latched position.

Thus, data, such as the first character of a catalog number which is required to be printed but not recorded, can be reproduced from the card and printed. The next instruction is then selected automatically for printing and recording the remainder of the catalog number.

With the bar B–1 in its latched position, the switches C–2, C–3, C–5, and C–15 are actuated according to FIGS. 23 and 27. Reproducing from the card, printing at the typewriter, and recording at the transport 102 is accomplished in the manner described above. However, the encoder magnet LCE is energized hrough a pair of receiving cycle contacts LCR–f (FIGS. 13 and 25) instead of the sending cycle contacts LCS–b described above. The reproducing, printing, and recording (of the catalog number, for example) continues until an instruction change character followed by the character H are reproduced from the card. Since a branch command is coded on the bar B–1, the reproducing of these two characters initiates an instruction bar change cycle, during which the bar B–1 is released and the bar B–H' is shifted and latched into position, in the manner discussed previously.

With the bar B–H' in its latched position, the system reproduces and prints according to the instruction comprising the commands coded on the bar B–H' indicated in the FIGS. 23 and 27. This instruction can be used for printing fixed data, as for example, a description of the article corresponding to the catalog number. Upon reproducing an instruction change character and the character J, an instruction change cycle is initiated during which the bar B–H' is released and the bar B–J' is shifted and latched into position.

With the bar B–J' in its latched position, the system reproduces and records according to the instruction comprising the commands coded on the bar B–J' indicated in the FIGS. 23 and 27. This instruction can be used for recording fixed data, as for example, a number which is descriptive of the article. Upon the reproducing of an instruction change character and the character H, an instruction change cycle is initiated during which the bar B–J' is released and the bar B–H is shifted and latched into position.

With the bar B–H in its latched position, variable data, as for example, the quantity or number of articles, may be entered at the keyboard and recorded on the tape. After this entry, an instruction change to bar B–4 is accomplished by depressing the button IS–2 (FIG. 24).

With the bar B–4 in its latched position, fixed data, as for example, the unit price and weight of the article, is reproduced from the card, printed at the typewriter and recorded on the tape. In the present example, the printing of the weight concludes the example transaction and coincides with the end of the line at the typewriter. Therefore, a carriage return character reproduced from the card causes the selection in the manner discussed previously, of the bar B–C according to the command "carriage return selects bar B–C" coded on the bar B–4. In addition, the reproducing of the carriage return character returns the typewriter carriage to its initial position in the usual manner.

Another result of reproducing a carriage return character is that a pair of carriage return matrix receiving contacts MRC–CR–b (FIG. 25) are closed to complete an energizing circuit for a carriage return holding relay KRH. With the relay KRH energized, a pair of contacts KRH–a are actuated to provide a holding circuit for the relay KRH and to break the energizing circuit for the magnet LCR. Thus, the next character reproduced from storage is held in the shift register until the contacts KRH–a are returned to their non-actuated position. This is accomplished by the momentary opening of a pair of carriage return contacts CRC when the carriage is returned to its initial position. A similar action occurs when a tab character is reproduced from storage, in which case a pair of tab contacts TC are momentarily opened after the relay KRH is energized through a pair of contacts MRC–T–a.

With the bar B–C in the latched position and the commands indicated in the FIGS. 23 and 27 coded on the bar B–C, the next character reproduced from the card initiates an instruction bar change cycle during which the bar B–2 is selected. The next character reproduced from the card is a release card character. In response to the reproducing of this character, a pair of release card matrix receiving contacts MRC–RC (FIG. 26) open and break the energizing circuit for the relay KCD. With the relay KCD deenergized, the contacts KCD–b open to break the energizing circuit for the solenoid 1129 (FIG. 11). With the solenoid 1129 deenergized, the pinch rolls 1113 and 1115 are raised from the card. The card is released thereby to return to its initial position under the urging of the spring 1107.

Thus, the program is completed, the carriage and card are returned to their initial positions, and the bar B-2 is again in its latched position so that a similar transaction may be accomplished.

The commands listed in FIG. 23 not previously mentioned, as well as several buttons located at the control board, are presented briefly in the following paragraphs. In view of the preceding detailed explanations of the mode of operation of the data processing system, only a general discussion of the effects produced by the remaining commands and switches is believed to be necessary.

One command not previously mentioned is step (C-7, FIG. 23). By coding a step command on an instruction bar with a reproduce command, single characters can be reproduced from storage in response to depression of a start-reproduce button BSR (FIG. 20) at the control board 105 (FIG. 1). Depression of the button BSR initiates reproducing by connecting a positive potential to the lead 2022. Reproducing is carried out in the manner described hereinbefore. However, the automatic connection of a positive potential to the lead 2022 is prevented after the reproducing of the first character. This is due to the open step command switches C-7-a and C-7-b (FIG. 20) in the respective start-reproduce circuits. Thus, the start-reproduce button must also be depressed to reproduce each subsequent character.

Another command, reverse (C-16, FIG. 23) permits reversal of the direction of motion of the storage media in both of the capsules. With a reverse command coded on an instruction bar, the switch C-16-a (FIG. 26) is closed to complete an energizing circuit for a reversing clutch relay KRV (FIGS. 20 and 26) and a solenoid SRC (FIGS. 13 and 26). With the solenoid SRC energized, a group of contacts KRV-a and KRV-b (FIG. 20) are actuated to connect the reversing limit switch 2027 and a similar limit switch 2030 in their respective solenoid circuits. These reverse limit switches can therefore break the solenoid circuits whenever the tape in the respective capsules has been unwound to the limit in the reverse direction. With the solenoid SRC energized, an internal clutch shaft 1312 (FIG. 13) is moved to the left. A pair of clutch plates 1313 and 1314, which are fixed to the shaft 1312, also move to the left. Thus, the plate 1313 moves out of engagement with a mating clutch plate fixed to an external idler shaft 1315; and the plate 1314 moves into engagement with a mating clutch plate fixed to an external idler shaft 1316. Thus, the direction of rotation of the shaft 1312 is reversed, the direction of rotation of the shaft 1302 is reversed, and therefore the direction of motion of the storage media in both capsules is reversed.

Another command, verify (C-17, FIG. 23), permits checking of each character of a magnetic record by reproducing the record and simultaneously typing the identical data. Optionally, the checked or verified record can be recorded, at the same time, on a second magnetic record. The first character checked is reproduced in the usual manner. However, since a verify command switch C-17-a (FIG. 20) is open, the potential that is usually applied through the contacts LCR-b to the thyratron amplifier 2026 to initiate the second portion of the receiving cycle is blocked. The sensing bar 403 and key link 405 (FIG. 9) corresponding to the first character therefore stop in the left-hand position. In this position, the key link clears the blocking bail 407. Thus, this key link, and therefore the attached typewriter key may be depressed.

All other keys are blocked by the bail 407. A fallacious or mutilated character is therefore detected at the keyboard by a blocked key. After a fallacious or mutilated character is reproduced, if it is necessary to determine which key is not blocked, a trial verify switch can be actuated to open a pair of contacts TV (FIG. 25). With the contacts TV open, the unblocked key can be depressed without recording the character in storage. Conversely, if the character reproduced is the correct one, depression of the correct key closes a pair of send bail contacts SBC-b (FIGS. 4 and 20). A potential is thus supplied to the amplifier 2026 so that the remainder of the receiving cycle can be completed. Upon completion of the first receiving cycle, the usual start-reproduce signal is applied automatically to the lead 2022. The next and following characters are therefore reproduced and checked in the above manner.

Another command, upper case (C-18, FIG. 23), permits printing in upper case symbols. With an upper case command coded on an instruction bar, the contacts C-18 (FIG. 26) are closed to complete an energizing circuit for an upper case solenoid SUC. This solenoid can also be energized in the usual manner in response to depression of a shift key at the keyboard and the closing of a pair of corresponding contacts SC. With the solenoid SUC energized, the typewriter keys are shifted to print their upper case symbols.

Another command, "record instruction change characters" (C-20, FIG. 23), permits recording of instruction change characters. These characters are normally prevented from being recorded due to the opening of the instruction change matrix sending or receiving contacts MSC-IC or MRC-IC-b (FIG. 25) during the corresponding sending or receiving cycle. Opening of these contacts normally prevents energization of the encoder clutch magnet LCE and the subsequent recording of the character. By coding a "record instruction change characters" command on an instruction bar, a pair of command contacts C-20 (FIG. 25) are closed, thereby completing a bypass circuit around the contacts MSC-IC and MAR-IC-b. Energization of the magnet LCE and therefore recording of instruction change characters can thus be accomplished.

Another command, "record tab and carriage return characters" (C-21, FIG. 23), permits recording of tab and carriage return characters. These characters are normally prevented from being recorded due to the opening of the tab and carriage return matrix sending or receiving contacts MSC-T, MRC-T-b, MSC-CR-b, or MRC-CR-c (FIG. 25) during the corresponding sending or receiving cycle. By coding a "record tab and carriage return characters" command on an instruction bar, a pair of command contacts C-21 are closed. A bypass circuit around the above matrix contacts is thereby completed to allow recording of the tab and carriage return characters.

Another command "space non-record" (C-22, FIG. 23), prevents the space character from being recorded. With this command coded on a bar, a pair of contacts C-22 (FIG. 25) are opened to break a bypass circuit around a pair of matrix sending and matrix receiving space contacts MSC-Space and MRC-Space. Thus, when these matrix contacts are opened during a sending or receiving cycle involving a space character, the character is not recorded.

The number and type of commands and number of instruction bars presented in FIG. 23 are illustrative of the principles and mode of operation and the invention should not be considered as limited to only the number and type presented. Any number of commands or bars can be utilized to accomplish a variety of operations.

One typewriter control of special interest not previously mentioned is the backspace key. The typewriter carriage is always backspaced in response to depression of this key. In addition, with a bar in control having a "keyboard entry" command coded thereon, the magnetic medium in the capsule which has been selected for recording is backspaced a character at a time in response to depression of the backspace key.

Due to the coding of the keyboard entry command, the contacts C–6–b (FIG. 25) are closed. Therefore, in response to depression of the backspace key, a pair of backspace contacts BSC close to complete an energizing circuit for the backspace relay KBS. With this relay energized, the contacts KBS–a close to complete a holding circuit for the relay KBS. The contacts KBS–b also close to complete an energizing circuit for the reversing solenoid SRC (FIG. 26) and the reversing relay KRV. With the solenoids SRC and KRV energized, the capsule drive and limit switches are reversed, as discussed previously. Also, the contacts KBS–c close to complete an energizing circuit for the magnet LCE. With the magnet LCE energized, the clutch 1311 (FIG. 13) is released for engagement to rotate the shaft 1307. The magnetic medium in the capsule selected for recording is therefore backspaced one character. Near the end of the rotation of the shaft 1311, the contacts LCE–b (FIGS. 13 and 25) are opened to break the holding circuit for the relay KBS. The magnet LCE, the relay KRV and the solenoid SRC are therefore de-energized at the completion of the backspace.

A pair of typewriter controls not fully discussed previously are the "clear program" button and a "manual card reset" button. Whenever either of these buttons is depressed, respective contacts CP and MCR (FIG. 26) are opened. The energizing circuit for the relay KCD is thereby broken to allow a card in either capsule to return to its initial position, in the manner discussed hereinbefore.

Another control not fully discussed previously is the "skip word" button. In response to depression of this button a group of contacts 1913–b (FIG. 20) are actuated in addition to the contacts 1913–a (FIG. 19) discussed previously. Actuation of the contacts 1913–b permits application of a positive potential to the lead 2022. The magnetic medium is thus advanced or backspaced to the nearest gap between words as discussed hereinbefore, in response to depression of the skip word button.

Another control is the "stop reproducing" button. Depression of this button at the control board 105 (FIG. 1) opens a pair of contacts BSP (FIG. 20). With these contacts open, the circuit is broken through which a positive potential is normally applied to the lead 2022 at the end of a receiving cycle or an instruction change cycle. Thus, reproducing does not continue automatically until the stop reproducing button is released and a positive potential is applied to the lead 2022.

The invention claimed is:

1. A data processing system including: storage means for storing character representations; means for transducing a character representation from said storage means to a series of pulses; a buffer storage coupled to said transducing means for receiving said pulses and storing a representation of said series of pulses and comprising a plurality of bistable stages each including at least one current conducting element adapted to alternately assume in response to input signals a conducting or non-conducting state; a current source; a respective resistance element connecting said source to each of said current conducting elements; a respective relay including a relay operating coil connected for actuation by the respectively associated bistable stage, the connection including a gaseous discharge element in series with each respective relay coil connected across each of said resistance elements; a translator coupled to said relays and set in response to selective energization of said relays in accordance with the representation stored in said buffer storage; a printing device; and means coupled to said translator and said printing device for actuating said printing device to print the character corresponding to the setting of said translator.

2. In a data processing system, the combination of: a character storage; reading means for transducing a character from said storage to a series of coded pulses; a buffer storage coupled to said reading means for receiving and storing representations of said pulses; a gap detector coupled to said reading means for developing an output pulse in response to detection of the end of said series of pulses; a typewriter; and means coupled to said gap detector, said buffer storage, and said typewriter for actuating said typewriter to print the character corresponding to the representations stored in said buffer storage in response to said output pulse.

3. In a system for reading and printing, the combination of: a medium for storing character representations in binary coded form; reading means for transducing a character representation stored on said medium to a group of pulses; a demodulator for amplifying, clipping, and shaping said pulses; a buffer storage for receiving said pulses from said demodulator and for storing a representation of the character corresponding to said pulses; a gap detector for receiving said pulses from said demodulator and for generating an output pulse after receiving said group of pulses; a translator; means operable in response to said output pulse from said gap detector for setting said translator in accordance with the character representation stored in said buffer storage; a printing device; and means for sensing said translator and for actuating said printing device in accordance with the setting of said translator.

4. A system for reading data representations from a first storage channel and recording corresponding data representations in a second storage channel comprising: a first transducer for reading data representations from the first channel and converting said representations to a first series of pulses; a gap detector for developing a signal upon detection of the end of said first series of pulses; a buffer storage for receiving said first series of pulses; means connecting said first transducer to respective inputs of said gap detector and said buffer storage for applying said first series of pulses to said gap detector and said buffer storage; a translator coupled to said buffer storage and operable to assume a data representing condition corresponding to the data representation contained in said buffer storage; means operable in response to a signal from the gap detector for sensing the data representing condition of said translator and for developing a corresponding second series of pulses; and means for applying said second series of pulses to a second transducer for recording in said second storage channel a data representation corresponding to said second series of pulses.

5. A system for reading data from a first storage channel and recording corresponding data in a second storage channel including: reading means for transducing data from the first channel to a first series of pulses; a gap detector coupled to said reading means for developing a signal upon detection of the end of said first series of pulses; a buffer storage for receiving and storing representations of said first series of pulses; means for applying said first series of pulses to respective inputs of said gap detector and said buffer storage; a translator coupled to said buffer storage and including output switches operable to assume a data representing condition corresponding to the data representations stored in said buffer storage; a commutator for sequentially applying a potential to said output switches for developing a second series of pulses representing said data; and recording means coupled to said output switches for transducing said second series of pulses to data representations in said second channel.

6. A system for processing data including: a first storage channel for storing data; a first reading means for transducing data from said channel to a series of pulses; a buffer storage coupled to said reading means for receiving and storing representations of said pulses; a group of matrix bars; means connecting said buffer storage to said matrix bars for coding said matrix bars to correspond to said buffer storage representations; a group of sensing bars; means for forcing said sensing bars against said coded matrix bars for passing one of said sensing bars through said coded matrix bars; a typewriter; means connecting said typewriter to said sensing bars for actuating a typewriter key corresponding to said passed sensing bar to print data corresponding to the coding of said matrix bars; a group of matrix output switches coupled to said matrix bars and coded according to the coding of said matrix bars; a commutator for serially applying a potential to said coded group of matrix switches for developing a corresponding coded serial pulse group; a second storage channel for storing data; and recording means coupled to said switches for transducing pulses of said developed pulse group to corresponding data representations in said channel.

7. A system for verifying a record comprising: a first storage channel; apparatus for reading a character stored in said first channel; a translator; means coupled to said reading apparatus for setting said translator to represent said character; a keyboard; means for normally locking the keys of said keyboard; means for releasing the key corresponding to the character represented by the setting of said translator; a second storage channel; and means operable in response to the depression of said released key for recording in said second channel a representation of the character.

8. A data processing system for carrying out predetermined programs of operations, each program comprising a sequence of instructions and each instruction comprising at least one command, comprising: a program unit including a group of instruction elements each carrying predetermined representations for controlling the operation of said system at any given time; means for placing a selected instruction element in control of said system; means for storing coded characters including instruction change characters; means for reading a coded instruction change character from storage; and means for receiving said instruction change character and operable in response thereto for changing control of said system from one instruction element to another.

9. A data processing system for carrying out predetermined programs of operations, each program comprising a sequence of instructions and each instruction comprising at least one command, comprising: a program unit including a group of instruction bars each carrying predetermined command representations for controlling the operation of said system at any given time; means for placing a selected instruction bar in control of said system; an instruction change circuit; means including an automatic instruction change command tab on said selected instruction bar for conditioning said circuit to cause an instruction bar change; information storage means; means for receiving information from said storage means; means for detecting a gap in the flow of said information and for developing a signal in response thereto; and means including said conditioned circuit responsive to said signal for changing control of said system from said selected instruction bar to a predetermined other instruction bar.

10. A data processing system comprising: a first storage channel; reading apparatus for reading data from said first storage channel; printing apparatus for printing the data read by said reading apparatus; a keyboard apparatus for manually entering data into said system; a second storge channel; recording apparatus for selectively recording in said second channel the data read from said first channel by said reading apparatus and the data manually entered into the system at said keyboard; command switches respectively associated with said reading apparatus, said printing apparatus, said keyboard apparatus, and said recording apparatus and each command switch operable when actuated for conditioning its respectively associated apparatus; a group of instruction bars each operable when shifted for actuating prearranged groups of command switches; and means for shifting said instruction bars to a shifted position in a predetermined sequence.

11. A data processing system as defined by claim 10 and wherein said means for shifting said instruction bars comprises: a group of selection buttons, each button corresponding to one of said bars; an instruction bar selection circuit for conditioning said bars for movement to the shifted position selectively in response to depression of a corresponding selection button, in response to character pulses corresponding to respective bars, and in response to closure of a command switch corresponding to a respective bar by a bar in its shifted position; and means for moving a conditioned bar to its shifted position.

12. A system for processing data including: a first storage channel: transducing means for transducing data stored on said first channel to a first serial group of pulses; a buffer storage for receiving and storing representations of said pulses; a translator; first setting means for setting said translator according to said representations; printing means for printing data according to the setting of said translator; a keyboard for entering data into said system; second setting means for setting said translator in response to depression of a character key at said keyboard to represent said character; generating means for generating a second group of serial pulses corresponding to the setting of said translator; a second storage channel; means for recording representations of said second pulse group on said second storage channel; program means coupled to said transducing means, said translator, said first and second setting means, said printing means, said keyboard, said generating means, and said recording means and operable for selectively controlling the transduction of data from said first storage channel, the printing of corresponding data by said printing means, the recording of corresponding data on said second storage channel and operable for selectively controlling the entering of data into the system by manual actuation of keys at said keyboard and the recording of representations of said manually entered data on said second storage channel; a group of control buttons; and means for selectively controlling said program means in response to manual depression of said control buttons, in response to a series of pulses corresponding to program change characters transduced from said first channel, and in response to entry of data into the system in combination with a presetting of said program means.

13. A data processing system comprising: a first storage channel; reading means for transducing a data representation in said first storage channel to a corresponding series of pulses; a buffer storage coupled to said reading means for receiving said series of pulses and storing representations of said pulses; a typewriter; a matrix unit coupled to said buffer storage and said typewriter comprising a group of matrix bars arranged in parallel relationship with teeth at coded locations along the length of each bar, a group of magnets respectively associated with said matrix bars and selectively energized according to the representations stored in said buffer storage for enabling actuation of the matrix bars, first means for actuating said enabled matrix bars to present a clear path through said teeth, a group of sensing bars with a first and second group of offset teeth along the length of each sensing bars, means for forcing said first group of teeth of each of said sensing bars against corresponding coded locations of said matrix bar teeth to pass the first group of teeth of a sensing bar corresponding to the representations in said buffer storage through said clear path, first means coupling said sensing bars to said typewriter for actuating a type bar of said typewriter for printing a character corresponding to said representations upon passage of said corresponding sensing bar through said matrix bars, second means connecting the keyboard of said typewriter to said sensing bars for moving the second group of teeth of a sensing bar to abut said matrix bars at corresponding coded tooth locations in response to depression of a corresponding key at said keyboard, third means for actuating the matrix bars on which a tooth is missing at the coded locations abutted by said corresponding sensing bar teeth, a group of output switches coupled respectively to said matrix bars and actuated in response to said selective energization of said magnets according to the pulse representations stored in said buffer storage and actuated in response to actuation of respective matrix bars by said third means to represent the character corresponding to a depressed typewriter key; a second storage channel; and recording means for transducing the representations of said switches to coersponding representations in said second storage channel.

14. In a data processing system wherein items of information are represented by coded pulse groups, a circuit for detecting forbidden code pulse groups and for suspending operation of said system upon detection of one of said forbidden groups, comprising: an odd-even counter for detecting the occurrence of an even number of pulses characteristic of a forbidden code group and for developing an output potential upon said detection; a group of forbidden code contacts; means for actuating said contacts according to each code pulse group; an AND gate; a connection from said odd-even counter for conducting said output potential to the input of said gate for arming said gate; means for applying a pulse to said contacts at the end of a pulse group; a connection from said group of contacts to said gate for conducting said pulse from said contacts to said gate upon actuation of said contacts according to a forbidden code pulse group; and means coupled to the output of said gate for suspending operation of the system in response to energization of said gate.

15. In a system for processing data: a first storage channel; first means for transducing a data representation stored in said channel to a first serial group of pulses; a translator; a buffer storage for receiving and storing representations of said electrical pulse group and for setting said translator to represent in parallel said pulse group; a typewriter; an actuating mechanism for actuating said typewriter to print data corresponding to said pulse group represented by said translator; means for setting said translator in response to actuation of a typewriter key to represent the character corresponding to said actuated typewriter key; means for developing a second serial group of pulses coded to represent a representation of said translator; a second storage channel; means for transducing said second pulse group to corresponding representations in said second storage channel; and a program unit coupled to said first and second transducing means, said translator, said buffer storage, said typewriter, said actuating mechanism, said setting means, and said developing means for selectively controlling the system to transduce data from said first storage channel and to print said data at said typewriter, to transduce data from said first storage channel to said second storage channel, to transduce data from said first storage channel to said second storage channel to to print said data, and to enable manual actuation of said typewriter keys to transduce data corresponding to said actuated keys to said second storage channel in a predetermined sequence.

16. A data processing system for automatically printing data comprising: a plurality of record cards for permanent storage of predetermined arrangements of character representations; a card receiver in said system for interchangeably receiving selected ones of said cards; means for transducing a character representation stored on the selected card to a serial group of pulses; a translator; means responsive to said serial group of pulses for setting said translator in accordance with said character; a printing device; and means for controlling said printing device to print the character corresponding to the setting of said translator.

17. A data processing system as defined in claim 16 wherein said record cards comprise magnetic material on which character representations are stored in the form of magnetic flux configurations.

18. A data processing system comprising: information storage means having a plurality of storage channels; a first circuit for reading information from one of said storage channels and for recording the information into another one of said storage channels; information printing means; a second circuit for reading information from a selected storage channel and for causing the actuation of said printing means in correspondence with the information; a keyboard for entering information into said system; a third circuit for recording in a selected storage channel the information entered at said keyboard; a plurality of control keys; and program means preset to correspond to a plurality of programs and operable for conditioning said circuits in a sequence according to one of said programs selected in response to actuation of a corresponding control key.

19. A data processing system for carrying out a plurality of predetermined programs of operations, each program comprising a sequence of instructions and each instruction comprising at least one command, including: a keyboard comprising a group of individually depressible keys each corresponding to a predetermined character; a translator settable to a character representing condition and having an input and an output; a first circuit for performing a keyboard entry command comprising means for conditioning said system to receive data manually entered at said keyboard; means operable upon depression of a key of said keyboard subsequent to said conditioning for setting said translator in accordance with the character corresponding to the depressed key; data storage means; a second circuit for performing a record command comprising means for receiving signals at the output of said translator corresponding to the character representing condition of said translator and for transmitting said signals to said storage means for recording a representation of the character; a third circuit for performing a read command comprising means for detecting characters in said storage means and for transmitting signals representative of a detected character to the input of said translator for setting said translator in correspondence therewith; character printing means; a fourth circuit for performing a print command comprising means for causing the actuation of said printing means in accordance with the setting of said translator; a program unit preset to correspond to a plurality of selectable programs and comprising a plurality of instruction elements each carrying at least one command representation for controlling the operations of the system at a given time; means for initiating a selected one of said plurality of programs; and means operable in response to said initiating means for placing instruction elements corresponding to said initiated program in control of the system to enable performance of keyboard entry, record, read, and print commands by said circuits in a sequence according to said initiated program.

20. A program controlled data processing system adapted to perform record and read-print operations comprising: means for performing a record operation including a typewriter, means operable upon depression of a typewriter key for developing coded signals corresponding to the character represented by said key, a data storage including a storage medium, and means for receiving said coded signals and for storing a representation of said character on said medium in response to said signals; means for performing a read-print operation including means for developing character representing signals in response to a character representation stored on a storage medium of said data storage, and means operable in response to said character representing signals for actuating the corresponding type bar of said typewriter; a program unit coded according to a plurality of programs and comprising a plurality of instruction elements; means for initiating operation of the system according to a corresponding one of said plurality of programs; and means for placing selected ones of said elements solely in control of said system to enable performance of record and read-print operations in a sequence according to a selected program.

21. A data processing system comprising: data entering means for entering data into said system; data recording means for recording data entered into said system; a program unit coded according to a plurality of programs and comprising a plurality of instruction elements each carrying at least one command representation; means for selecting one of said plurality of programs and for initiating operation of the system according to the selected program; and means for placing selected ones of said elements solely in control of said system in a sequence according to a selected program to enable operation of said data entering means and said data recording means in a corresponding sequence.

22. A data processing system comprising: a record card for data storage; a record tape for data storage; a first circuit for reading data from said card and for recording said data on said tape; data printing means; a second circuit for reading data from said record card and for causing actuation of said printing means in correspondence with the data read by said second circuit; a keyboard for entering data into said system; a third circuit for recording on said tape the data entered at said keyboard; program means for selectively conditioning said circuits according to a predetermined program; a plurality of control keys; and branching means for enabling selection of one of a plurality of alternate sequences of said predetermined program in response to depression of a control key corresponding to the alternate sequence selected.

23. A data processing system including: a manual control component comprising elements constituting a typewriter and other manual control keys; a data storage comprising a storage medium; data input means for recording data on said medium and data output means for extracting data from said medium; a translator coupled to said typewriter for converting mechanical movement of typewriter elements corresponding to a given character to a coded representation of said given character and conversely; interconnections between said translator and said data input means for simultaneously recording data on said medium corresponding to information manually entered on said typewriter; program means preset to correspond to a plurality of programs at least one of which is comprised of a plurality of alternate sequences, said program means operable for control of said translator, said typewriter and said data storage in a sequence according to a program selected in response to actuation of a corresponding control key; and branching means for enabling the selection of a selected one of said plurality of alternate sequences in response to actuation of a corresponding control key.

24. A data processing system comprising data handling apparatus for carrying out predetermined programs of operations, each program comprising a sequence of instructions and each instruction comprising at least one command: an instruction bar having first and second stable positions; a command tab affixed at a coded location on said bar; a command switch associated with said command tab; means responsive to an instruction signal corresponding to said bar for conditioning said bar for shifting from said first position to said second position; means for shifting said bar to said second position to thereby actuate said switch for conditioning said associated data handling apparatus for operation according to said command; means for maintaining said bar in said second position; and means responsive to a subsequent instruction signal for releasing said bar from said second position.

25. A data processing system comprising: a magnetic card bearing a plurality of information channels; a movable frame; a transducer mounted on said frame; a plurality of channel selection keys corresponding respectively to each of said channels; a plurality of selectively energizable frame moving means corresponding respectively to said plurality of channels; means responsive to actuation of a channel selection key for energizing a corresponding one of said selectively energizable frame moving means to move said frame to bring said transducer adjacent a channel corresponding to said actuated channel selection key; data utilization means; and means for causing relative motion between the card and the transducer to transduce data from said adjacent channel for transmission through said system to said data utilization means.

26. In a data processing system: a magnetic card bearing groups of information channels; a frame vertically movable adjacent said card; a plurality of transducers mounted on said frame and corresponding respectively to said groups; a plurality of selectively energizable frame moving means corresponding respectively to the information channels comprising a group; a plurality of channel selection keys corresponding respectively to each of said channels; means responsive to actuation of a selected key for connecting to the system the transducer corresponding to the group of channels in which the channel corresponding to the actuated key is located; means responsive to said key actuation for energizing a corresponding one of said selectively energizable frame moving means to move said frame to locate said connected transducer adjacent the channel corresponding to said actuated key; data utilization means; and a source of driving power for causing relative motion between the card and the connected transducer for transduction of data from said selected channel for transmission to said data utilization means.

27. In a data processing system: a magnetic card bearing groups of information channels; a frame vertically movable adjacent said card; a plurality of transducers mounted on said frame and corresponding respectively to said groups; a plurality of selectively energizable frame moving means mounted adjacent said frame and corresponding respectively to the information channels comprising a group; a plurality of channel selection keys corresponding respectively to each of said channels; means responsive to actuation of a selected key for connecting to the system the transducer corresponding to the group of channels in which the channel corresponding to the actuated key is located; means responsive to said key actuation for energizing a corresponding one of said selectively energizable frame moving means to move said frame to locate said connected transducer adjacent the channel corresponding to said actuated key; data utilization means; means for generating a read signal; means responsive to said read signal for causing relative motion between the card and the connected transducer for developing data pulse groups from said selected card channel for transmission to said data utilization means; a gap detector for detecting time gaps between said pulse groups and for developing a signal in response thereto; and means responsive to a signal from the gap detector for stopping the relative motion between the card and the connected transducer.

28. In a data processing system; a magnetic card bearing a plurality of information channels; a plurality of transducers mounted with their gaps in substantial alignment and adjacent said card for transducing data from said channels; a power roll mounted in parallel relationship to said transducers; a pair of swivel frames; first and second pinch rolls mounted on said swivel frames; a shaft; a pinch roll frame pivotally mounted on said shaft and pivotally carrying said pair of swivel frames; means for rocking said pinch roll frame to pinch said card between said first pinch roll and said power roll and to pinch said card between said second pinch roll and said plurality of transducers; data utilization means; and means for connecting a source of driving power to said power roll for moving said card past said transducers to transduce data from said card for transmission to said data utilization means.

29. In a data processing system including a source of information representing serial pulse groups, means for detecting the gaps between said pulse groups comprising: a first capacitor; a bypass capacitor; a source of charging current; means connecting said source to said first capacitor and said bypass capacitor to control the charging current from said source for charging said capacitors during the time intervals between pulse groups; first and second discharge circuits; discharge means responsive to a pulse of a pulse group during the time interval of the pulse for partially discharging said first capacitor through said first discharge circuit and for substantially discharging said bypass capacitor through said second discharge circuit; connecting means between said bypass capacitor and said first capacitor for conducting a discharge current from said partially discharged first capacitor through said substantially discharged bypass capacitor during the time interval between pulses of a group, said capacitors attaining respective charges during the time interval between groups such as to stop further discharge through said connecting means during that interval; and means coupled to said first discharge circuit for utilizing the potentials resulting from the discharge currents through said first discharge circuit to control the system accordingly.

30. In a data processing system including a source of information representing serial pulse groups, the time interval between pulse groups being substantially greater than the time interval between successive pulses of a group, means for detecting gaps between said pulse groups comprising: a pair of output terminals; a capacitor; means for charging said capacitor; means responsive to a pulse of a pulse group for discharging said capacitor across said output terminals for the duration of the pulse; means for maintaining said discharge for a time interval substantially equal to the time interval between successive pulses of a group; and means connected to said output terminals for utilizing the potentials developed across said terminals to control the system accordingly.

31. In a data processing system having a source of serial information representing pulse groups, a circuit for developing system control pulses at the end of each pulse group comprising: pulse generating means having first and second conditions of operation and for developing a pulse at each change from said second to said first condition; means with an input connected to said source and responsive to the successive pulses of a pulse group for maintaining said generating means in said second condition for the duration of said pulse group and for returning said generating means to said first condition at the end of said pulse group; and means connected to said generating means for conducting the pulse developed by the generating means upon the change from the second to the first condition to system control devices for synchronizing the operation of the data processing system.

32. In a data processing system wherein items of information are represented by coded pulse groups comprising a standard number of pulses, a circuit for detecting multilated pulse groups comprising pulse groups with pulses missing and pulse groups with extra pulses comprising: means for generating pulse groups; a shift register connected to said generating means for developing an output signal in response to the receipt of the standard number of pulses; a bistable device set to a predetermined condition prior to generation of each pulse group for developing a first output signal at a first output when in said predetermined condition and for developing a second output signal at a second output when set to a condition opposite said predetermined condition in response to said shift register output signal; a gap detector connected to said generating means for detecting a gap at the end of any series of pulses and for developing an output signal in response thereto; missing pulse gating means coupled to the first output of said bistable device and to the output of said gap detector for developing an output signal in response to a coincidence of signals from the first output of said bistable device and from said gap detector; extra pulse gating means coupled to the second output of said bistable device and to said generating means for developing an output signal in response to a coincidence of signals from the second output of said bistable device and from said generating means; and means coupled to the outputs of said missing pulse and said extra pulse gating means for manifesting the occurrence of a mutilated pulse group in response to an output signal from one of said gating means.

33. In a data processing system wherein items of information are represented by coded pulse groups comprising a standard number of pulses, a circuit for detecting mutilated pulse groups comprising pulse groups with pulses missing and pulse groups with extra pulses, said circuit comprising: means for generating pulse groups; first means coupled to said generating means for developing a first output signal at a first output before receipt of the standard number of pulses that comprises a coded pulse group and for developing a second output signal at a second output after receipt of the standard number of pulses; detection means coupled to said generating means for developing an output signal in response to detection of a gap at the end of any series of pulses; and means for signaling the system of the occurrence of a mutilated pulse group in response to a coincidence of signals from the first output of said first means and said detection means and in response to a coincidence of signals from the second output of said first means and said generating means respectively.

34. In a data processing system wherein items of information are represented by coded pulse groups, a circuit for detecting mutilated pulse groups including pulse groups with pulses missing comprising: generating means for generating pulse groups; a shift register connected to said generating means; a bistable device for providing an output potential when set to a predetermined condition; means for setting said bistable device to said predetermined condition of operation prior to generation of a pulse group; means connecting the output of the shift register to the input of the bistable device for setting said bistable device to the condition of operation opposite said predetermined condition in response to a number of pulses applied to said shift register equal to the number of pulses that comprises a coded pulse group to thereby remove said output potential of said bistable device; a gap detector connected to said generating means for detecting the end of any series of pulses and for developing an output signal in response thereto; and means coupled to the outputs of said bistable circuit and said gap detector for signaling the system of the occurrence of a mutilated pulse group in response to a coincidence of an output signal from said gap detector and an output potential from said bistable device.

35. In a processing system wherein items of information are represented by coded pulse groups comprising a standard number of pulses, a circuit for detecting mutilated pulse groups including pulse groups with pulses missing comprising: generating means for generating pulse groups; first means coupled to said generating means for developing an output signal before receipt of the standard number of pulses that comprises a coded pulse group; second means coupled to said generating means for detecting a gap at the end of any series of pulses and for generating a signal in response thereto; and means coupled to said first and second means for signaling said system of the occurrence of a mutilated pulse group in response to a coincidence of signals from said first and second means.

36. In a data processing system wherein items of information are represented by coded pulse groups comprising a standard number of pulses, a circuit for detecting mutilated pulse groups including pulse groups having extra pulses comprising: a source of pulse groups; a shift register connected to said source for developing an output signal in response to a standard number of pulses; a bistable device connected to the output of said shift register for developing an output potential in response to an output signal from said shift register; and means coupled to said bistable device and said source for manifesting the occurrence of a mutilated pulse group in response to a coincidence of an output potential from said bistable device and a signal from said source.

37. In a data processing system wherein items of information are represented by coded pulse groups, a circuit for detecting forbidden code pulse groups comprising: a source of pulse groups; first means coupled to said source for detecting the odd and even characteristics of a pulse group and for developing an output signal corresponding to one of said characteristics; second means coupled to said source for representing binary order characteristics of a pulse group and for developing an output signal in response to a forbidden code group binary order characteristic; and system means coupled to said first and second means for manifesting the occurrence of a forbidden code pulse group in response to a coincidence of output signals from said first and second means.

38. In a data processing system wherein items of information are represented by coded pulse groups comprising a standard number of pulses, a circuit for detecting mutilated pulse groups including pulse groups having extra pulses comprising: a source of pulse groups; first means coupled to said source for developing in response to the standard number of pulses an output signal continuing over a period during which extra pulses occur; and second means coupled to said first means and to said source for signaling said system of the occurrence of an extra pulse group in response to said continuing output signal from said first means and an extra pulse from said source.

39. A data processing system including: storage means for storing character representations; means for transducing a character representation from said storage means to a series of pulses; a buffer storage coupled to said transducing means for receiving said pulses and storing a representation of said series of pulses and comprising a plurality of bistable stages each including at least one current conducting element adapted to alternately assume in response to input signals a conducting or nonconducting state; a current source; a respective resistance element connecting said source to each of said current conducting elements; a respective relay for each bistable stage including a relay operating coil connected for actuation by the respectively associated bistable stage; decoding means coupled to said relays and set in response to selective energization of said relays in accordance with the representation stored in said buffer storage; a printing device; and means coupled to said decoding means and said printing device for actuating said printing device to print the character corresponding to the setting of said decoding means.

40. A data processing system including: storage means for storing character representations; means for transducing a character representation from said storage means to a series of pulses; a buffer storage including a plurality of bistable stages each including at least one current conducting element adapted to alternately assume in response to input signals a conducting or nonconducting state, said bistable stages being connected together so that the first of said series of pulses is sequentially caused to pass through from a first to a last of said bistable stages in timed relation with receipt of each of the successive pulses in said series; input terminals to said buffer storage connected to said first bistable stage; means for connecting the output signals from said transducing means to said input terminals; a current source; a respective resistance element connecting said source to each of said current conducting elements; a respective relay for each bistable stage including a relay operating coil connected for actuation by the respectively associated bistable stage; decoding means coupled to said relays and set in response to selective energization of said relays in accordance with the representation stored in said buffer storage; a printing device; and means coupled to said decoding means and said printing device for actuating said printing device to print the character corresponding to the setting of said decoding means.

41. A data processing system for carrying out predetermined different programs of operations comprising: a typewriter; a program unit associated with said typewriter including a group of instruction means each operable for controlling operation of the system at a given time; manually operable switch means associated with said program unit for placing a selected instruction means in control of said system; record means for storing coded characters including instruction change characters; reproducing means for reading a coded instruction change character from said storing means; and means for receiving said instruction change character and operable in response thereto for changing control of said system from one program of operation to another.

42. In a data processing system of the type having a typewriter, record members for storing recorded characters, recording means for entering on said record members characters entered on said typewriter, and reproducing means for reading out coded characters from said record members for actuating said typewriter and said recording means: a program unit connected to said typewriter, said recording means and said reproducing means for controlling operation of said system to carry out predetermined programs of instruction; means for changing commands in the program unit comprising instruction control keys on the typewriter and instruction change characters on said record members, said instruction change characters being encoded on said record members along with information that is adapted to be printed by said typewriter at positions following the positions where the information to be typed is stored to thereby change the programmed instruction upon completion of the typing of said information.

43. In a data processing system of the type having a typewriter, record members for storing recorded characters, recording means for entering on said record members characters entered on said typewriter, and a pair of reproducing means for reading out coded characters from said record members for actuating said typewriter and said recording means: a program unit connected to said typewriter, said recording means and said reproducing means for controlling operation of said system to carry out predetermined programs of instructions; means for changing commands in the program unit comprising instruction control keys on the typewriter and instruction change characters on said record members; means for setting the program unit to energize a first of said reproducing means and to type data stored on the record member in said first reproducing means; and means to effect changes in program operation without manual intervention in response to instruction control signals stored on the record member in said first reproducing means to transfer operation of said system to energize the second of said reproducing means and to type data stored on the record member in said second reproducing means.

44. In a system for processing data: a first data storage member; first means for transducing a data representation stored in said member to a first signal; coding means; a storage register for receiving and storing representations of said first signal for setting said coding means to represent said first signal; a typewriter; an actuating mechanism for actuating said typewriter to print data corresponding to said first signal represented by said coding means; means for setting said coding means in response to actuation of a typewriter key to represent the character corresponding to said actuated typewriter key; means for developing a second signal coded to represent a representation of said coding means; a second data storage member; means for transducing said second coded signal to said second data storage member; and a program unit coupled to said first and second transducing means and to said typewriter for selectively controlling the system to transduce data from said first data storage member and to print said data at said typewriter, to transduce data from said first data storage member to said second data storage member, to transduce data from said first storage member to said second storage member and to print said data, and to enable manual actuation of said typewriter keys to transduce data corresponding to said actuated keys to said second data storage member in a predetermined sequence.

45. A data processing system comprising: first and second information storage members; a first circuit including transducer means for reading information from said first storage member and for recording the information onto said second storage member; a typewriter; a second circuit also connecting said transducer means to cause actuation of keys on the typewriter in correspondence with information from said first storage member; a keyboard on said typewriter for entering information into said system; a third circuit for recording information entered at said keyboard into said second storage member; and means including a plurality of control keys on said typewriter selectively settable to correspond to a plurality of programs and operable for conditioning said circuits in a sequence according to one of said programs selected in response to actuation of a corresponding control key.

46. A data processing system for carrying out a plurality of predetermined programs of operations including: a keyboard comprising a group of individually depressible keys each corresponding to a predetermined character; coding means settable to a character representing condition and having an input and an output; a first circuit for performing a keyboard entry command comprising means for conditioning said system to receive data manually entered at said keyboard; means operable upon depression of a key of said keyboard subsequent to said conditioning for setting said coding means in accordance with the character corresponding to the depressed key; data storage members; a second circuit for performing a record command comprising means for receiving signals at output of said decoding means corresponding to the character representing condition of said coding means and for transmitting said signals to one of said storage members for recording a representation of the character; a third circuit for performing a read command comprising means for detecting characters in one of said storage members and for transmitting signals representative of a detected character to the input of said decoding means for setting said coding means in correspondence therewith; character printing means; a fourth circuit for performing a print command comprising means for causing the actuation of said printing means in accordance with the setting of said coding means; a program unit having a plurality of selectable programs and comprising a plurality of instruction elements each effective to produce a command representation for controlling the operation of the system at a given time; means for initiating a selected one of said plurality of programs; and means operable in response to said initiating means to enable performance of keyboard entry, record, read, and print commands by said circuits in a sequence according to said initiated program.

47. In combination: storage means for storing character representations; means for transducing a character representation from said storage means to a series of pulses; a buffer storage coupled to said transducing means for receiving said pulses and storing a representation of said series of pulses and comprising a plurality of bistable stages; a respective relay for each bistable stage including a relay operating coil connected for actuation by the respectively associated bistable stage; decoding means coupled to said relays and set in response to selective energization of said relays in accordance with the representation stored in said buffer storage; a printing device; and means coupled to said decoding means and said printing device for actuating said printing device to print the character corresponding to the setting of said decoding means.

References Cited in the file of this patent
UNITED STATES PATENTS

| | | |
|---|---|---|
| 2,255,011 | Lake et al. | Sept. 2, 1941 |
| 2,540,030 | Hamilton et al. | Jan. 30, 1951 |
| 2,696,599 | Holbrook et al. | Dec. 7, 1954 |
| 2,765,895 | Higonnet et al. | Oct. 9, 1956 |
| 2,860,756 | Wilson et al. | Nov. 18, 1958 |

UNITED STATES PATENT OFFICE
CERTIFICATE OF CORRECTION

Patent No. 3,060,272

October 23, 1962

Stanley Harrison Bacon et al.

It is hereby certified that error appears in the above numbered patent requiring correction and that the said Letters Patent should read as corrected below.

Column 9, line 45, for "sewitch" read -- switch --; column 22, line 52, for "rea" read -- area --; column 23, line 7, for "theinstruction" read -- the instruction --; column 26, line 6, for "bulb conducting" read -- bulb 2108 conducting --; line 54, for "characters" read -- characteristics --; column 27, line 3, for "KR-6(K2)" read -- KR-6(2) --; column 34, line 1, for "1301" read -- 1307 --; column 41, line 33, after "predetermined" insert -- command --; line 66, for "storge" read -- storage --; column 43, line 14, for "corersponding" read -- corresponding --; line 60, strike out "to", second occurrence; column 47, line 66, for "multilated" read -- mutilated --; column 48, line 63, after "In a" insert -- data --.

Signed and sealed this 1st day of October 1963.

(SEAL)
Attest:

ERNEST W. SWIDER
Attesting Officer

DAVID L. LADD
Commissioner of Patents